(12) United States Patent  (10) Patent No.: US 9,351,364 B2
Williams et al.  (45) Date of Patent: May 24, 2016

(54) LOW COST LED DRIVER WITH IMPROVED SERIAL BUS

(75) Inventors: Richard K. Williams, Cupertino, CA (US); Kevin D'Angelo, Carmel, CA (US); David A. Brown, San Jose, CA (US)

(73) Assignee: ADVANCED ANALOGIC TECHNOLOGIES INCORPORATED, Santa Clara, CA (US)

( * ) Notice: Subject to any disclaimer, the term of this patent is extended or adjusted under 35 U.S.C. 154(b) by 0 days.

(21) Appl. No.: 13/347,658

(22) Filed: Jan. 10, 2012

(65) Prior Publication Data

US 2013/0099702 A1   Apr. 25, 2013

Related U.S. Application Data

(63) Continuation of application No. 13/346,647, filed on Jan. 9, 2012.

(60) Provisional application No. 61/550,539, filed on Oct. 24, 2011.

(51) Int. Cl.
*H05B 37/00* (2006.01)
*H05B 33/08* (2006.01)
*H05B 37/02* (2006.01)

(52) U.S. Cl.
CPC .......... *H05B 33/083* (2013.01); *H05B 33/0842* (2013.01); *H05B 37/0254* (2013.01)

(58) Field of Classification Search
USPC ..................................................... 315/169.2
See application file for complete search history.

(56) References Cited

U.S. PATENT DOCUMENTS

| 6,175,193 | B1 * | 1/2001 | Kishita et al. ............... 315/169.3 |
| 6,700,560 | B2 * | 3/2004 | Sumiya ........................... 345/88 |
| 6,754,784 | B1 | 6/2004 | North et al. |
| 7,317,287 | B2 | 1/2008 | Blumel |
| 7,777,704 | B2 | 8/2010 | S et al. |
| 7,956,824 | B2 | 6/2011 | Li Volsi |
| 8,058,810 | B2 | 11/2011 | Chen et al. |
| 8,344,661 | B2 | 1/2013 | Hsu et al. |

(Continued)

FOREIGN PATENT DOCUMENTS

| EP | 1589517 A2 | 10/2005 |
| GB | 2459009 A | 10/2009 |

(Continued)

OTHER PUBLICATIONS

International Search Report for corresponding PCT Application No. PCT/US2012/061464 dated Jan. 31, 2013.

*Primary Examiner* — Douglas W Owens
*Assistant Examiner* — Monica C King
(74) *Attorney, Agent, or Firm* — Lando & Anastasi, LLP

(57) ABSTRACT

An LED driver IC for driving external strings of LEDs comprises a prefix register and a data register connected in series with each other and with the prefix and data registers in other driver ICs. The prefix and data registers of the driver ICs are connected in a daisy chain arrangement with an interface IC. The interface IC loads data identifying a functional latch into the prefix register and data defining a functional condition into the data register of each driver IC. The data in the data register is then transferred to the functional latch to control the functional condition within the LED driver IC.

18 Claims, 31 Drawing Sheets

(56) References Cited

U.S. PATENT DOCUMENTS

| | | |
|---|---|---|
| 8,648,545 B2 | 2/2014 | Lee et al. |
| 2001/0005319 A1 | 6/2001 | Ohishi et al. |
| 2005/0077838 A1 | 4/2005 | Blumel |
| 2006/0125757 A1 | 6/2006 | Kang et al. |
| 2006/0186820 A1 | 8/2006 | Yang |
| 2006/0214898 A1* | 9/2006 | Woo et al. .................. 345/90 |
| 2008/0180040 A1 | 7/2008 | Prendergast et al. |
| 2008/0292344 A1 | 11/2008 | Nagumo |
| 2009/0040197 A1 | 2/2009 | Scheibe |
| 2009/0079362 A1* | 3/2009 | Shteynberg et al. .......... 315/294 |
| 2009/0128053 A1 | 5/2009 | Dhayagude et al. |
| 2009/0134817 A1 | 5/2009 | Jurngwirth et al. |
| 2009/0153075 A1 | 6/2009 | Li et al. |
| 2009/0251071 A1 | 10/2009 | Gater et al. |
| 2009/0284445 A1 | 11/2009 | Kuo et al. |
| 2009/0289578 A1 | 11/2009 | Peng |
| 2009/0309502 A1 | 12/2009 | Trattler |
| 2010/0026190 A1 | 2/2010 | Hsu |
| 2010/0052558 A1* | 3/2010 | Lee et al. .................. 315/250 |
| 2010/0053129 A1 | 3/2010 | Morita |
| 2010/0194308 A1 | 8/2010 | Zhao et al. |
| 2010/0201279 A1 | 8/2010 | Zhao |
| 2011/0012519 A1 | 1/2011 | Zhao |
| 2011/0043545 A1* | 2/2011 | Huang ..................... 345/690 |
| 2011/0096099 A1* | 4/2011 | Yamamoto et al. ........... 345/690 |
| 2011/0121755 A1* | 5/2011 | Han .......................... 315/294 |
| 2011/0249036 A1 | 10/2011 | Kim |
| 2012/0098456 A1 | 4/2012 | Tseng |
| 2013/0082614 A1 | 4/2013 | Williams et al. |
| 2013/0099681 A1 | 4/2013 | Williams et al. |
| 2013/0099682 A1 | 4/2013 | Williams et al. |
| 2013/0099701 A1 | 4/2013 | Williams et al. |
| 2013/0099702 A1 | 4/2013 | Williams et al. |
| 2013/0147370 A1 | 6/2013 | Williams et al. |
| 2013/0147371 A1 | 6/2013 | Williams et al. |
| 2013/0147372 A1 | 6/2013 | Williams et al. |
| 2013/0147375 A1 | 6/2013 | Williams et al. |
| 2013/0193852 A1 | 8/2013 | Frattini et al. |

FOREIGN PATENT DOCUMENTS

| | | |
|---|---|---|
| JP | 2001188498 A | 7/2001 |
| RU | 2256305 C2 | 7/2005 |
| RU | 2007142404 A | 5/2009 |
| RU | 2385553 C2 | 3/2010 |
| RU | 2427109 C2 | 8/2011 |
| SU | 1709351 A1 | 1/1992 |
| TW | 201108863 A | 3/2011 |
| TW | 201110809 A | 3/2011 |

* cited by examiner

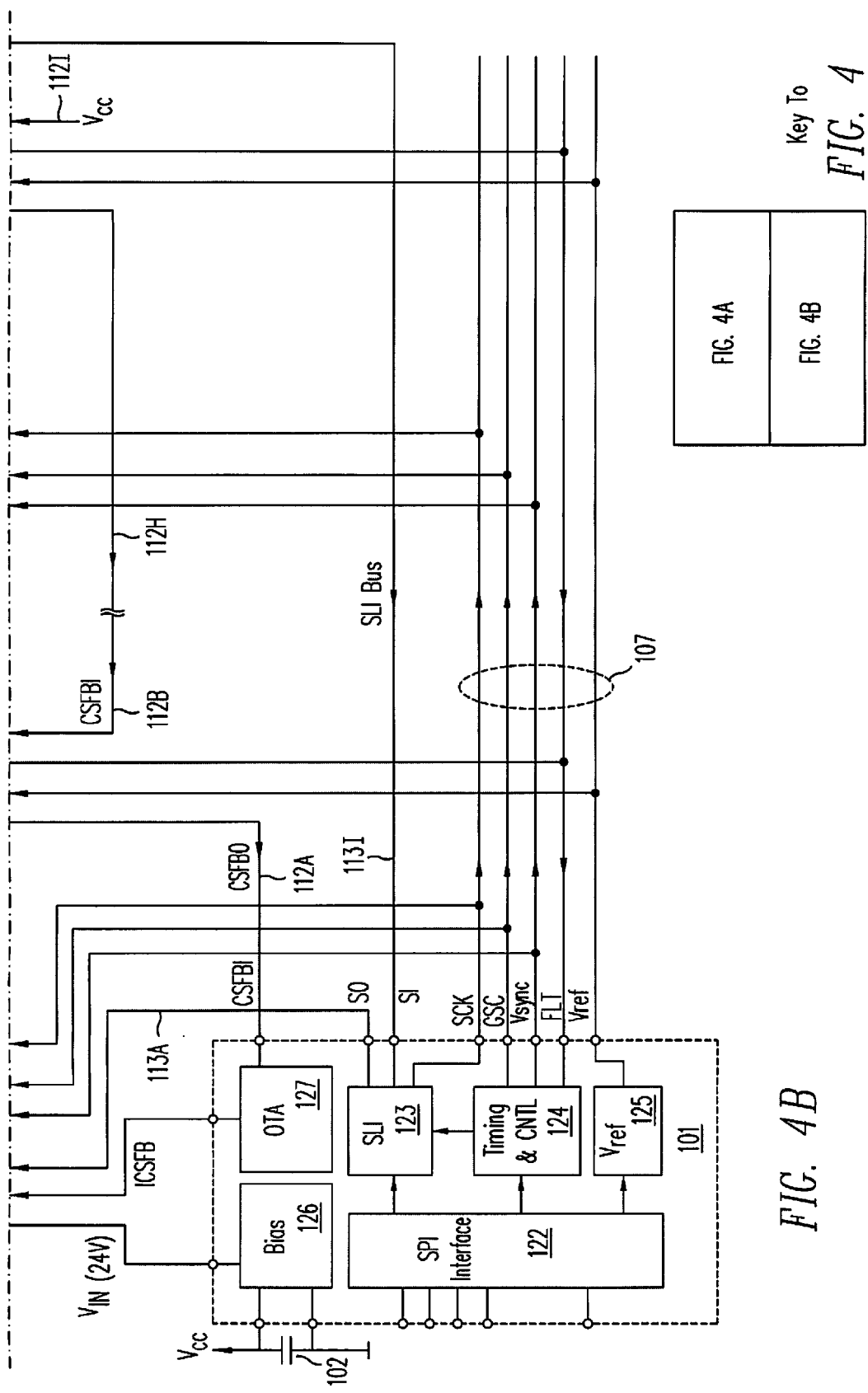

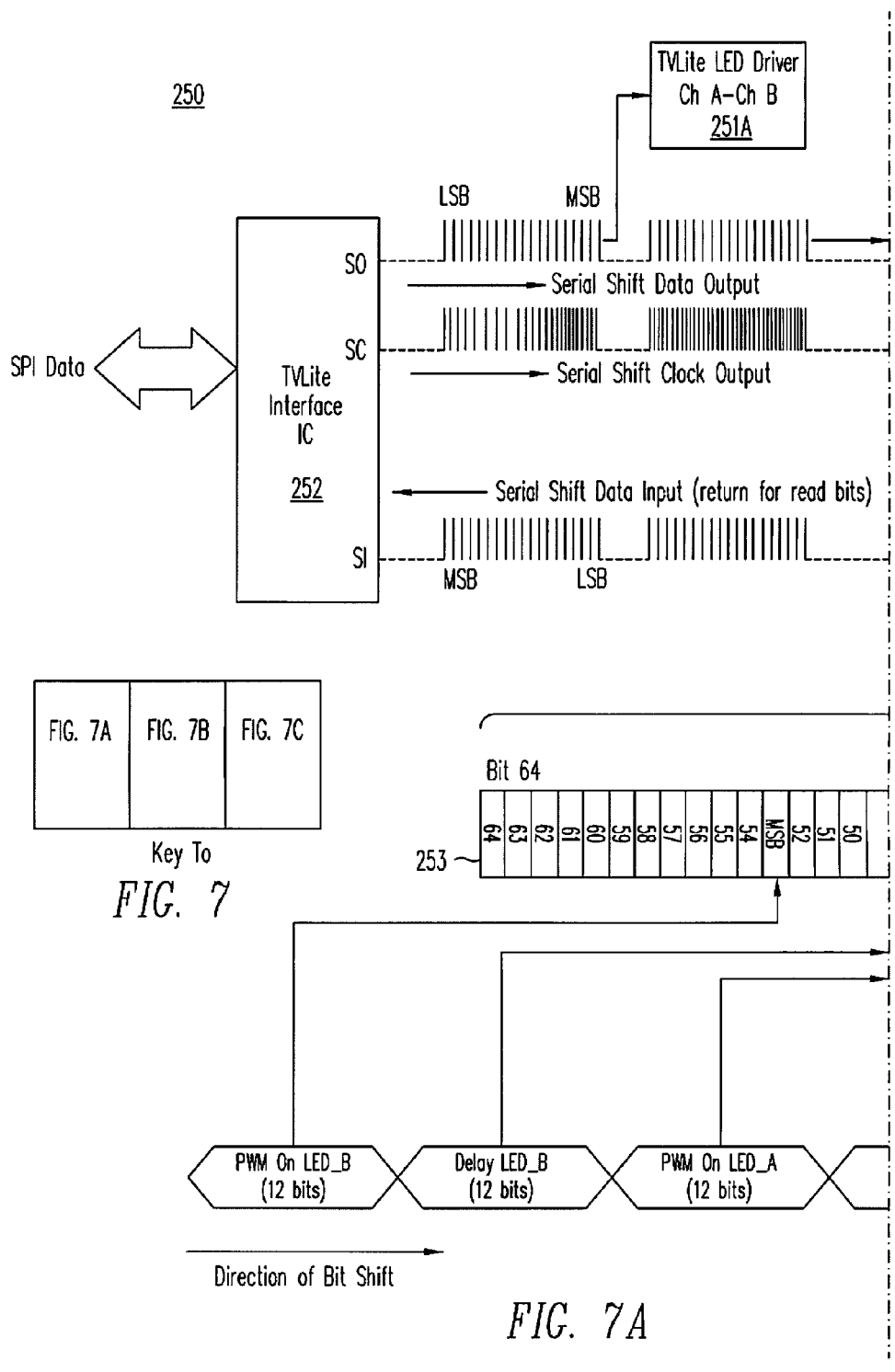

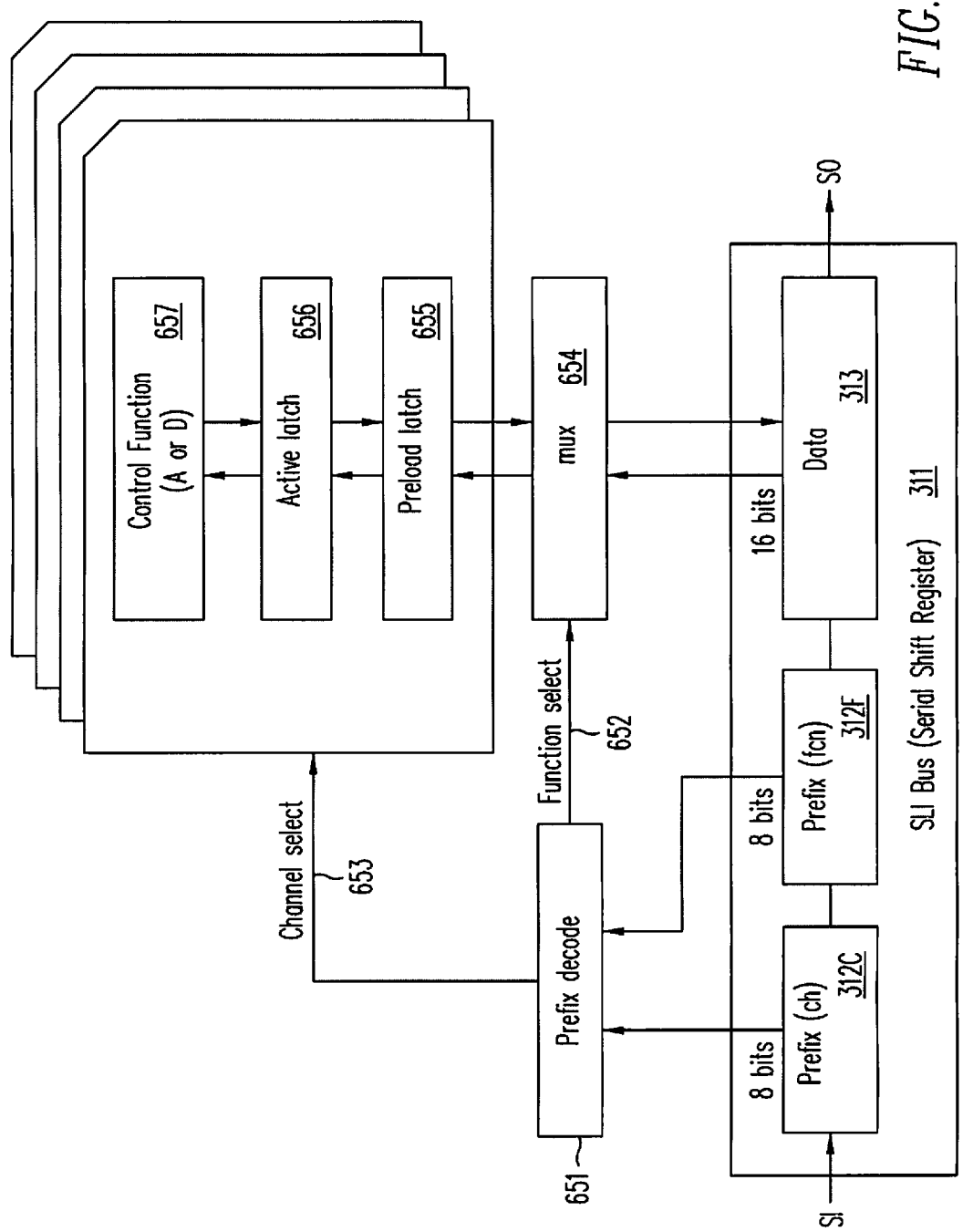

LOW COST LED DRIVER WITH IMPROVED SERIAL BUS

CROSS-REFERENCE TO RELATED APPLICATIONS

This application is a continuation of application Ser. No. 13/346,647, filed Jan. 9, 2012, which claims the priority of Provisional Application No. 61/550,539, filed Oct. 24, 2011, each of which is incorporated herein by reference in its entirety.

This application is related to the following applications, each of which is incorporated herein by reference in its entirety: application Ser. No. 346,625, tiled Jan. 9, 2012, entitled Low Cost LED Driver with Integral Dimming Capability; application Ser. No. 13/346,659, filed Jan. 9, 2012, entitled Serial Lighting Interface With Embedded Feedback.

FIELD OF THE INVENTION

This invention relates to semiconductor devices and circuits and methods for driving LEDs in lighting and display applications

BACKGROUND

LEDs are increasingly being used to replace lamps and bulbs in lighting applications including providing white light as aback light in color liquid crystal displays (LCD) and high definition televisions (HDTV). While LEDs may be used to uniformly light the entire display, performance, contrast, reliability, and power efficiency are improved by employing more than one string of LEDs and to drive each string to a different brightness corresponding to the portion of the display that the particular LED string illuminates. "Local dimming" refers to backlighting systems capable of such non-uniform backlight brightness. The power savings in such systems can be as high as 50% as compared with LCDs employing uniform backlighting. Using local dimming, LCD contrast ratios can approach those of plasma TVs.

To control the brightness and uniformity of the light emitted from each string of LEDs, special electronic driver circuitry must be employed to precisely control the LED current and voltage. For example, a string of "m" LEDs connected in series requires a voltage equal to approximately 3.1 to 3,5 (typically 3.3) times "m" to operate consistently. Supplying this requisite voltage to a LED string generally requires a step-up or step-down voltage converter and regulator called a DC-to-DC converter or switch-mode power supply (SMPS). When a number of LED strings are powered from a single SMPS, the output voltage of the power supply must exceed the highest voltage required by any of the strings of LEDs. Since the highest forward voltage required cannot be known a priori, the LED driver IC must be intelligent enough to dynamically adjust the power supply voltage using feedback.

In addition to providing the proper voltage to the LED strings, the backlight driver ID must precisely control the current conducted in each string to a tolerance of ±2%. Accurate current control is necessary because the brightness of an LED is proportional to the current flowing-it, and any substantial string-to-string current mismatch will be evident as a variation in the brightness of the LCD. Aside from controlling the current, local dimming requires precise pulse control of LED illumination, both in timing and duration, in order to synchronize the brightness of each backlight region, zone, or tile to the corresponding image in the LCD screen.

The prior art's solutions to the need for local dimming limit display brightness and are costly. For example, early attempts to integrate LED driver circuitry with multiple channels of high-voltage current sink transistors were problematic because mismatch in the forward voltage of the LED strings resulted in excessive power dissipation and overheating. Attempts to minimize power dissipation by lowering the current in the LEDs and limiting the number of LEDs in a. string (for better channel-to-channel voltage matching) proved uneconomical, requiring more LED strings and a greater number of channels of LED drive. Thus the full integration approach to LED backlight driver systems has been limited to small display panels or very expensive "high-end" HDTVs.

Subsequent attempts to reduce overall display backlight costs by using multichips approaches sacrificed necessary features, functionality, and even safety.

For example, the prior art multichip system for driving LEDs shown in FIG. 1 comprises backlight controller IC 6 which drives multiple discrete current sink transistors 4A-4Q and high-voltage protective devices 3A-3Q. The backlight comprises sixteen LED Strings 2A-2Q (collectively referenced LED strings 2). Each of LED strings 2A-2Q contains "m" series-connected LEDs. In practice, the number of LEDs in each string can range from two to sixty. Each LED string has its current controlled through one of discrete current sink MOSFETs 4A-4Q, respectively. Backlight controller IC 6 sets the current in each LED string in response to instructions from a backlight microcontroller μC 7, which are communicated through a high-speed, expensive, serial peripheral interface (SPI) bus 12. Microcontroller μC 7 receives video and image information from a scalar IC 8 in order to determine the proper lighting levels needed for each of LED strings 2A-2Q.

LED strings 2A-2Q are powered by a common LED power supply rail 11, which is biased at a voltage $+V_{LED}$ by switch-mode power supply (SMPS) 9. The voltage $+V_{LED}$ is generated in response to a current-sense feedback signal (CSFB) 10 from control IC 6. Supply voltages vary with the number of LEDs "m" connected in series and may range from 35 volts for strings of ten LEDs up to 150 volts for strings of 40 LEDs. Discrete protective devices 3A-3Q, typically high-voltage discrete MOSFETs, are optionally employed to clamp the maximum voltage present across the current sink transistors 4, especially for operation at higher voltages, e.g. over 100V.

In the system shown in FIG. 1 each component is a discrete device, in a separate package, requiring its only pick-place operation to position and mount it on its printed circuit board.

Each set of discrete components, along with the corresponding string of LEDs, is repeated "n" times for an "n" channel driver solution. For example, in addition to SMPS 9, the 16-channel backlight system shown in FIG. 1 requires 34 components, namely microcontroller 7, a high-pin-count backlight controller IC 6, 16 current sink transistors 4 and 16 protective devices 3, to facilitate local dimming in response to video information generated from scalar IC 8. This solution is complex and expensive.

Aside from requiring the assembly of a large number of discrete components, i.e. a high build of materials (BOM) count, the package cost of high pin count package 6 is substantial. The need for such a large number of pins is illustrated in the circuit diagram of FIG. 2, which illustrates in greater detail one of the channels of LED driver system shown in FIG. 1. As shown each channel includes a string 21 of "m" series-connected LEDs, a protective cascode-clamp MOSFET 22 with an integral high-voltage circuiting diode 23, a current sink MOSFET 24, and a current-sensing I-Precise gate driver circuit 25.

The active current sink MOSFET 24, implemented as a discrete component controlled by the interface IC 6, comprises a power MOSFET, preferably a vertical DMOSFET, having gate, source and drain connections. I-Precise gate driver circuit 25 senses the current in current sink MOSFET 24 and provides it with the requisite gate drive voltage to conduct a precise amount of current. In normal operation, current sink MOSFET 24 operates in its saturated mode of operation controlling a constant level of current independent of its drain-to-source voltage. As a result of the simultaneous presence of a source-drain voltage and current, power is dissipated in MOSFET 24. Continuous measurement of the drain voltage of current sink MOSFET 24 is required for two purposes—to detect shorted LEDs and to facilitate feedback to the switch mode power supply (SMPS) 9. The presence of a shorted LED is recorded in an LED fault circuit 27, and feedback to SMPS 9 is effected by a current sense feedback (CSFB) circuit 26.

In summary, current sink MOSFET 24 requires three connections to the control IC 6, specifically a source connection for current measurement, a gate connection for biasing the device to control its current, and a drain connection for fault and feedback sensing. These three connections per current sink MOSFET and hence per channel are depicted in FIG. 2A as crossing an interface 28 between the discrete devices and a control IC. Even in the schematic circuit diagram of FIG. 2B, where cascade clamp MOSFET 22 is eliminated and current sink MOSFET 24 must sustain high voltages, illustrated by "HV" integral diode 23, each channel still requires three pins per channel crossing interface 28. This 3-pin per channel requirement explains the need for high-pin count package 6 shown in FIG. 1. For a sixteen-channel driver, 3 pins per channel require 48 pins for the output pins on the control IC. Taking into account the SPI bus interface, analog functions, power supplies and more, a costly 64 or 72-pin package is necessary. Worse yet, many TV printed circuit board assembly firms are incapable of soldering packages with a pin pitch any smaller than 0.8 or 1.27 mm. A 72-pin package with a 0.8 mm pin pitch requires a 14×1.4 mm plastic body to provide the peripheral linear edge needed to fit all the pins.

One significant issue with multichip system shown in FIG. 1 is that temperature sensing in interface IC 6 can only detect the temperature of the IC, where no significant power dissipation is occurring. Unfortunately, the heat is being generated in the discrete current sink DMOSFETs 4, where no temperature sensing is possible. Without local temperature sensing, any of the current sink MOSFETs 4A-4Q could overheat without the system being able to detect or remedy the condition.

In summary, today's implementations for LED backlighting of LCD panels with local dimming capability suffer from numerous fundamental limitations with regard to cost, performance, features, and safety.

Highly integrated LED driver solutions require expensive large area dice packaged in expensive high pin count packages, and concentrate heat into a single package. This limits the driver to lower currents, due to power dissipation resulting from the linear operation of the current sink MOSFETs, and lower voltages, due to power dissipation resulting from LED forward-voltage mismatch, a problem that is exacerbated for greater numbers of series connected LEDs.

Multi-chip solutions combining an LED controller with discrete power MOSFETs require high BOM counts and even higher-pin-count packaging. Having nearly triple the pin count of fully integrated LED drivers, a sixteen channel solution can require 33 to 49 components and a 72 pin package as large as 14 mm×14 mm. Moreover, discrete MOSFETs offer no thermal sensing or protection against overheating.

What is needed is a cost-effective and reliable backlight system for TV's with local dimming. This requires a new semiconductor chip set that eliminates discrete MOSFETs, provides low overall package cost, minimizes the concentration of heat within any component, facilitates over-temperature detection and thermal protection, protects low voltage components from high voltages and against shorted LEDs, flexibly scales to accommodate a different number of channels and different sized displays without requiring custom integrated circuits, and maintains precise control of LED current and brightness.

Ideally, a flexible solution would be scalable to accommodate varying number of channels and display panels of different sizes without requiring custom integrated circuits.

BRIEF SUMMARY OF THE INVENTION

The above criteria are satisfied in an LED driver system according to this invention. An LED driver IC comprises a functional latch and a serial lighting interface (SLI) bus, which itself comprises a prefix register and a data register. The prefix register and the data register are connected in series. The LED driver IC drives an external string of LEDs.

Data identifying the functional latch are loaded into the prefix register and data defining a functional condition in the LED driver IC are serially loaded into the data register, typically on successive clock pulses. Responsive to the data in the prefix register a connection is formed between the functional latch and the data register, and typically upon the occurrence of a synchronism pulse, the data in the data register is transferred to the functional latch.

In one embodiment, a number of LED driver ICs are arranged into an LED driver system for controlling a plurality of LED strings. The SLI busses in the respective LED driver ICs are connected in series to form a system SLI bus. Data is loaded serially into the system SLI bus such that the prefix register and data register in each LED driver IC contain data necessary to identify and control a functional latch within that LED driver IC.

In one group of embodiments, each LED driver IC further comprises a preload latch, and the data from the data register is shifted into the functional latch in two stages, first from the data register to the preload latch, and then from the preload latch to the functional latch. The transfer of data from the preload latch to the functional latches in all of the LED driver ICs can be performed at the same time, such that the functional latches in the various LED driver ICs are updated simultaneously. This feature helps to eliminate "flicker" when the LED strings controlled by the LED driver ICs are used in a flat panel display, for example.

Each of the LED driver ICs may include a plurality of "channels," each channel being represented by an external LED string and an internal current sink MOSEET which controls the current in the external LED string. Moreover, a number of functional latches may be associated with each channel, the functional latches being used to control, for example, the on-time of the current sink MOSFET, the size of the current in the current sink MOSFET, a phase delay associated with the current sink MOSFET, and settings to define when the LED string associated with the channel is experiencing a fault condition.

In some embodiments, the LED driver IC comprises a latch that holds data to be transferred to the data register in the SLI bus. The data in this latch may indicate the type of fault that the LED string or driver IC is experiencing, for example, a shorted LED, an open-circuit LED string, or an over-temperature condition. After this data has been transferred to data register the SLI bus it is advanced back to an external interface IC as the next data sequence is loaded into the SLI bus. The interface IC, in conjunction with other elements of the system (e.g., a microcontroller), can then take remedial action such as turning off the LED string.

In some embodiments the prefix register is subdivided into a channel prefix register and a function prefix register, the former holding data that identifies a channel within the LED driver IC and the latter holding data that identifies a functional latch within that channel.

The SLI bus and LED driver IC of this invention are highly scalable and use far less semiconductor area than prior art systems. For example, an 8 bit channel prefix register, an 8 bit channel prefix register and a 16 bit data register could theoretically be used to control 256 functional latches in each of 256 channels with 65,536 levels of control, although in many embodiments a large number of these bits are not used.

BRIEF DESCRIPTION OF THE SEVERAL VIEWS OF THE DRAWING

FIG. 14 is a block diagram illustrating a prefix-multiplexed SLI bus register with a three-tiered register-latch architecture including preload and active latches.

DETAILED DESCRIPTION OF THE INVENTION

As described in the background section, existing backlight solutions for TVs and large screen LCDs are complex, expensive and inflexible. To reduce the cost of backlight systems for LCD's with local dimming without sacrificing safe and reliable operation clearly requires a completely new architecture that at the very least eliminates discrete MOSFETs, minimizes the concentration of heat within any component, facilitates over-temperature detection and thermal protection, and protects low voltage components from high voltages. While meeting these objectives may alone be insufficient to achieve a truly cost-effective solution able to meet the demanding cost targets of the home consumer electronics market, such an improvement is a necessary first step toward the goal of realizing low-cost local dimming.

The invention described herein enables a new cost-efficient and scalable architecture for realizing safe and economically viable LED backlighting solutions of large-screen LCDs and TVs with energy efficient local dimming capability. The new LED drive system, functional partitioning, and architecture, overcome the aforementioned problems in cost, functionality and the need for high pin count packages. The new architecture is based on certain fundamental premises, including 1. The analog control, sensing, and protection of the current sink MOSFET should be functionally integrated together in the same IC with the current sink MOSFET itself, not separated into another IC
2. Basic dimming, phase delay functions, LED current control and channel specific functions should be functionally integrated together in the same IC with the current sink MOSFET, not separated into another IC.
3. System timing, system μC host negotiations, and other global parameters and functions not unique to a specific channel should not be functionally integrated together in the same IC with the current sink MOSFETs.
4. The number of channels, i.e. current sink MOSFETs, in a device package should be designed for thermal management, i.e., to avoid overheating, while meeting specified LED current, supply voltage and LED forward-voltage mismatch requirements
5. Communication with and control of multi-channel LED driver ICs should employ low-pin count packages, ideally requiring no more than three package pins in total on the central interface IC as well as on each driver IC. These communication circuitry should occupy only a small fraction of the driver IC's die area and cost.
6. The level of functional integration in the interface IC and LED driver ICs should be balanced to facilitate the use of low-cost and low-pin count packages compatible with single layer PCB assembly.
7. Ideally, the system should flexibly scale to any number of channels without requiring significant redesign of the ICs.

Figure 1:
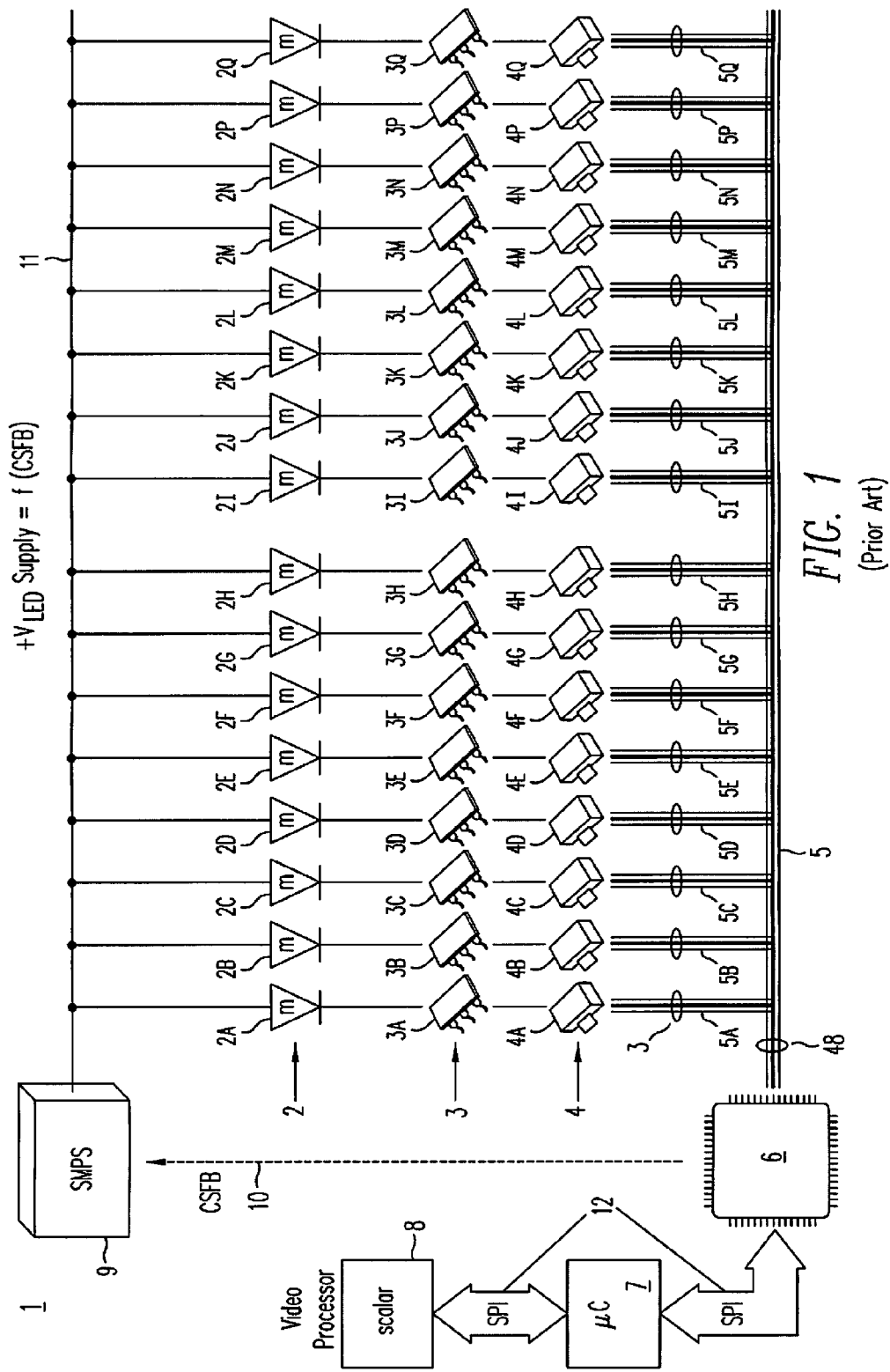
FIG. 1 illustrates a diagram of a prior-art multi-channel LED drive system for LCD backlighting using discrete DMOSFETs as integrated current sinks and protective voltage clamps.
Figure 2A:
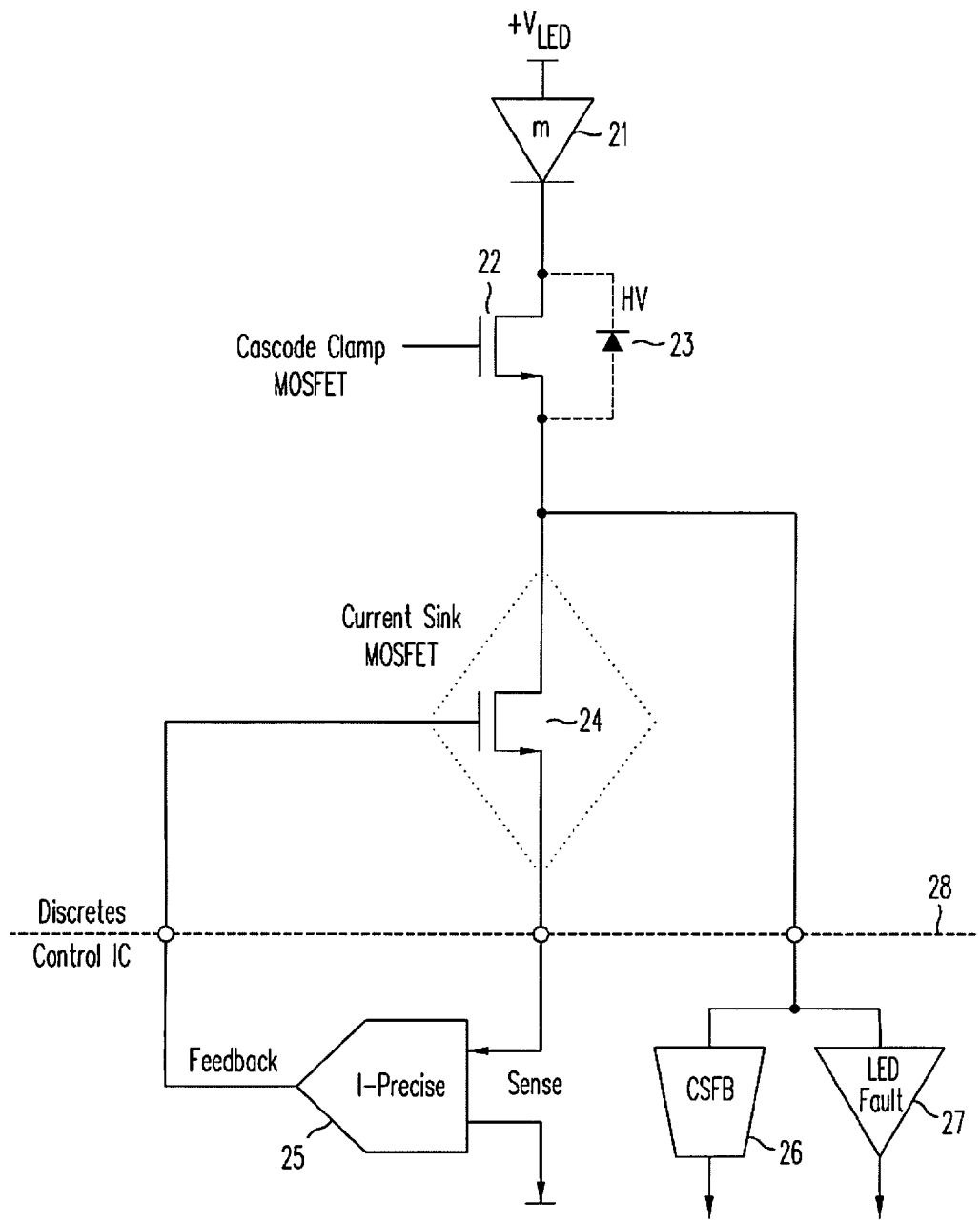
FIG. 2A is a schematic circuit diagram of an individual LED drive channel using a discrete DMOSFET as a current sink with a protective high-voltage cascode clamp DMOSFET.
Figure 2B:
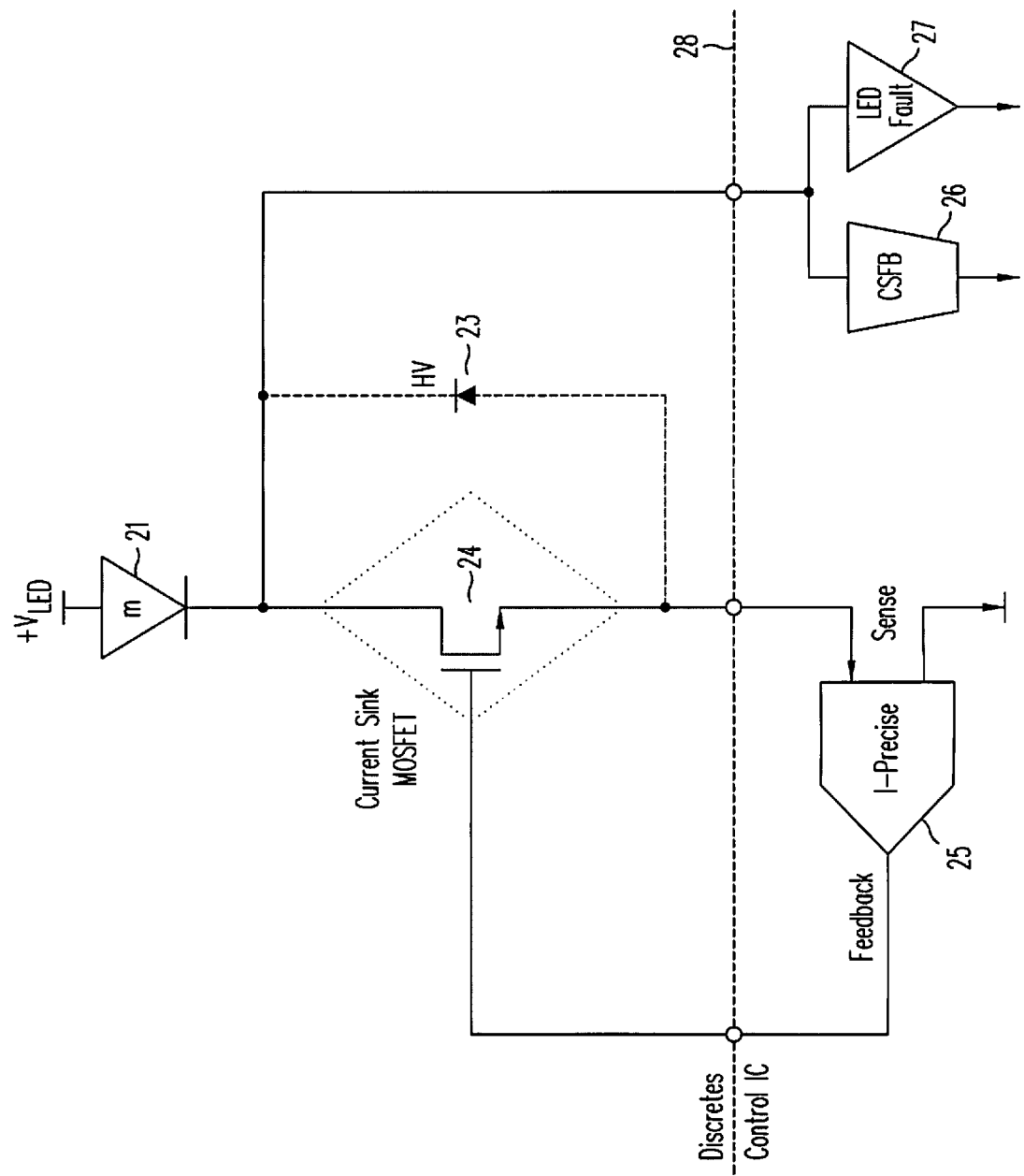
FIG. 2B is a schematic circuit diagram of an individual LED drive channel using a discrete high-voltage DMOSFET as a current sink without a cascode clamp.

The conventional architecture of FIG. 1, i.e. a centralized controller driving a number of discrete power MOSFETs, fails to meet even one of the above goals, primarily because it requires a central point of control, or "command center", for all digital and analog information processing. Necessarily, the command center IC must communicate with its μC host as well as directly sensing and driving every current sink MOSFET. This high degree of component connectivity demands a large number of input and output lines, necessitating high pin count packaging.

Distributed LED Drive Architecture Overview

The solution of the problems of the prior art systems is a "distributed" system, one lacking in central control. In the distributed system described herein, an interface IC translates information obtained from the host μC into a simple serial communications protocol, sending instructions digitally over a serial bus to any number of "intelligent" satellite LED driver ICs. The implementation of an LED driver meeting the above criteria is described in the above-referenced application Ser. No. 13/346,625. For purposes of clarity, the main concepts of that application relevant to the subject matter of the present application are reiterated here, including a description of the interface and LED driver ICs, and the operation of the "serial lighting interface" or SLI bus—a protocol containing parameters specifically relevant to controlling LED lighting.

In addition to facilitating the control of the LED drivers, the SLI bus is, in a preferred embodiment, connected in "daisy-chain fashion" back to the interface IC, so that fault conditions such as an open LED, a shorted LED, or an over-temperature fault occurring in any of the driver ICs can be communicated back to the interface IC and ultimately to the host IC. Each driver IC, in response to its SLI bus digital instructions, performs all the necessary LED driver functions such as dynamic precision LED current control, PWM brightness control, phase delay, and fault detection, locally, without the assistance of the interface IC.

Each LED driver IC also includes input and output pins for an analog current sense feedback (CSFB) signal. CSFB lines connect the LED driver ICs and the interface IC into a second daisy chain to allow the interface IC to provide a feedback signal to the high-voltage switch-mode power supply (SMPS), which dynamically regulates the voltage powering the LED strings. With this architecture, a dual-channel LED driver IC can easily fit into a standard SOP16 package or any similar leaded package.

Along with its SPI bus to SLI bus translation responsibilities, the interface IC supplies a reference voltage to all the LED driver ICs needed to insure good current matching, generates $V_{sync}$ and grey scale clock GSC pulses to synchronize their operation, and monitors every LED driver IC for potential faults. It also facilitates voltage to current translation of the CSFB signal into an ICSFB signal using an on-chip operational transconductance amplifier or OTA. The interface IC, even with all the above-described functionality, fits easily into an SOP16 package.

This application describes a method of improving the serial communication protocol and reducing the size of the circuitry associated with the physical interface of the SLI bus. These improvements are articulated below, under the heading "Improved SLI Bus Interface and Protocol". Initially, however, it is useful to describe the basic architecture of the serial bus controlled LED drivers, the video system interface IC and the first generation "fat" SLI bus protocol.

LED Driver with Integral Dimming and Fault Detection

Figure 3A:
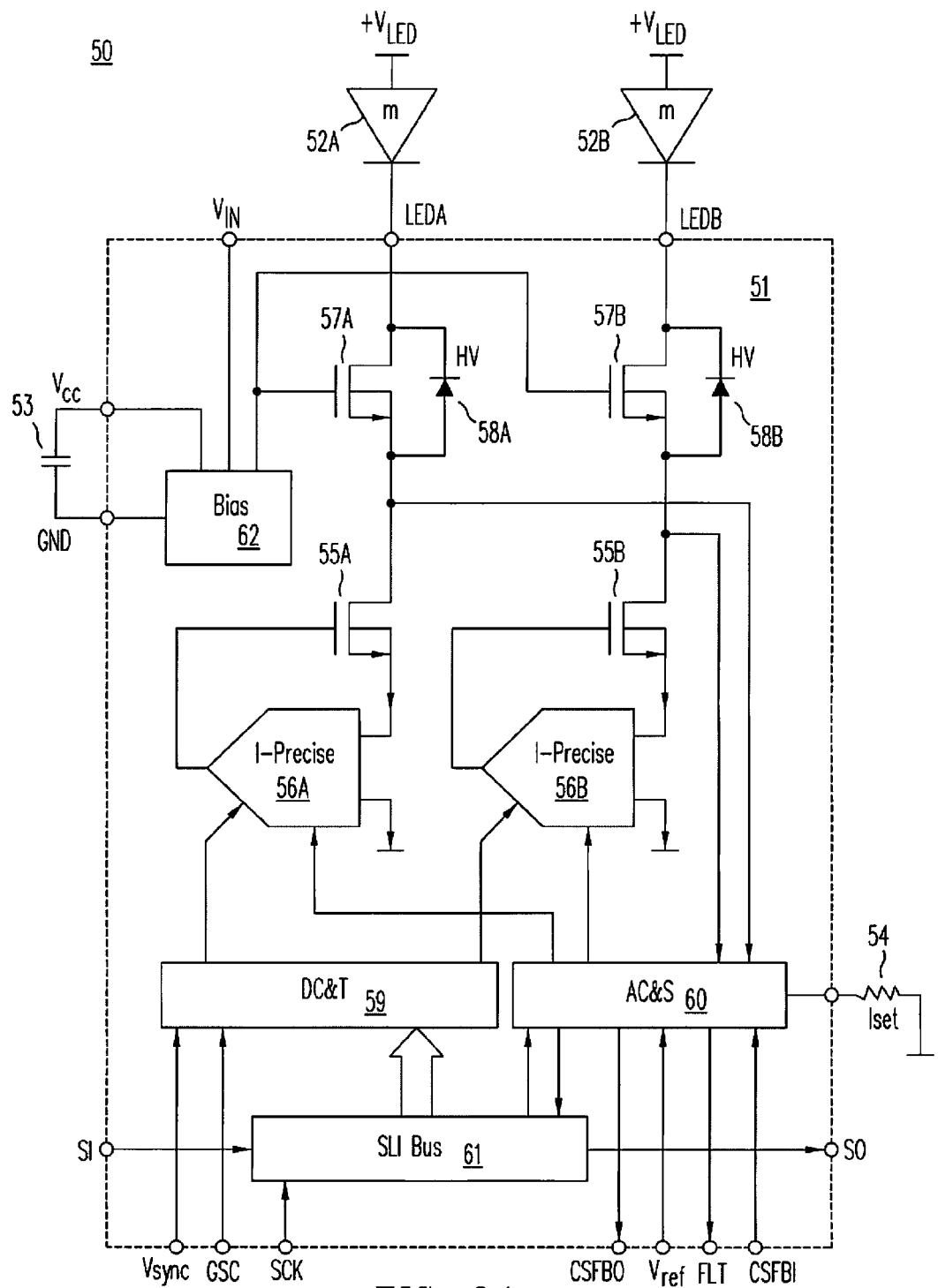
FIG. 3A is a schematic circuit diagram of a dual-channel high-voltage intelligent LED driver with serial bus control and a protective high-voltage cascode clamp DMOSFET.

An embodiment of an LED driver 50 according to this invention, formed in an LED driver IC 451, is shown in FIG. 3A. LED driver 50, which is integrated in an LED driver IC 51, is a dual channel driver comprising integrated current sink DMOSFETs 55A and 55B, cascode clamp DMOSFETs 57A and 57B with integral high-voltage diodes 58A and 58B, I-precise gate driver circuits 56A and 56B for accurate current control, an analog control and sensing circuit 60, and a digital control and timing circuit 59. An on-chip bias supply and regulator 62 powers the IC.

One of the channels includes current sink DMOSFET 55A, cascode clamp DMOSFET 57A and I-precise gate driver circuit 56A, which together drive an LED string 52A. The other channel includes current sink DMOSFET 55B, cascode clamp DMOSFET 57B and I-precise gate driver circuit 56B, which together drive an LED string 52B.

LED driver 50 provides complete control of two channels of 250 mA LED drive with 150V circuiting capability and ±2% absolute current accuracy, 12 bits of PWM brightness control, 12 bits of PWM phase control, 8 bits of current control, fault detection for LED open and LED short conditions and over-temperature detection, all controlled through a high-speed serial Sighting interface (SLI) bus shift register 61, and synchronized to other drivers by a common $V_{sync}$ and grey-scale clock (GSC) signal. In one embodiment cascode clamp DMOSFETs 57A and 57B are rated at 150V circuiting capability, although in other embodiments these devices can be sized for operation from 100V to 300V. The current rating of 250 mA is set by the power dissipation of the package and the mismatch in forward voltage in the two LED strings 52A and 52B.

In operation, LED driver 50 receives a stream of data on its serial input S1 pin which is fed into the input of SLI bus shift register 61. The data is clocked at a rate set by a serial clock signal SCK supplied by the interface IC (not shown in FIG. 3A). The maximum clock rate for the data depends on the CMOS technology used to implement shift register 61, but operation at 10 MHz is achievable even using 0.5 µm line width processes and wafer tabs. As long as the SCK signal continues to run, data will shift into SLI bus shift register 61 and ultimately exit the serial out pin SO on its way to the next LED driver in the serial daisy chain (not shown in FIG. 3A).

After the data corresponding to the specific LED driver IC arrives in SLI bus shift register 61, the interface IC momentarily stops sending the SCK signal. Thereafter, a $V_{sync}$ pulse latches the data from the SLI bus shift register 61 into data latches contained within the digital control and timing circuit 59 and the analog control and sensing circuit 60, the latches typically comprising flip flops or static RAM. Also at the time of the $V_{sync}$ pulse, any data previously written into the fault latches contained within the analog control and sensing circuit circuit 60 will be copied into the appropriate bits of SLI bus shift register 61.

When the interface IC resumes sending the serial clock SCK signal, the read and the write bits stored within SLI bus shift register 61 are moved into the next driver IC in the daisy chain. In a preferred embodiment, the daisy chain forms a loop connecting back to the interface IC. Sending new data into the daisy chain ultimately pushes the existing data residing in the SLI bus shift registers on through the loop and ultimately back to the interface IC. In this manner the interface IC can communicate with the individual LED driver ICs, setting LED string brightness and timing, and the individual driver ICs can communicate individual fault conditions back to the interface IC.

Using this clocking scheme, data can be shifted through a large number of driver ICs at a high speed without affecting the LED current or causing flicker, because the current and timing controlling the current sink DMOSFETs 55A and 55B only changes upon each new $V_{sync}$ pulse. $V_{sync}$ may vary from 60 Hz to 960 Hz with the grey scale clock frequency scaling proportionately, typically 4096 times the $V_{sync}$ frequency. Since $V_{sync}$ is slow, under 1 kHz, when compared to the frequency of the SCK signal driving the SLI bus shift registers, the interface IC can perform additional functions if desired, e.g. to modify and resend the data, or query the fault latch multiple times within a given V-sync pulse duration.

Commencing on the $V_{sync}$ pulse, the digital control and timing circuit 59 generates two PWM pulses to toggle the output of I-Precise gate driver circuits 56A and 56B on and off after the proper phase delay and for the proper pulse width duration, or duty factor D. I-Precise gate bias driver circuits 56A and 56B sense the current in current sink MOSFETs 55A and 55B respectively and provide the proper gate drive voltage to maintain a target current during the time I-precise gate driver circuits 56A and 56B are enabled by the PWM pulses from digital control and timing circuit 59. Operation of the I-Precise gate driver circuits 56A and 56B is thus similar to that of a "strobed" amplifier, being pulsed on and off digitally but providing a control function.

The peak current is set globally in all the LED drivers by the Vref signal and by the value offset resistor 54. In a preferred embodiment the Vref signal is generated by the interface IC. Alternatively, the Vref signal may be supplied by a discrete voltage reference IC or as an auxiliary output from the AC/DC converter module The specific current in any LED string can be further controlled through the SLI bus shift register by the Dot register, using an 8 to 12 bit word that adjusts the current sink DMOSFET's current to a percentage from 0% to 100% of the peak current value. In this manner, precise digital control of the LED current, emulating the function of a current mode digital-to-analog converter or "current DAC", is possible using this architecture. In LCD backlighting applications, this feature can be used for calibrating the backlight brightness, for improving backlight uniformity, or for operating in 3D mode. In other cases, the LED drivers may be used to drive LED strings in signs and "wall-of-LED" display, generally comprising a mix of red, green and blue LEDs. in signage applications the LEDs form the image so that no LCD is needed.

Referring to FIG. 3A, the current flowing through LED string 52A is controlled by current sink DMOSFET 55A and corresponding I-Precise gate driver circuit 56A. Similarly, the current flowing through LED string 52B is controlled by current sink DMOSFET 55B and corresponding I-Precise gate driver circuit 56B. The maximum voltage impressed upon current sinks DMOSFETs 55A and 55B is limited by cascode clamp DMOSFETs 57A and 57B, respectively. So long that the number of LEDs "m" is not too large, the voltage $+V_{LED}$ will not exceed the breakdown voltages of PN diodes 458A and 458B, and the maximum voltage on the current sink DMOSFETs 55A and 55B will be limited to around 10V, one threshold voltage below the gate bias impressed on cascode clamp DMOSFETs 57A and 57B by bias circuit 62, which in this embodiment is 12V. Bias circuit 62 also generates a 5 V Vcc supply voltage to operate its internal circuitry from the 24V $V_{IN}$ input, using a linear voltage regulator and a filter capacitor 53.

The drain voltages on current sink DMOSFETs 55A and 55B are monitored by analog control and sensing circuit 60 and compared to an over-voltage value stored in a latch within analog control and sensing circuit 60. The over-voltage value is supplied from SLI bus shift register 61. If the drain voltages of current sink DMOSFETs 55A and 55B are below the programmed values, the LED strings 52A and 52B are operating normally. If however, the drain voltage of either current sink DMOSFET 55A or current sink DMOSFET 55B rises about the programmed value, one or more of LED strings 52A and 52B is shorted, and a fault is detected and recorded for that specific channel. Likewise if either the I-Precise gate driver circuit 56A or the I-Precise gate driver circuit 56B cannot maintain the required current in one of LED strings 52A or 52B, i.e. the LED string is operating "Undercurrent", this means an LED in one of strings 52A or 52B has failed open and the circuit continuity has been lost. The corresponding channel is then turned off, its CSFB signal is ignored, and the fault is reported. Sensing this "undercurrent" can be performed by monitoring the output of the gate buffer devices within I-Precise circuits 56A and 56B for saturation. This condition means that the buffer is driving the gate of the corresponding current sink DMOSFET as "full on" as it can. Alternatively, an undercurrent condition can be detected by monitoring the voltage drop across the input terminals of the I-Precise circuits. When the input voltage to I-precise circuits 56A and 56B drops too low, the undercurrent condition has occurred, and an open LED fault is indicated.

If an over-temperature condition is detected, a fault is reported and the channel is left on and conducting unless the interface IC sends a command to shut down that channel. If, however, the temperature continues to rise to dangerous levels, analog control and sensing circuit 60 will disable the channel independently and report the fault. Regardless of the nature of a fault, whether a shorted LED, an open LED, or an over-temperature condition, whenever a fault occurs an open drain MOSFET within analog control and sensing circuit 60 will activate and pull the FLT pin low, signaling to the interface IC and optionally to the host µC that a fault condition has occurred. The FLT pin is a system-interrupt signal informing the system IC whenever a fault condition has occurred in one or more of the LED driver ICs. Normally the line is held high, i.e. biased to Vcc through a high value resistor. Whenever any LED driver experiences a fault condition, either from a shorted LED, an open LED, or an over-temperature condition, the specific LED driver IC pulls the line low by enabling a grounded N-channel MOSFET such as MOSFET 219 in FIG. 6.

After FLT is pulled low, the interface IC can query the LED driver ICs through SLI bus interface 61 to ascertain what LED driver IC is experiencing a fault condition and what kind of fault has occurred. The Interface IC then communicates this information back to the host microcontroller through the SPI bus interface enabling the system to make decisions as to what action, if any, should be taken in response to the fault occurrence. Since the FLT line on every LED driver IC employs an open drain MOSFET to actively pull the line low in the event of a fault, in the absence of a fault the line is pulled high by a high-value internal resistor. As such, the FLT input to interface IC 101 in FIG. 4 can be paralleled with the interrupt input pin of the system μC, in which case any fault generated by the LED driver ICs not only informs interface IC 101 of the fault condition, but can also generate an interrupt signal in the μC, alerting it to the condition as well. Using the FLT line therefore provides an immediate indication of the occurrence of a fault in an LED driver IC while the SLI bus and SPI bus are used to gather additional information before deciding what action to take. In this way, full fault management is enabled without the need for a fully integrated driver IC.

Analog control and sensing circuit 60 also includes an analog current sense feedback (CSFB) signal, which is equal to the lowest voltage among the drain voltages of the two current sink DMOSFETs 55A and 55B and the voltage at the CSFBI input pin. The CSFB signal is passed to the CSFBO output pin. In this way, the lowest current sink voltage in LED strings 52A and 52B is passed to the input of the next LED driver and ultimately back to the system SMPS to power the $+V_{LED}$ supply rail.

In the manner described, LED driver 50 with integral dimming and fault detection capability is realized without the need for a central controller IC.

An alternate implementation of an LED driver 80 meeting the above criteria is shown in FIG. 38. LED driver 80, which is integrated in an LED driver IC 81, is a dual-channel driver with integrated current sink DMOSFETs 87A and 87B but without cascode clamp MOSFETs. Instead DMOSFETs 87A and 87B contain integral high-voltage diodes 88A and 88B that are designed to sustain high-voltages in when DMOSFETs 87A and 87B are in an off condition. Typically, such a design is most applicable to operation below 100V, but it can be extended to 150V if required. As in the LED driver IC 50 of FIG. 3A, I-precise gate driver circuits 86A and 868 facilitate accurate current control, controlled by an analog control and sensing circuit 85, and a digital control and timing circuit 89. An on-chip bias supply and regulator 84 powers the LED driver IC 81, in this case from Vcc, not from the 24V input as in driver IC 51. Aside from lacking cascode clamp DMOSFETs, driver IC 80 operates similar to driver IC 50, controlled through its SLI bus 90.

SLI Bus Interface IC and System Application

Figure 3B:
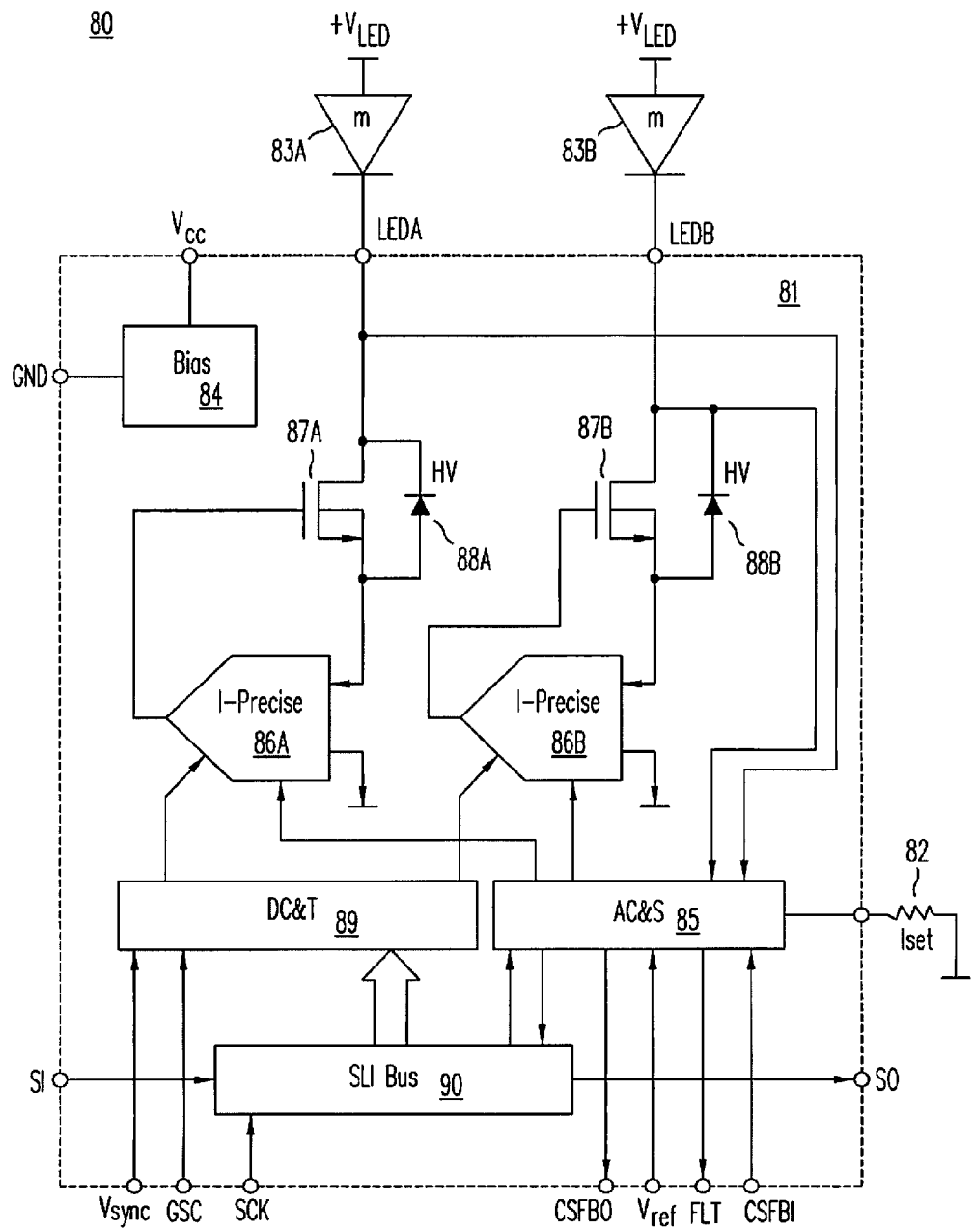
FIG. 3B is a schematic circuit diagram of a dual-channel high-voltage intelligent LED driver with serial bus control and a high-voltage current sink MOSFET without a cascode clamp MOSFET.
Figure 4A:
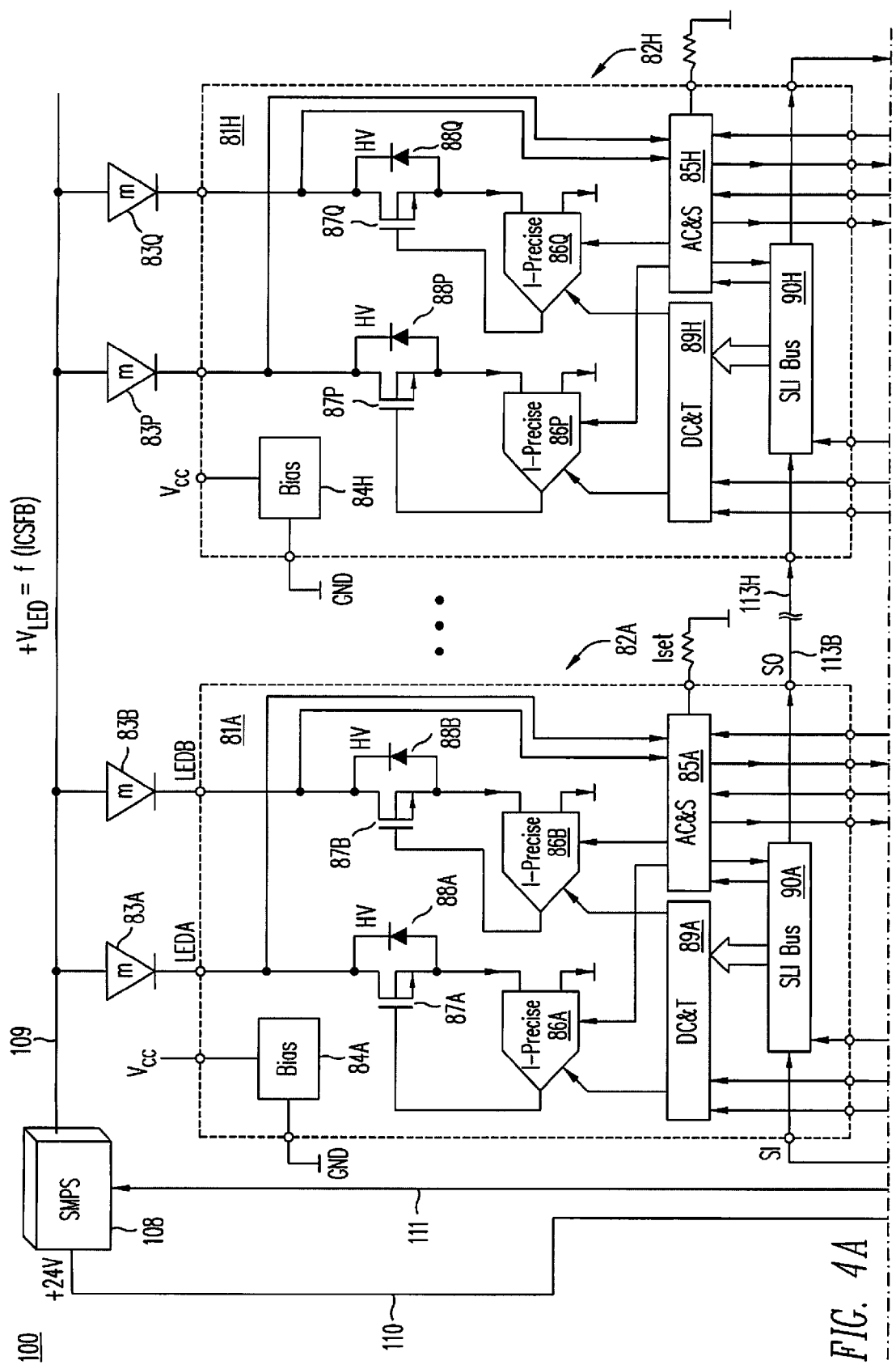
FIG. 4 is a schematic circuit diagram of a multi-channel LED backlight system comprising intelligent LED drivers with a current sense feedback (CSFB) system and a SLI serial bus.

FIG. 4 illustrates a distributed multi-channel LED backlight driver system 100 in accordance with this invention. Shown are an interface IC 101 for driving a series of LED driver ICs 81A-81H powered by a common switch-mode power supply (SMPS) 108. Although only LED driver ICs 81A and 81H are shown in FIG. 4, it is understood that similar driver ICs 81B-81G are located between driver ICs 81A and 81H. Each of LED driver ICs 81A-81H has integral dimming and fault detection capability and is similar to the LED driver 80 shown in FIG. 3B. LED driver ICs 81A-81H are sometimes referred to herein collectively as LED driver ICs 81 or individually as LED driver IC 81.

Five common signal lines 107, comprising three digital clock lines (SCK, GSC and $V_{sync}$), one digital fault line (FLT), and one analog reference voltage line (Vref) connect interface IC 101 to LED driver ICs 81A-81H. A timing and control unit 124 generates the $V_{sync}$ and GSC signals in synchronism with data from a host μC (not shown), received via serial peripheral bus (SPI) bus interface 122. Timing and control unit 124 also monitors the fault interrupt line FLT to immediately detect a potential problem in one of LED strings 81A-81Q. A voltage reference source 125 provides a voltage reference to the system globally over the Vref line in order to insure good channel-to-channel current matching. A bias supply unit 126 powers interface IC 101 through a $V_{IN}$ line that is contented to a fixed +24V supply rail 110 supplied by SMPS 1087. Bias circuit 126 also generates regulated supply $V_{cc}$, preferably 5V, to power LED drivers 81A-81H. The $V_{cc}$ supply is filtered by a capacitor 102.

In this embodiment, each of LED driver ICs 81A-81H comprises two channels of high-voltage current control, including current sink DMOSFETs 87A-87Q with integral HV diodes 88A-88Q, I-Precise gate driver circuits 86A-86Q, digital control and timing (DC&T) circuits 89A-89H, analog control and sensing (AC&S) circuits 85A-85H and serial lighting interface (SLI) buses 90A-90H. Like the LED driver IC 81 shown in FIG. 3B, the LED driver ICs 81A-81H lack a cascode clamp. Nonetheless the system 100 could also be fabricated with LED driver ICs similar to LED driver IC 51, shown in FIG. 3A, except that in that case the 24V $V_{IN}$ supply, rather than $V_{cc}$, would be used to power the LED driver ICs and bias the gates of the cascode clamp DMOSFETs.

An SLI bus 113, comprising signal lines 113A-113I, links the LED driver ICs 81A-81H together in a daisy chain. In the embodiment shown in FIG. 4, the serial output terminal of SLI unit 123 (the SO pin of interface IC 101) connects via a signal line 113A to the SI input of LED driver IC 81A, the SO output of LED driver IC 81A connects via a signal line 113B to the SI input of LED driver IC 81B (not shown), and so on. At the end of the daisy chain, the SO output of LED driver IC 81H connects via a signal line 113I to the serial input terminal of SLI unit 123 (the SI pin of interface IC 101. In this manner, SLI bus 113- forms a complete loop, emanating from the interface IC 101, running through each of LED driver ICs 81A-81H and back to interface IC 101. Thus, shifting data out of the SO pin of interface IC 101 concurrently returns a bit string of equal length back into the S1 pin of interface IC 101.

SLI circuit 123 also generates the SLI bus clock signal SCR as required. Because the LED driver ICs 81A-81H have no addresses, the number of bits clocked through the SLI bus must correspond to the number of devices being driven, with one bit being advanced for each SCK pulse. The number of devices being driven may be adjusted through software programming the data exchange in SP1 bus 122, or by hardware modification to interface IC 101. In this manner the number of channels within system 100 can be varied flexibly to match the size of the display.

Modifying the registers in SLI bus circuit 123 to shift out fewer or more bits, while relatively straight forward, still requires a modification in the manufacturing of interface IC 101. An alternative approach involves employing a programmable interface using software to adjust the driver for accommodating fewer or more LED driver ICs in the daisy chain.

Current sense feedback to SMPS 108 relies cm an analog daisy chain. The CSFBI input pin of LED driver IC 81H is tied via CSFB line 112I to $V_{cc}$, CSFB line 112H connects the CSFBO output pin of LED driver IC 81H to the CSFBI input pin of LED driver IC 81G and so on. Lastly, CSFB line 112A connects the CSFBO output pin of LED driver IC 81A to the CSFBI input pin of interface IC 101. The voltage level of the CSFB signal drops whenever it passes through one of LED driver ICs 81A-81H driving an associated LED string 83A-83Q that has a higher forward-voltage Vf than the LED strings associated with the LED drivers that the CSFB signal has previously passed through. Since LED driver ICs 81A-81H are arranged in a daisy chain, the CSFB signal rachets down as it passes from the LED driver IC 81H to the LED driver IC 81A. The CSFB signal in the final CSFB line 112A represents the forward-voltage Vf of the LED string 83A-83Q having in highest Vf in the entire LED array. Operational transconductance amplifier (OTA) 127 converts the final CSFB signal in CSFB line 112A into a current feedback signal ICSFB 111, driving the voltage $+V_{LED}$ on line 109 at the output of SMPS 108 to the optimum voltage for flicker free lighting without excess power dissipation. CSFB lines 112A-112I are sometimes referred to herein collectively as CSFB line 112.

Figure 5:
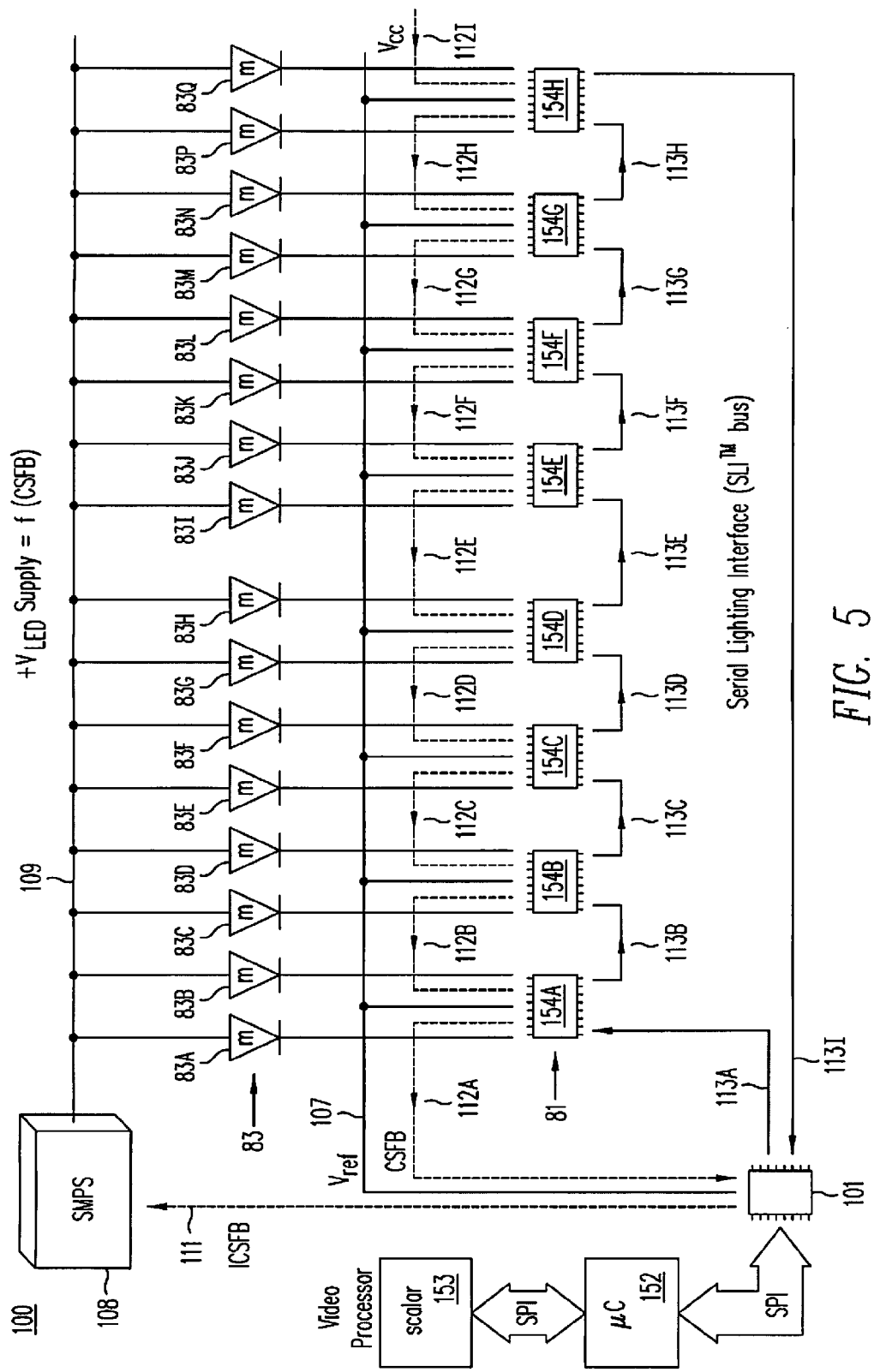
FIG. 5 is a simplified schematic diagram of the system shown in FIG. 4, illustrating the significantly reduced build-of-materials (BOM) that can be achieved using intelligent LED drivers with SLI serial bus control and a low pin-count interface IC package.

The resulting system, shown in the simplified schematic diagram of FIG. 5 achieves independent control and constant current drive of 16 LED strings 83A-83Q using only eight small LED driver ICs 81A-81H, all controlled by interface IC 101 through SLI bus 113 (including signal lines 113A-13I) in response to a host μC 152 and a scalar IC 153. Only two analog signals are present in the system, a common reference voltage Vref on line 107, and the ICSFB signal 111 that controls the SMPS 108 to produce the $+V_{LED}$ output on line 109. As described above, the ICSFB signal 111 is generated in the interface IC 101 from the CSFB signals on lines 112A-112H. With few analog signals and no discrete DMOSFETs with high impedance inputs, the LED driver system 100 is relatively immune to noise.

As shown in FIG. 5, the LED driver system 100 can be fabricated using only nine SOP16 IC packages (one interface IC and eight LED driver ICs) to drive 16 LED strings. Compared to the multi-chip LED driver system 1 of FIG. 1, which uses 32 discrete MOSFETs and a 72 pin controller IC, the cost of fabrication is greatly reduced by the new architecture. With significantly fewer components, system reliability is also enhanced. System 100 is also easy to deploy since the proprietary SLI bus protocol is used only between interface IC 101 and the satellite LED drivers 81A-81H. The μC 152 communicates with the interface IC 101 and the scalar IC 153 via the SPI bus.

Without the cascode clamp DMOSFETs, the LED driver ICs 81A-181H in FIG. 5 need only a 5V $V_{cc}$ input. As a result, interface IC 101 can perform the 24V to 5V voltage conversion and distribute its 5V supply rail $V_{cc}$ to LED driver ICs 81A-81H. By eliminating the need for step-down regulation in the LED driver ICs 81A-81H, LED driver ICs 81A-81H can be made smaller and the need an external filter capacitor can be eliminated, saving one package pin.

"Fat" SLI Bus Operation

To eliminate the necessity of high pin count packages, we disclose herein a new series communication bus and protocol specifically designed for driving LEDs in backlight and display applications. The "serial lighting interface" bus, or SLI bus, uses a serial communications method comprising a clocked shift register with a serial input and output, and a clock to control the timing and rate of data transfer.

Figure 6:
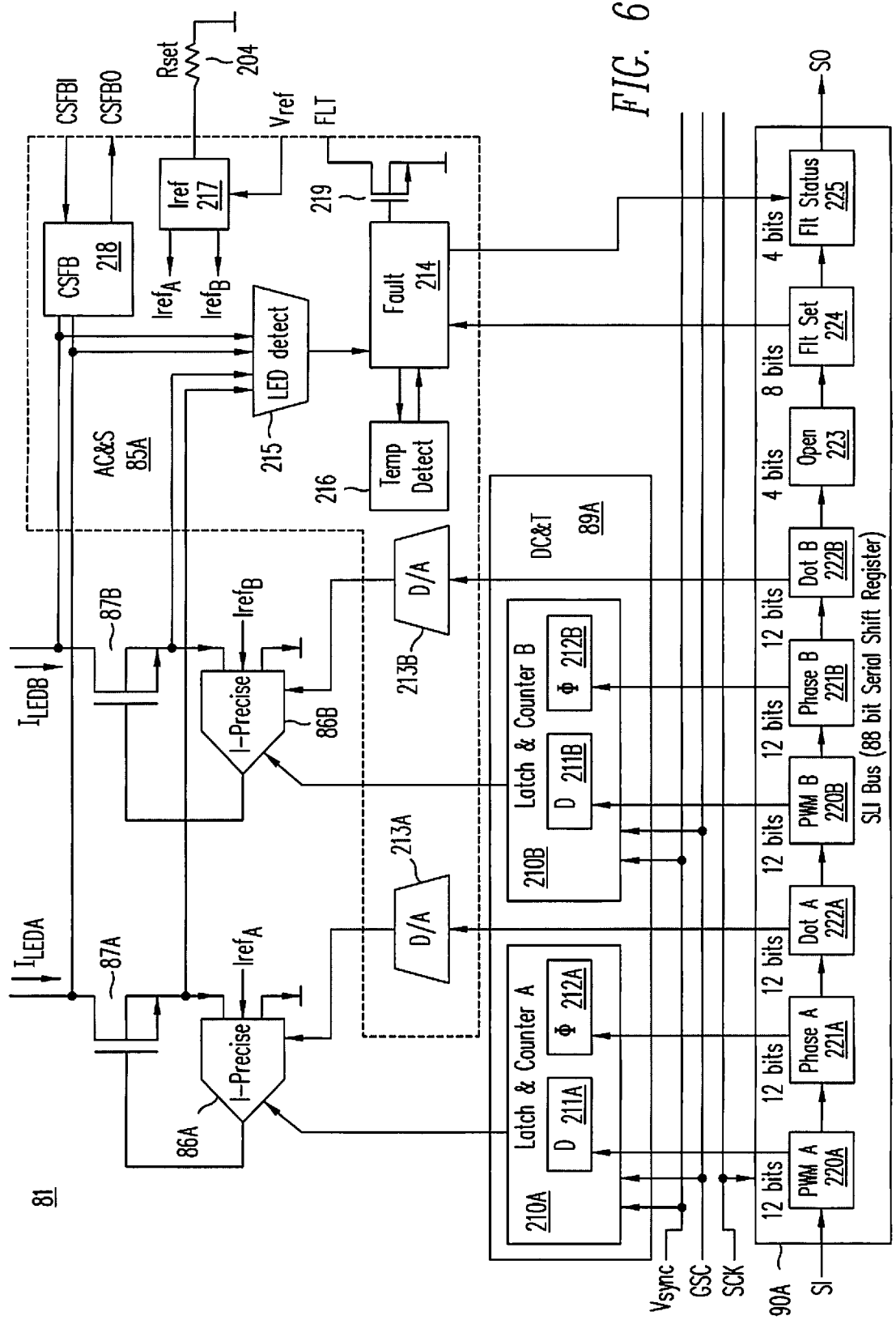
FIG. 6 is a block diagram illustrating "fat" SLI bus registers with a corresponding digital control and timing (DC&T) and analog control and sensing (AC&S) circuitry in a dual-channel intelligent LED driver.

The operation of the SLI bus is illustrated in FIG. 6, which also provides greater detail of the construction and operation of exemplary embodiments of SLI bus shift register 90A, digital control and timing (DC&T) circuit 89A and analog control and sensing (AC&S) circuit 85A shown in FIG. 4. It will be understood that similar circuitry is used for SLI bus shift registers 90B-90H, digital control and timing circuits 89B-89H and analog control and sensing circuits 85B-85H shown in FIG. 4. (SLI bus shift registers 90A-90H are sometimes referred to collectively as SLI bus 90.) FIG. 6 shows a dual channel LED driver IC, comprising current sink DMOSFETs 87A and 87B and I-Precise gate driver circuits 86A and 86B, but LED driver ICs controlling a different number of channels may be implemented in a similar fashion.

The circuitry shown in FIG. 6 is mixed signal, combining both digital and analog signals. SLI bus shift register 90A is connected to DC&T circuit 89A by several parallel data busses, typically 12 bits wide, and also connected to AC&S circuit 85A by a variety a parallel data busses ranging from 4 bits to 12 bits wide.

The outputs of DC&T circuit 89A digitally toggle I-Precise gate driver circuits 86A and 86B and current sink DMOSFETs 87A and 87B on and off with precise timing synchronized by the $V_{sync}$ and grey scale clock (GSK) signals. The current sink DMOSFETs 87A and 87B control the current in two strings of LEDs (not shown) in response to analog signals from AC&S circuit 85A, which control the I-Precise circuits 86A and 86B and hence the gate drive signals for current sink DMOSFETs 87A and 87B. The gate drive signals are analog, and an amplifier with feedback is used to insure that the current in each of current sink DMOSFETs 87A and 87B is a fixed multiple of reference currents $Iref_A$ and $Iref_B$, respectively, which are also supplied by AC&S circuit 85A.

While FIG. 6 illustrates only current sink MOSFETs 87A and 87B, the circuitry shown is compatible with either the cascode clamped LED driver 50 shown in FIG. 3A or the high voltage LED driver 80 shown in FIG. 3B. To implement the cascode clamped version, two high-voltage N-channel DMOSFETs would be connected in series with current sink DMOSFETs 87A and 87B, with the source terminals of the high-voltage N-channel DMOSFETs tied to the drain terminals of the current sink DMOSFETs 87A and 87B, and with the drain terminals of the high-voltage N-channel DMOSFETs tied to the anodes of the respective LED strings being driven.

In operation, data is clocked into SLI bus shift register 90A through the serial input pin SI at the rate of the SCK clock signal. This includes 12 bit PWM on time data into registers 220A and 220B for channel A and channel B, 12 bit phase delay data into registers 221A and 221B for channel A and channel B, 12 bit "dot" current data into registers 222A and 222B for channel A and channel B, along with 12 bits of fault information, comprising 8 bits into fault settings register 224 and 4 bits into fault status register 225. Data within these registers are clocked out of the SO pin as new data is clocked in. Suspending the SCK signal holds data statically within the shift registers. The terms "channel A" and "channel B" are arbitrary and are only used to identify the outputs and their corresponding data in the SLI data stream.

Upon receiving a $V_{sync}$ pulse, data from PWM A register 220A is loaded into D latch 211A and data from Phase A register 221A is loaded into Φ latch 212A of Latch & Counter A circuit 210A. At the same time, data from PWM B register 220B is loaded into D latch 211B and data from Phase B register 221B is loaded into Φ latch 212B of Latch & Counter B circuit 210B. Upon receiving subsequent clock signals on GSC grey scale clock, Latch & Counters 210A and 210B count the number of pulses in their Φ latches 212A and 212B and thereafter enable current flow in I-Precise circuits 86A and 86B, respectively, illuminating the associated LED string in Channel A or B. The channels remain enabled and conducting for the duration of the number of pulses stored in D latches 211A and 211B, respectively. Thereafter, the outputs are toggled off and wait for the next $V_{sync}$ pulse to repeat the process. DC&T circuit 89A therefore synthesizes two PWM pulses to the gates of DMOSFETs 89A and 89B in accordance with the data in SLI bus shift register 90A.

Also synchronized to the $V_{sync}$ pulse, the data stored in Dot A and Dot B registers 222A and 222B is copied into D/A converters 213A and 213B, setting the current in DMOSFETs 87A and 87B. The D/A converters 213A and 213B are discrete circuits that provide a precise fraction of Iref to set the currents in the associated LED strings. Alternatively, in a preferred embodiment DMOSFETs 87A and 87B have gate widths divided into various sections using binary weighting, and the proper combination of these gate sections is charged to set the fraction of the maximum current desired. The reference current Iref, that represents the maximum channel current, is set by Rset resistor 204 and the $V_{ref}$ input to a reference current source 217.

The fault detection circuitry includes LED fault detection circuit 215, which compares the source voltages of current sink MOSFETs 87A and 87B against the value stored in fault latch circuit 214. The data in fault latch circuit 214 is copied from the fault settings register 224 at each $V_{sync}$ pulse. Temperature detection circuit 216 monitors the temperature of the LED driver IC 81, in which the circuitry shown in FIG. 6 is included. Detection of a fault immediately triggers open drain fault flag MOSFET 219 to turn on and pull the FLT line low, generating an interrupt. The data in fault latch circuit 214 is written into the fault status register 225 on the following $V_{sync}$ pulse.

Implementation of the dot function and digital-to-analog conversion is further detailed in the above-referenced application Ser. No. 13/346,625. The application also includes detailed circuit implementation examples of fault latch circuit 214 and LED fault detection circuit 215, reference current source 217, and current sense feedback (CSFB) circuit 218.

In the manner described, a serial data bus is used to control the current, timing, and duration of a number of LED strings, as well as to detect and report the occurrence of fault conditions in the LED strings. The SLI protocol is flexible, requiring only that the data sent through the SLI bus shift register 514A matches the hardware being controlled, specifically that the number of bits sent per driver IC matches the bits required by each driver IC, and that the total number of bits sent for one $V_{sync}$ period matches the number of bits sent per driver IC times the number of driver ICs.

For example, in the circuitry of FIG. 6, the protocol including dot correction, fault setting and fault reporting comprises 88 bits per dual channel driver IC, i.e. 44 bits per channel or LED string. If eight dual-channel driver ICs, controlling sixteen strings of LEDs, are connected into a single SLI bus loop, the total number of bits shifted out of the interface IC and through the SLI bus during each $V_{sync}$ period is 8 times 88 or 704 bits, less than a kilo-bit. If the SLI bus is clocked at 10 MHz, the entire data stream can be clocked through every driver IC and to every channel in 70.4 microseconds, or 4.4 microseconds per channel.

While the serial data bus communicates at "electronic" data rates, i.e. using MHz clocks and Mbits-per-second data rates, the $V_{sync}$, or "frame" rate used to control changing the image on the LCD display panel occurs at a much slower pace, because the human eye cannot perceive changing images quickly. While most people are unaware of flicker at 60 Hz frame rates, i.e. sixty image frames per second, in A versus B comparisons, to many people 1.20 Hz TV images appear more "clear" than 60 Hz TV images, but only using direct comparisons. At even higher $V_{sync}$ rates, e.g. 240 Hz and up, only "gamers" and video display "experts" claim to see any improvement, mostly manifest as reduced motion blur. It is the large ratio between electronic data rates and the relatively slow video frame rate that makes serial bus communication to the backlight LED drivers possible.

For example, at 60 Hz, the each $V_{sync}$ period consumes 16.7 milliseconds, orders-of-magnitude longer than the time needed to send all the data to all the driver-ICs. Even in the most advanced TVs running with an 8× scan rate and in 3D mode, at 960 Hz each $V_{sync}$ period consumes 1.04 milliseconds, meaning up to 236 channels can be controlled in real time. This number of channel s greatly exceeds the driver requirements for even the lamest HDTVs.

The 88-bit per dual-channel "fat" protocol used in the SLI bus shift register 90A of FIG. 6 enables the interface IC to write or read all the data in every register of every channel once during every $V_{sync}$ period. The term "fat" refers to the content of the digital word used to control each channel. The fat protocol requires that every variable and register be specified in each packet of data transmitted from the interface IC 101 to one of driver ICs 81A-81H, even if nothing changed from the prior data packet.

If a reduced data protocol is used, i.e. a protocol requiring fewer bits per channel, sending data to every channel takes even less time. Since the fat protocol has no timing limitations because of the relatively slow $V_{sync}$ refresh rate, there is no data rate benefit. Using fewer bits in the serial communication protocol does however reduce the size of the digital shift registers and data latches in the driver ICs, reducing chip area and lowering overall system cost.

Figure 7B:
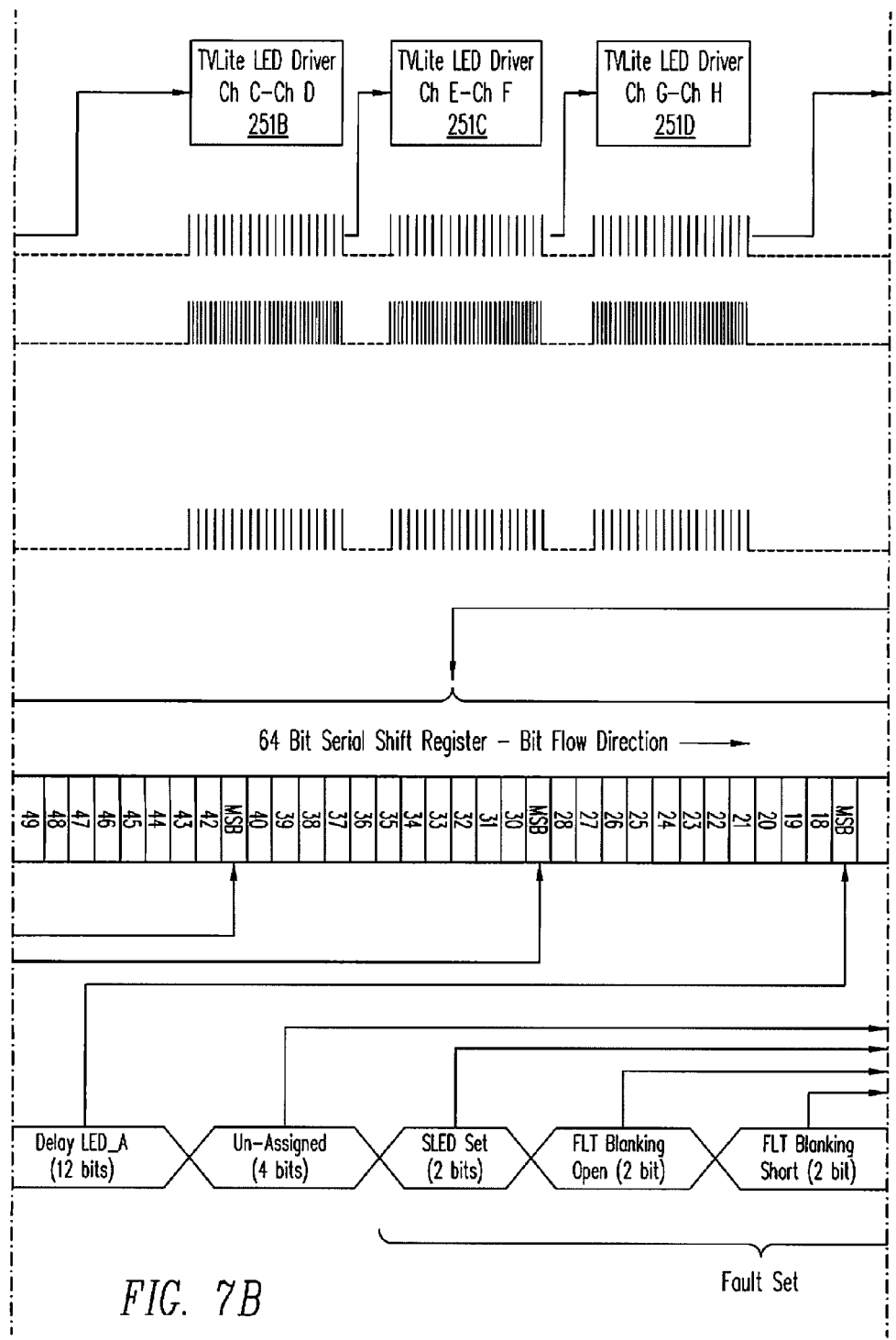
FIG. 7 is a timing diagram for an SLI bus controlling multiple LED drivers.
Figure 7C:
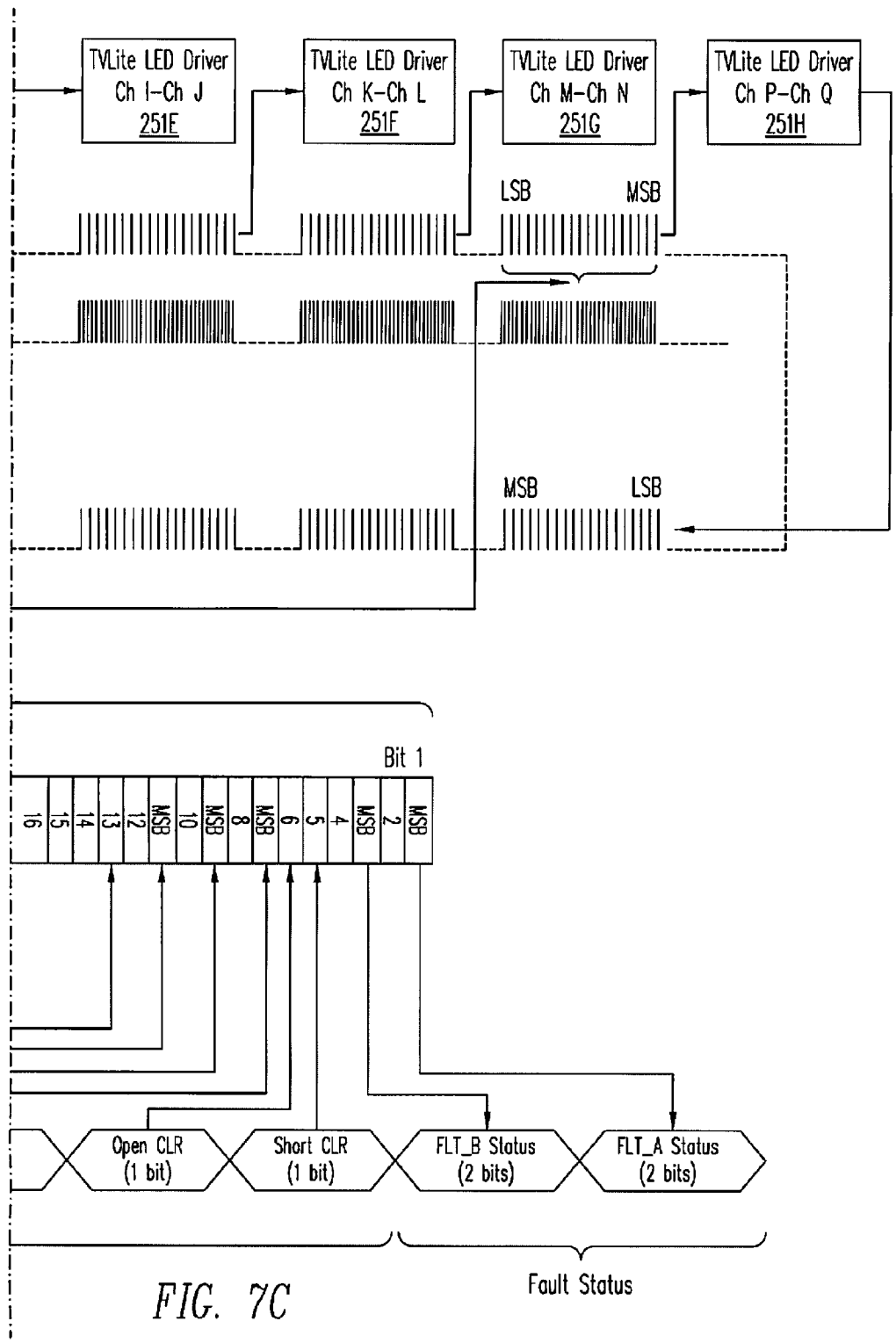

For example, an alternative data protocol for an SLI bus using 64 bits rather than 88-bits is shown in the LED driver system 250 of FIG. 7, which includes LED driver ICs 251A-251H and an interface IC 252. As shown by the data sequence 253, the protocol still uses 12 bits for PWM brightness duty factor, 12 bits for phase delay, 8 bits for fault setting, and 4 bits for fault status, but it omits the 12-bit Dot correction data. As a result, individual channel current setting and brightness calibration of each LED string is not available in this implementation.

In LCD panel manufacturing, many manufacturers believe electronically calibrating a display for uniform brightness is too expensive and is therefore not commercially practical. Global display brightness can still be calibrated by adjusting the value of a panel's current set resistors, such as set resistor 204 shown in FIG. 6, but uniformity in backlight brightness cannot be controlled through the microcontroller or interface IC. Instead, panel manufacturers manually "sort" their LED supply into bins of LEDs having similar brightness and color temperature.

It should be noted that removing Dot data from the SLI bus protocol does not prevent overall display brightness control or calibration. Adjusting the system's global reference voltage Vref can still perform global dimming and global current control. For example, in the system shown in FIG. 6, adjusting the value of $V_{ref}$ affects the value of the reference current $I_{ref}$ produced by reference current source 217. If the reference voltage $V_{ref}$ is shared by all of the driver ICs, adjusting $V_{ref}$ will uniformly affect every driver IC and consequently the panel's overall brightness, independent of the PWM dimming control.

Returning to FIG. 7, system 250 illustrates SLI bus data communication from a common system interface IC 252 to a serially-connected string of eight driver ICs 251A-251H. As shown, the SLI-bus serial output SO of interface IC 252 generates a sequence of pulses and feeds those pulses to the input pin of driver IC 251A synchronized to the clock pulses on serial clock pin SC. The SLI bus serial output of driver IC 251A in turn sends its internal shift register data out of its SO pin and into the SI input pin of driver IC 251B. Similarly the SO output of driver IC 251B connects to the input pin of driver IC 251C and so on, collectively forming a "digital" daisy chain. The last driver in the chain 251H, sends its SLI bus data from its SO pin back to the S1 pin of interface IC 252 to complete the loop.

In the operation of system 250, interface IC 252 sends data out of its SO pin in response to instructions it receives on its SPI bus interface to the system's scalar or video IC. The data for every driver IC and LED string is clocked from the SO output of interface IC 252 to every driver IC 251A-251H in sequence. All data must be sent to all driver ICs within one single $V_{sync}$ period. Because the SLI bus is a serial protocol, the first data sent out from interface IC 252 represents the bits used to control driver IC 251H. After 64 clock pulses the data destined for driver IC 251H is present in the SLI bus shift register of driver IC 251A. Interface IC 252 then outputs the data for driver IC 251G on its SO pin synchronized to another 64 pulses on the SC clock pin. During these 64 clock pulses, the data intended for driver IC 251H moves from the SLI bus shift register within driver IC 251A and temporarily into the SLI bus shift register within driver IC 251B. This process is repeated until at last, the data for driver IC 251A is output on the SO pin of interface IC 252 synchronized to the last 64 pulses on the SC clock.

In the last 64 bit "write cycle" of a given $V_{sync}$ period, the data for driver IC 251A is output from the SO pin and loaded into the SLI bus shift register within driver IC 251A, the data for driver IC 251B moves from the SLI bus shift register within driver IC 251A and into the SLI bus shift register within driver IC 251B, and so on. Similarly, during this last 64 bits of the write cycle, the data for driver 251H moves from the SLI bus shift register within driver IC 251G into the SLI bus shift register within driver IC 251H. Therefore, after 8×64 clock pulses, or 512 poises on the SC pin, all of the data has been loaded into the SLI bus shift registers of the corresponding driver ICs. Nonetheless, this data is not yet controlling the operation of the LED strings.

Only after the next $V_{sync}$ pulse is supplied to the driver ICs, is this newly loaded data copied from the SLI bus shift registers and into the active latches of their corresponding driver ICs for controlling LED brightness, timing and fault management. Specifically, the data in the SLI bus shift register within driver IC 251A is copied into the active latches affecting the operation of LED strings controlled by channels A and B, the data in the SLI bus shift register within driver IC 251B is copied into the active latches affecting the operation of LED strings controlled by channels C and D, and so on. Thereafter, the SLI bus shift registers are ready to be rewritten with new data for the next $V_{sync}$ period. For the rest of the present $V_{sync}$ period, the LED strings will be controlled according to the data received prior to the last $V_{sync}$ pulse.

In this manner, the SLI bus data communication timing and clocking is asynchronous with the system's $V_{sync}$ period and the $V_{sync}$ pulse that begins each $V_{sync}$ period. That is to say, data from interface IC 252 may be sent faster or slower through the SLI bus to the driver ICs 251A-251H without the viewer of the display being aware of the ongoing multichip interaction or the changing LED settings until the next $V_{sync}$ pulse comes along. The only timing requirement is that interface IC 252 is able to receive its instructions from the video controller or scalar IC via its SPI bus input, interpret those instructions and output the channel specific information on the SO pin of its SLI bus for every driver IC within a single $V_{sync}$ period. As described earlier, since the time needed to receive such instructions is much shorter than the $V_{sync}$ period, this timing requirement imposes no limitations in the operation of the display.

FIG. 7 also illustrates that the Fault Set data register may comprise various kinds of data, including data for adjusting the voltage used to detect a shorted LED (the SLED set code), setting a period of time used to ignore the fault output from a shorted LED detect (shorted LED fault blanking), setting a period of time used to ignore the fault output from open LED detect (open LED fault blanking), and clearing previously reported open and shorted LED fault registers (open CLR and short CLR). The SLI bus protocol is not limited to implementing specific fault related functions or features.

System 250 also illustrates the fault read back capability of implementing the SLI bus as a loop by connecting the SO output of the last driver IC in the daisy chain (driver IC 251H) to the SI input of interface IC 252. While writing data from interface IC 252 into driver ICs 251A-251H, the data residing within the SLI bus shift registers advances through the daisy chain with each SC clock pulse. If the data within the SLI bus shift registers includes fault detection data written by one of driver ICs 251A-251H, then clocking that data through the loop and back into interface IC 252 facilitates a means by which a specific fault condition in one of the driver ICs 251A-251H can be reported back to the interface IC 252 and through the SPI bus to other components of the system. What interface IC 252 does with the fault information depends on its design and is not limited by the SLI bus protocol or hardware.

Multi-Channel Driver Capability & Limitations

While the examples shown describe dual channel driver ICs, the disclosed driver concept and architecture can be extended to greater number of integrated channels without limitation, except for power dissipation and temperature restrictions of the driver ICs, packages, and printed circuit board design.

Figure 8:
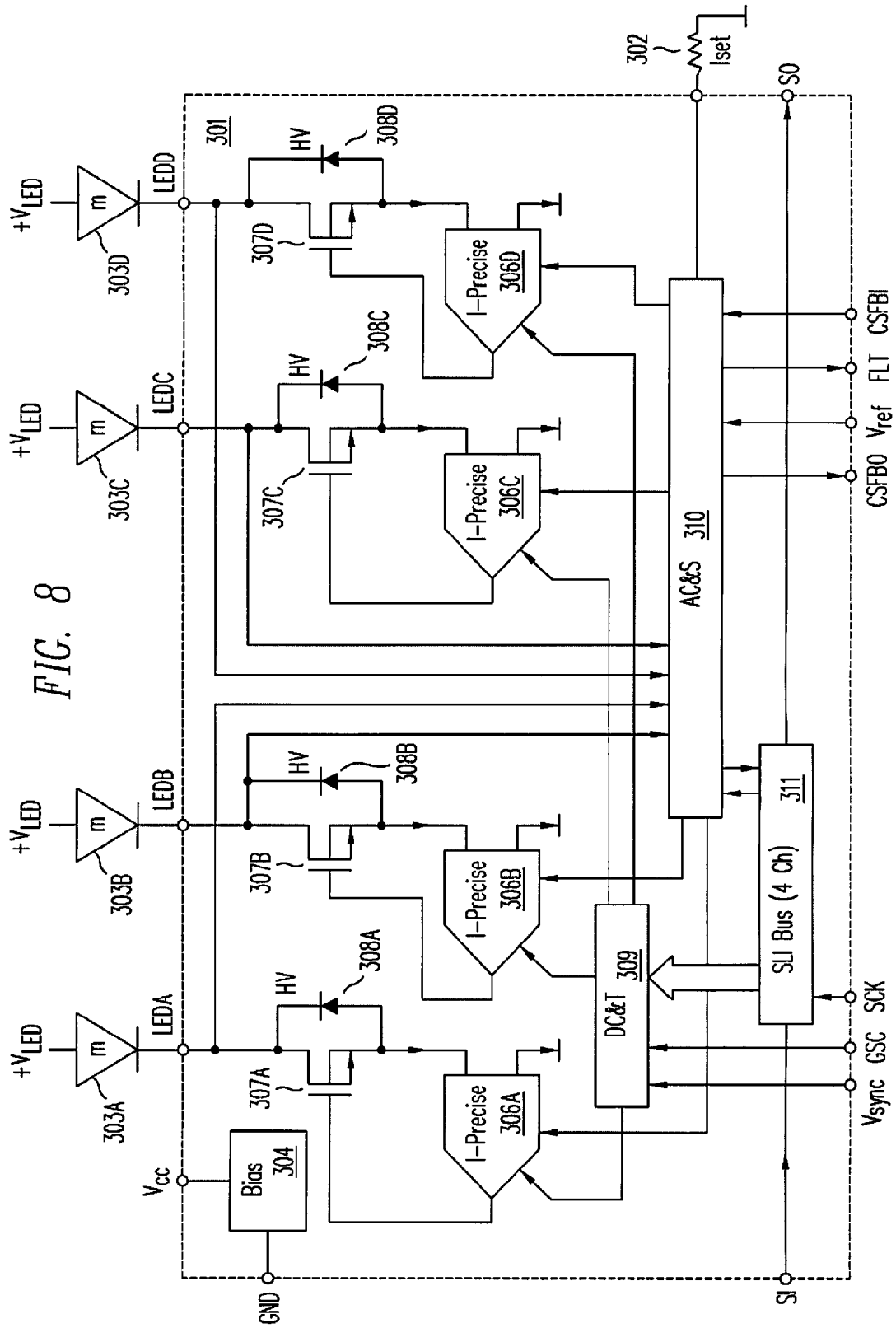
FIG. 8 is a schematic circuit diagram of a four-channel high-voltage intelligent LED driver with an SLI bus and high-voltage current sink MOSFETs without cascode clamp MOSFETs.

One example of a multi-channel LED driver consistent with the disclosed architecture is illustrated in FIG. 8. Similar to the dual channel driver of FIG. 3B, the quad LED driver IC 301 integrates four-channels of high voltage current sink DMOSFETs 307A-307D with high voltage diodes 308A-308D respectively. The current sink DMOSFETs 307A-307D are controlled by I-Precise gate driver circuits 306A-306D to control the current in LED strings 303A-303D, calibrated to a current set resistor 302. Driver IC 301, like the other driver ICs in the system, includes a bias supply 304, an analog control and sensing (AC&S) circuit 310, and a digital control and timing (DC&T) circuit 310.

Aside from doubling the number of I-Precise gate driver circuits and current sink DMOSFETs in the dual channel version, quad LED driver 301 requires additional latches and circuitry in AC&S circuit 310 and DC&T circuit 309 to support the additional channels. Temperature protection circuitry does not require doubling as one per driver IC is sufficient. A significant area is also devoted to the SLI bus register 311, which must be doubled in size to support four channels rather than two.

Figure 9:
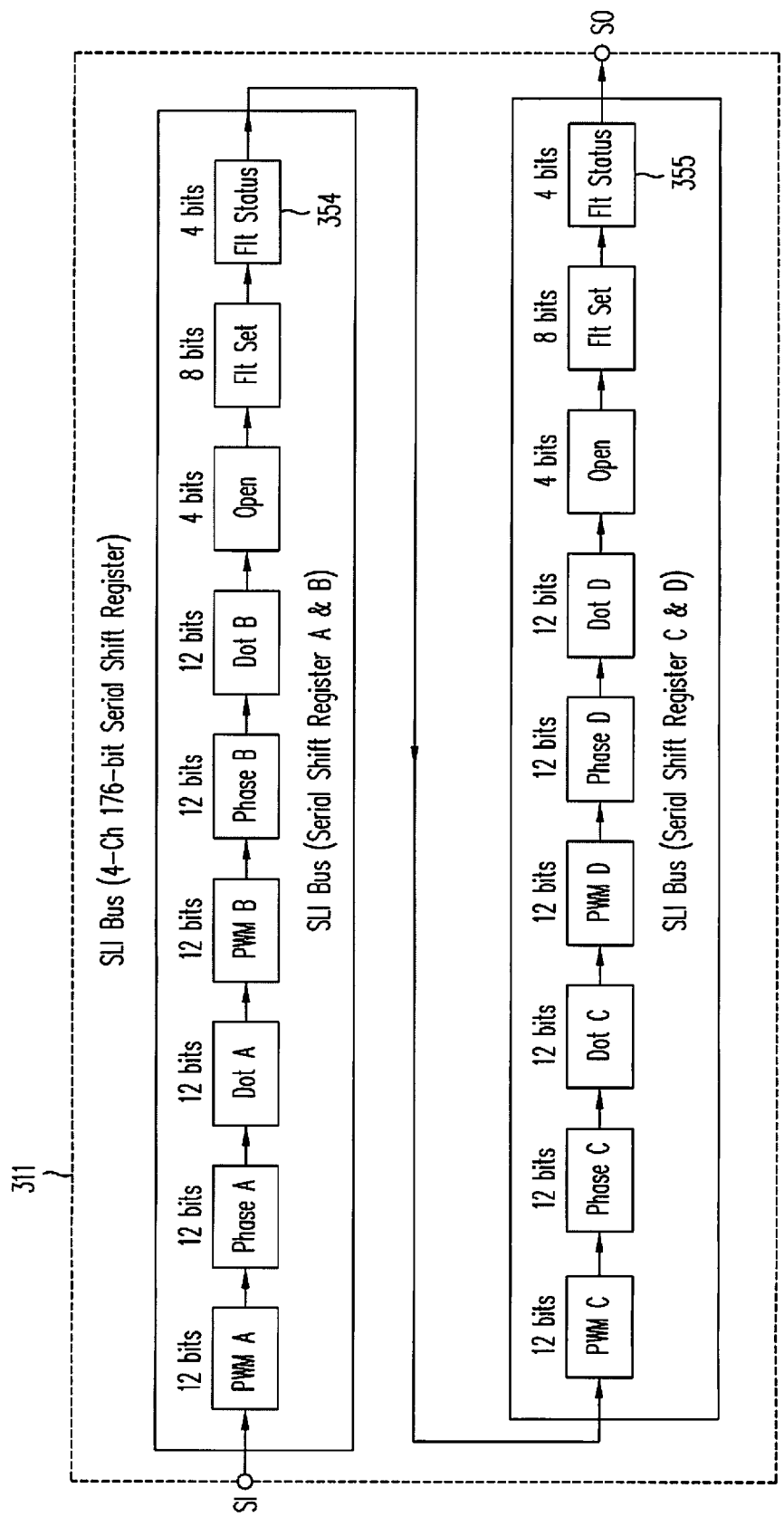
FIG. 9 is an illustration of a "fat" SIT bus for a four-channel LED driver IC.

An embodiment of four-channel SLI bus shift register 311 is shown in FIG. 9. Four-channel SLI bus shift register 311 includes 176 bits, double the data storage capacity of the SLI bus shift register 90A in the dual channel system of FIG. 6. As a result, the entire data stream is double in length, including PWM, Phase, Dot and Fault data, but there is no need to change the SLI bus protocol. Some of the fault data is duplicated, such as the temperature fault data stored in four-bit fault status registers 354 and 355, but the die area savings made possible by eliminating the redundant bits is typically not worth the complications imposed by changing the protocol.

Thus by utilizing the "fat" SLI bus protocol where all the data is sent for every register in the daisy chain each time data is written from the interface IC 101 to the LED driver ICs 81A-81H, the number of channels integrated into an LED driver IC can be extended simply by expanding the SLI bus shift registers 9OA-90H proportionally to accommodate the appropriate number of integrated channels.

The fat SLI bus protocol, however, has several disadvantages. Specifically; the interface IC 101 remains heavily tasked to repeatedly shift out on the SLI Bus 113 the same data to ail driver ICs 81A-81H, even when the data has not changed. Also, the shift registers 90A-90H in the multi-channel LED drivers 81A-81H are relatively large, and they occupy significant die area.

These disadvantages could by overcome in an SLI bus protocol that reduces the magnitude of the data being sent so that only the latch data that changes from video frame to frame needs be rewritten.

For example, in the LED driver 81 shown in FIG. 6, data loaded into shift register 90A is written into or read from the latches 211A, 212A, 211B and 212B in Latch & Counters 201A and 210B, respectively, D/A converters 213A and 213B, and fault latch circuit 214 at least once every $V_{sync}$ period, even when nothing is changing. The repetitive sending and resending of unchanging data is inefficient, cumbersome and potentially costly, wasting bus bandwidth, occupying the system with mundane tasks, and consuming silicon real estate with unduly large shift registers.

Improved Serial Lighting Interface Bus

The limitations and disadvantages of sending long digital words or instructions over a serial bus can be circumvented by adding a "latch address" or "prefix" to the serial lighting interface bus protocol and embedding it in every SLI bus communication. When combined with circuitry to decode and multiplex the SLI bus data, the embedded prefix information enables data to be routed only to specific targeted latches.

By sending data specifically only to latches requiring updates, the "prefix-multiplexed" or "slim" SLI bus architecture avoids the need for repeatedly and unnecessarily resending digital data, especially resending redundant data that remains constant or changes infrequently. In operation, after an initial setup, only latches that require changing are rewritten.

Figure 10:
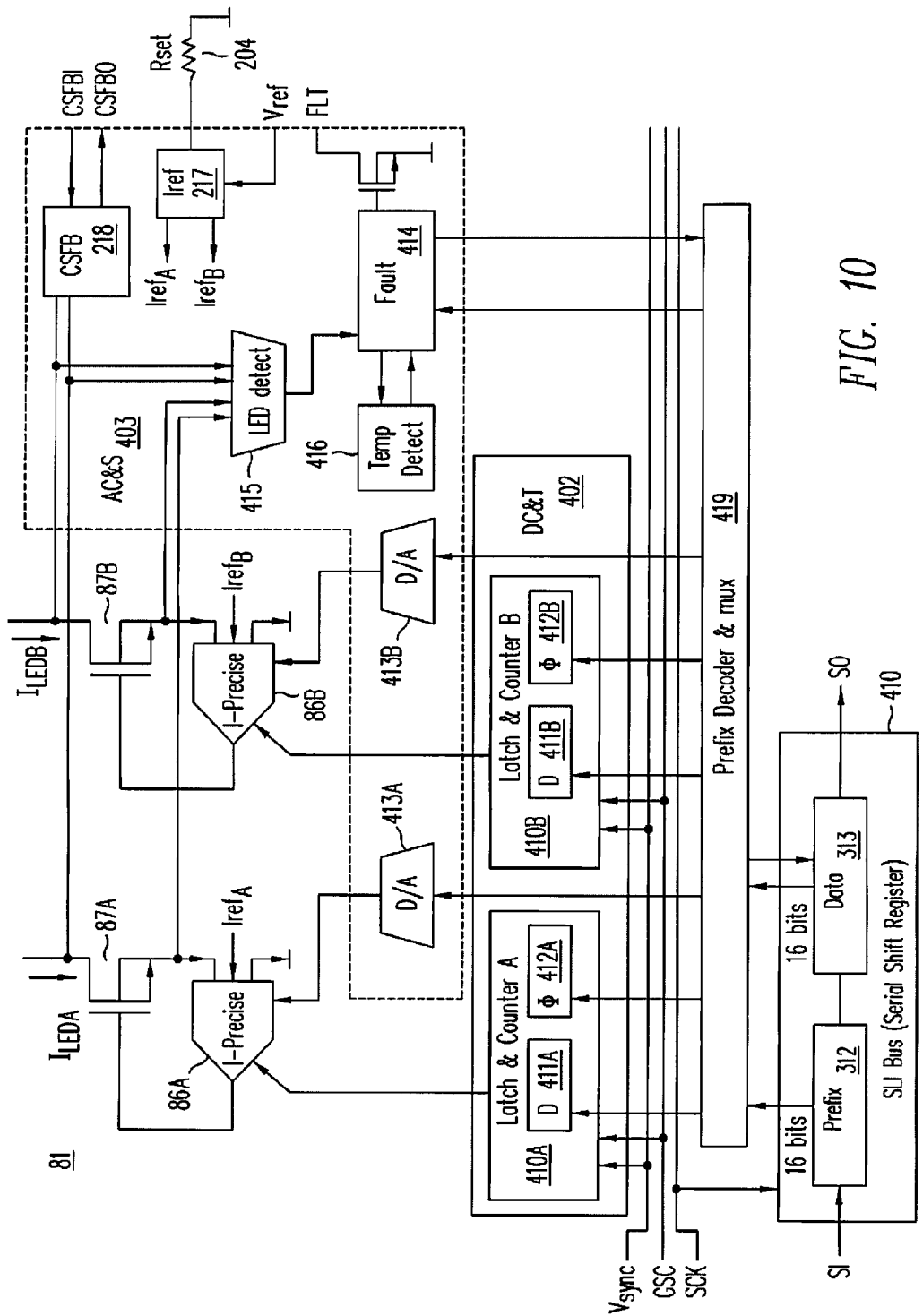
FIG. 10 is a block diagram illustrating a prefix-multiplexed SLI bus register with corresponding digital control and timing (DC&T) and analog control and sensing (AC&S) circuitry in a dual-channel intelligent LED driver.

Latches containing fixed data are written only once when the system is first initialized, and thereafter do not require subsequent communication through the SLI bus with the system IC. Because only the latches that are changing are updated, the amount of data sent across the SLI bus is greatly reduced. This method offers several distinct advantages over the "fat" SLI bus method, namely:

- the number of bits required to integrate a SLI bus shift register is greatly reduced, saving die area and lowering cost, especially in smaller (e.g. two-channel) LED driver ICs
- the effective bandwidth of the SLI bus at any given clock rate is increased because redundant data is not being repeatedly sent
- the SLI bus protocol can be standardized with fixed word lengths and functions without losing versatility An example of a prefix-multiplexed SLI bus is shown in the embodiment of LED driver IC 81 shown in the schematic circuit diagram of FIG. 10. In addition to the alternative LED driver IC 81, FIG. 10 also shows an SLI bus 410 containing a 16-bit prefix register 312 and a 16-bit data register 313, and a prefix decoder & multiplexer (mux) circuit 419. The data in data register 313 is routed to D latches 411A and 411B and Φ latches 412A and 412B in Latch & Counter A 410A and Latch & Counter B 410B, respectively, to one of D/A converters 413A and 413B in digital control and timing (DC&T) circuit 402, or to a fault latch circuit 414 in analog control and sensing (AC&S) circuit 403. These data transfers are made prefix decoder and multiplexer circuit 419 according to routing directions contained in prefix register 312. Thus prefix decoder & multiplexer circuit 419 decodes the 16-bit word stored in prefix register 312 and multiplexes the 16-bit data stored in data register 313 into the appropriate D, Φ, or Dot latch in DC&T circuit 402 AC&S circuit 403.

In the case of fault latch circuit 414, multiplexer 41.9 operates bidirectionally, allowing the data stored in data register 313 to be written into fault latch circuit 313 or, conversely, allowing the data stored in fault latch circuit 414 to be written into data register 313.

In the embodiment illustrated in FIG. 10, the prefix-multiplexed SLI bus protocol uses a 32-bit word, i.e. the word stored in prefix register 312 is 16-bits in length and the word stored in data register 313 is also 16-bits in length, facilitating a variable with up to 65,536 combinations to be uniquely written to or read from one of 65,536 different latches. This offers a well-balanced compromise between the flexibility of addressing a large number of latches and maintaining a short word length and small SLI bus shift register size and provides both flexibility and expandability.

Despite facilitating a large number of combinations, not all the data in the SLI bus 410 need be used. If LED driver IC 81 contains fewer functional latches and channels, fewer than 16 bits of the prefix word need be decoded. Likewise if less precision is demanded, fewer than 16 bits of the data word need be transferred into the target latch. For example if the data contained in data register 313 is the PWM brightness duty factor, 12 bits of data may be multiplexed and loaded into D latch 411A, while if the data in register 313 is the LED current "Dot" setting, only 8-bits may be required by the Dot register associated with D/A converter 413A.

So in the prefix-multiplexed SLI bus, data is repeatedly written by the interface IC 101 into the data register 312 and then multiplexed into one of several functional latches in DC&T circuit 402 and AC&S circuit 403, one bit at a time, in sequential fashion. In the embodiment of FIG. 10 the data in data register 313 fans out into seven different functional latches having different functional roles.

The "thin" prefix-multiplexed SLI bus 410 shown in FIG. 10 is in sharp contrast to the "fat" SLI bus 90A shown in FIG. 6, wherein each register in SLI bus shift register 90A has a one-to-one correspondence to a functional latch in the LED driver IC 81, e.g. PWM A register 220A transfers data into D latch 211A, Phase A register 221A transfers data into Φ latch 212A, and so on. This one-to-one correspondence makes scaling the fat SLI bus architecture to larger channel count driver ICs problematic and costly.

The fan out capability of the prefix-multiplexed SLI bus therefore offers a more versatile, lower cost approach to implement a multichannel LED drive IC that the fat SLI bus protocol. For this and other reasons to be considered below, the prefix-multiplexed SLI bus represents an improved serial lighting interface bus protocol, architecture, and physical interface.

Figure 11:
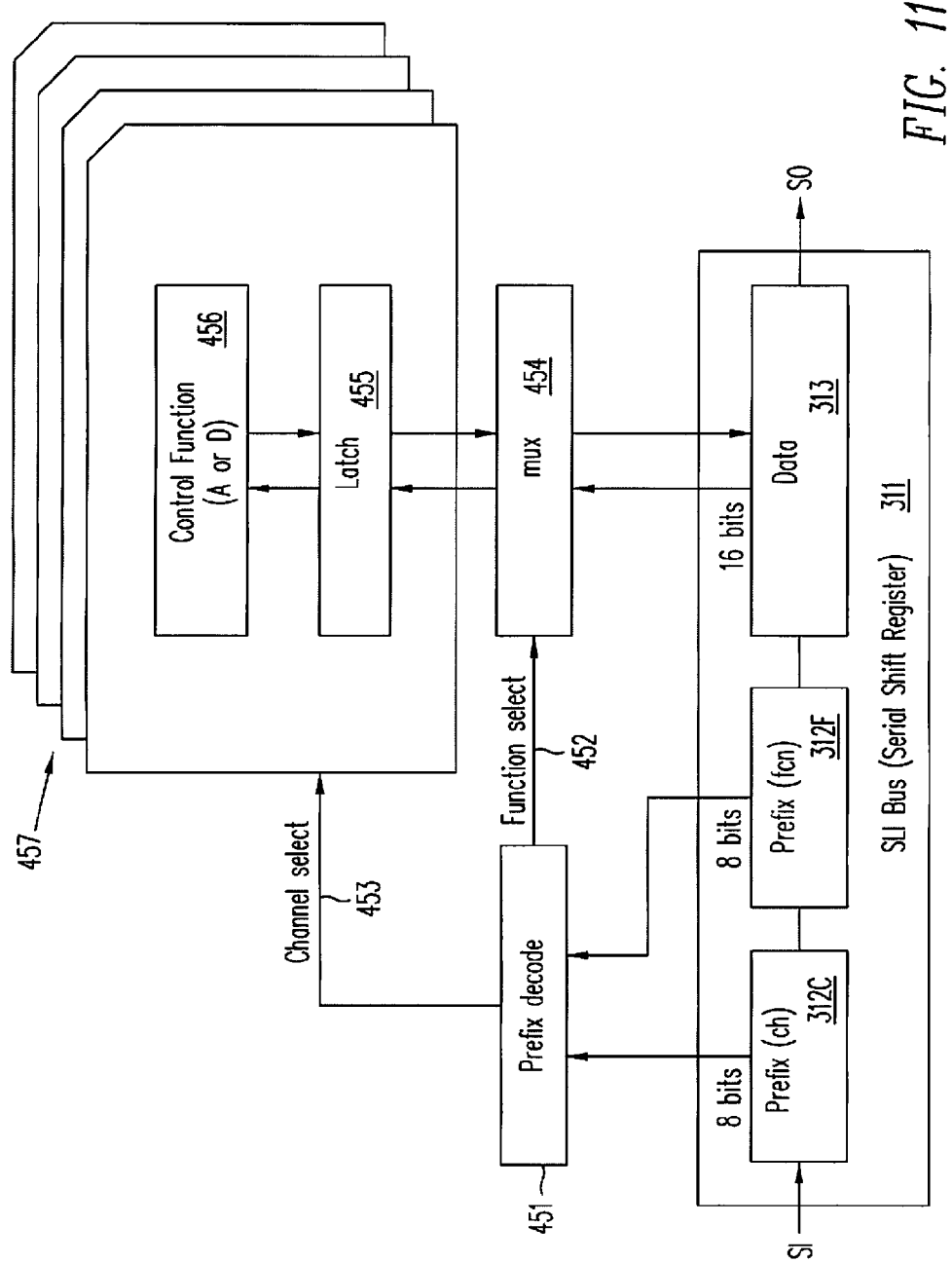
FIG. 11 is a block diagram of a prefix-multiplexed SLI bus including channel and function decoding.

A further improvement in the prefix-multiplexed SLI bus method is illustrated in FIG. 11. In this example, the 16-bit prefix register in SLI bus 311 is subdivided into two 8-bit prefix registers 312C and 312F, which store channel and function prefix information, respectively. The data register 313 remains unchanged. As shown, a prefix decoder 451 has two outputs, a channel select output 453 to select which LED channel is being controlled, and function select output 452 to select which functional latch is being interrogated, i.e. which functional latch is being written to or read from.

Prefix decoder 451 selects one of the many channels 457 with a channel select signal in output 453; prefix decoder 451 then chooses the function to be controlled (e.g., PWM or phase) with a function select signal in output 452. A multiplexer circuit 454 then writes data from data register 313 into a latch 455 that controls the analog or digital function 456 in the particular channel 457 selected.

In this manner, any number of channels within a LED driver IC, i.e. any number of LED strings, can be controlled independently in real, time facilitating precise adjustment of each control function through a shared SLI bus 311, without the need for a large shift register or long digital words.

In a preferred embodiment of this invention, the prefix (ch), prefix (fcn) and data registers within SLI bus 311 store a 32-bit word containing 16 bits of data (i.e., 16 bits are unused). The word is thus capable of addressing one of 256 different functions in any one of 256 channels. Since the number of possible combinations greatly exceeds the number of channels and functions needed in a single LED driver IC, the improved SLI bus protocol is not limited to the LED driver examples described herein. In a single LED driver IC, however, the number of combinations can be limited by decoding only a subset of the possible digital latch addresses, reducing the size of the associated circuitry to a minimum. Since only one 32-bit shift register is required for each LED driver IC, the extra, unused bits in the preferred 32-bit SLI bus protocol do not waste significant die area.

As an example of reducing the number of decoded bits, decoding the two least significant bits (LSBs) of the channel prefix register 312C, and the two LSBs of the function prefix register 312F easily -accommodate the quad LED driver 301 of FIG. 8 with only a 32-bit shift register, vastly smaller than the 176-bit shift register 311 needed by the fat SLI bus protocol, as shown in FIG. 9. The 4-channel LED driver decoding is described in the following table as one possible implementation.

| Channel Select Decode | | |
|---|---|---|
| Hex | Bits Decoded | Channel Selected |
| 00 | xxxx xx00 | Channel A |
| 01 | xxxx xx01 | Channel B |
| 02 | xxxx xx10 | Channel C |
| 03 | xxxx xx11 | Channel D |
| Function Select Decode | | |
| Hex | Bits Decoded | Function Selected |
| 00 | xxxx xx00 | PWM Brightness (D) |
| 01 | xxxx xx01 | Phase Delay (Φ) |
| 02 | xxxx xx10 | Dot Correction |
| 03 | xxxx xx11 | Fault Status & Reporting |

Figure 12A:
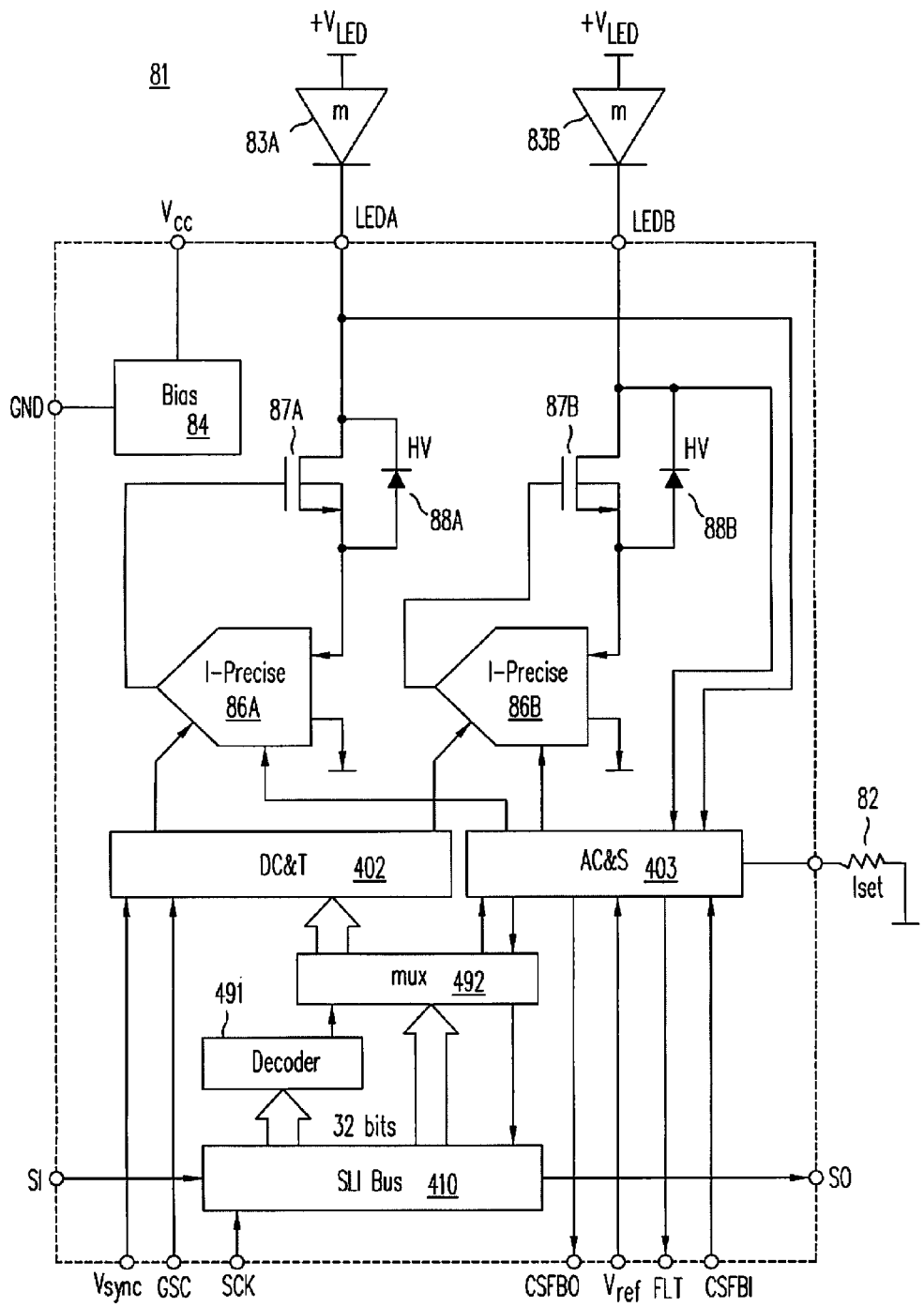
FIG. 12A is a schematic circuit diagram of a dual-channel high-voltage intelligent LED driver with prefix-multiplexed SLI bus control and a single multiplexer.

FIG. 12A illustrates a variation of the embodiment of LED driver IC 81 shown in FIG. 10, except that in the embodiment of FIG. 12A the prefix decoder & multiplexer 419 has been split into a decoder 491 and a multiplexer 492.

The LED driver IC 81 shown in FIG. 12A provides complete control of two channels of 250 mA LED drive with 150V circuiting capability and ±2% absolute current accuracy, 12 bits of PWM brightness control, 12 bits of phase control, 8 bits of current control, fault detection for LED open and LED short conditions and over-temperature detection, all controlled, through the high-speed SLI bus 410, and synchronized to other drivers by a common $V_{sync}$ and grey-scale clock (GSC) signal. While current sink DMOSFETs 87A and 87B shown in FIG. 12A are rated at 150V capability, these devices can be sized for operation from 100V to 300V as needed. The 250 mA current rating of DMOSFETs 87A and 87B is set by the power dissipation of driver IC 81 and the mismatch in forward-voltage in the LED strings 83A and 83B. Above a 100 V rating, it is advantageous to integrate high voltage cascode clamp DMOSFETs in series with current sink DMOSFETs 87A and 87B, whereby current sink MOSFETs 87A and 87B do not operate above the clamp voltage provided by the cascode clamp DMOSFET, i.e. above 12V as described above in connection with FIG. 3A.

In operation, LED driver IC 81 shown in FIG. 12A receives a stream of data on its serial input (SI) pin which is fed into the SLI bus shift register 410. The data is clocked at a rate set by serial clock (SCK) signal supplied by the interface IC 101 (not shown). The maximum clock rate for the data depends on the CMOS technology used to implement SLI bus shift register 410, but operation at 10 MHz is achievable even using 0.5 μm line-width processes and wafer tabs. As long as the SCK signal continues to run, data will shift into SLI bus shift register 410 and ultimately exit the serial output (SO) pin on its way to the next LED driver IC in the serial daisy chain.

After the data corresponding to the specific driver IC arrives in SLI bus shift register 410, the SCK signal is momentarily stopped by the interface IC 101. From the data in SLI bus shift register 410, decoder 491 determines the channel and latch within DC&T circuit 402 or AC&S circuit 403 that is to be controlled and directs multiplexer 485 to connect the data register within SLI bus shift register 410 to that latch. The transfer of data from the data register in SLI bus shift register 410 to the target latch within DC&T circuit 402 or AC&S circuit 403 occurs at the next $V_{sync}$ pulse. The data latches in DC&T circuit 402 or AC&S circuit 403 may comprise flip-flops or static RAM. In the event that the decoder 491 instructs the SLI bus to interrogate the fault latch within AC&S circuit 403, then at the time of the $V_{sync}$ pulse, any data previously written into the fault latch within AC&S circuit 403 will be copied into the appropriate bits of SLI bus shift register 410.

A resumption of the SCK signal moves the read and the write bits within SLI bus shift register 410 into the next LED driver IC in the daisy chain. In a preferred embodiment, the daisy chain forms a loop connecting back to the interface IC 101. Sending new data into the daisy chain ultimately pushes the existing data residing in the SLI bus shift registers on through the loop and ultimately back to the interface IC 101. In this manner, the interface IC 101 can communicate to the individual LED driver ICs, setting LED string brightness and timing, and the individual driver ICs can communicate individual fault conditions back to the interface IC.

Shifting of the SLI bus data through the daisy chain connected shift registers advances one bit per SCK pulse. After 32 SCK pulses, the 32-bit data or "word" for the last LED driver IC has been shifted out of the interface IC and into the first LED driver IC in the daisy chain, but is not yet residing in the intended LED driver IC. After 64 SCK poises, the first 32-bit word moves from the first LED driver IC into the second, and the next 32-bit word moves from the interface IC into the first LED driver IC in the daisy chain. At this step, the SLI bus words still do not reside in their proper driver ICs. In a daisy chain comprising "n" SLI bus registers in the daisy chain, only after "n" times 32 serial clock pulses SCK will the data finally be shifted into the proper LED driver ICs. Interrupting the SCK pulses copies the data from the SLI bus shift registers into the preload latches, described below in connection with FIG. 14. On the next $V_{sync}$ pulse, the data is copied from the preload latches into the active latches and the change in LED driver takes effect. Until then, the operation of the LED driver IC remains unaffected.

Because of the two-stage latch architecture, i.e. the combination of a preload latch and a second stage active latch (described below in connection with FIG. 14), the prefix-multiplexed SLI bus communications protocol and interface is robust and relatively immune from erroneously instructing the LED driver ICs. For example, if the SCK pulse stream were to momentarily freeze before the shifted data resides in the targeted SLI bus shift registers and corresponding LED driver ICs, then the data will be copied from the SLI bus shift registers into the preload latches but will not change the active latches data until the $V_{sync}$ pulse occurs. So long that the SCK pulses resume operation and complete the shifting process before the $V_{sync}$ pulse occurs, no errors will occur from sporadic SCK pulses.

In cases where an LED driver IC comprises two or more LED channels, the shifting process must occur multiple times before the $V_{sync}$ pulse makes the changes active. For example the preload latches for all the odd numbered channels may be first loaded, followed by loading all the data for the even numbered channels. This process is repeated for every function until all the preload latches have been loaded at least once. After all the preload latches are loaded, the $V_{sync}$ pulse initiates a change in LED driver IC operation by copying the preload latch data into the active latches, whereby operation of the LED driver IC changes. Load of data into multichannel LED driver ICs using the prefix multiplexed SLI bus protocol is further detailed later in this application.

Using this clocking scheme, data can be shifted through a large number of driver ICs at a high speed without affecting the LED current or causing flicker because the current and timing controlling the current sink DMOSFETs 87A and 87B only changes upon each new $V_{sync}$ pulse. The frequency of the $V_{sync}$ pulses may vary from 60 Hz to 960 Hz, with the frequency of the grey scale clock (GSC) signal scaling proportionately, typically at 4096 times the frequency of the $V_{sync}$ signal. Since $V_{sync}$ is slow, under 1 kHz, when compared to the SLI bus clock SCK frequency, the controller has flexibility to modify and resend the data, or query the fault latch multiple times within a given vertical-sync pulse duration.

Because in the slim SLI bus protocol the data register within SLI bus 410 is not large enough to write to all of the functional latches within DC&T circuit 402 and AC&S circuit 403 from a single SLI bus word or data packet, the interface IC 101 must send multiple SLI bus packets to the driver ICs to load all of the functional latches. This condition arises at start-up, when all the latches need to be filled, or when the data in more than one latch must be changed contemporaneously. If the data controlling the I-Precise gate driver circuits 86A and 86B is allowed to change gradually in multiple steps over several $V_{sync}$ periods, e.g. first changing the Φ latch, then changing the D latch, then changing the Dot latch, etc., a viewer may be able to discern the step changes as flicker or noise in the video image. Several solutions to this potential problem are disclosed below, under the heading "Simultaneously Loading Multiple Functional Latches".

After the register data is loaded, commencing on the next $V_{sync}$ pulse, DC&T circuit 402 generates two PWM pulses to toggle the output of I-Precise gate driver circuits 86A and 86B on and off after the proper phase delay and for the proper pulse width duration, or duty factor D. I-Precise gate driver circuits 86A and 86B sense the current in current sink MOSFETs 87A and 87B respectively and provide the proper gate drive voltage to maintain a target current during the time it is enabled by its PWM pulse. The I-Precise gate driver circuits therefore operate in the manner of a "strobed" amplifier, being pulsed on and off digitally but controlling the current in the LEDs as an analog parameter.

The peak current is set globally in all of the LED driver ICs by the $V_{ref}$ signal and by the value of $I_{set}$ resistor 82. The $V_{ref}$ signal is, in a preferred embodiment, generated by the interface IC 101, or it may be supplied as an auxiliary output from the AC/DC converter module. In an alternative embodiment, channel-specific Dot correction can be eliminated, and $V_{ref}$ can be modulated to facilitate global current control of the LED currents.

In driver ICs capable of channel-specific Dot correction, the current in any one LED string can be controlled through the SLI bus by the Dot latch, preferably comprising an 8 to 12 bit word, that adjusts the current sink MOSFET's current to a percentage from 0% to 100% of the peak current value in either 256 or 4096 different steps, respectively. In this manner, precise digital control of the LED current, emulating the function of a current mode digital-to-analog converter or "current DAC", is possible using the newly disclosed architecture. In LCD backlighting applications, this feature can be used for calibrating the backlight brightness, for improving backlight uniformity, or for operating in 3D mode.

The structure and operation of I-Precise gate driver circuits 86A and 86B as well as AC&S circuit 403 are described in application Ser. No. 13/346,625.

As shown, the current flowing through LED string 83A is controlled by current sink DMOSFET 87A and corresponding I-Precise gate drive circuit 86A. Similarly, the current flowing through LED string 83B is controlled by current sink DMOSFET 87B and corresponding I-Precise gate drive circuit 86B. Without cascode clamp MOSFETs, the maximum voltage impressed upon current sink DMOSFETs 87A and 87B is limited to operation below the breakdown voltage of high-voltage diodes 88A and 88B. Bias circuit 84 generates an internal chip bias voltage from a 5V $V_{cc}$ input.

The drain voltages of current sink DMOSFETs 87A and 87B are also monitored by AC&S circuit 403 and compared to an over-voltage value stored in its latch from SLI bus 410. If the drain voltages are below a programmed value, the LED strings 83A and 83B are operating normally. If however, the drain voltages current sink DMOSFETs 87A and 87B rise about the programmed value, one or more of LED strings 83A and 83B is shorted and a fault is detected and recorded for that specific channel. Likewise if one or more of the I-Precise gate driver circuits 86A and 86B cannot maintain the required current, i.e. the LED string is operating "undercurrent", it means an LED has failed open and the circuit continuity is lost. The channel is then turned off, its CSFB signal is ignored, and the fault is reported. Sensing this "undercurrent", can be performed by monitoring the output of the I-Precise gate driver circuits 86A and 86B for saturation, meaning the gate driver circuit is driving the gate of the current sink DMOSFET as "full on" as it can, or alternatively by monitoring the voltage drop across the input terminals of the I-Precise gate driver circuit. When input voltage to the I-Precise gate driver circuit voltage drops too low, the under-current condition has occurred, indicating an open LED fault.

If an over-temperature condition is detected, a fault is reported and the channel is left on and conducting unless the interlace IC 101 sends a command to shut down that channel. If, however, the temperature continues to rise to dangerous levels, AC&S circuit 403 will disable the channel independently and report the fault. Regardless of the nature of a fault, whether a shorted LED, an open LED, or over-temperature, whenever a fault occurs an open drain MOSFET within AC&S circuit 403 will activate and pull the FLT pin low, signaling to the host μC 152 that a fault condition has occurred.

AC&S circuit 403 also includes an analog current sense feedback (CSFB) signal, which monitors the drain voltages of the current sink DMOSFETs 87A and 87B and the voltage at the CSFBI input pin of the LED driver IC 81 for whichever of the three is lowest in voltage and passes that voltage to the CSFBO output pin of the LED driver IC 81. In this way the lowest drain voltage of any of the current sink MOSFETs, and hence the LED string with the highest forward-voltage drop is passed to the input of the next LED driver IC and ultimately back to the system's SMPS 103 to power the $+V_{LED}$ supply rail 109.

In the manner described, a two-channel LED driver 81 with integral diming and fault detection capability can be realized without the need of an interface IC.

Figure 12B:
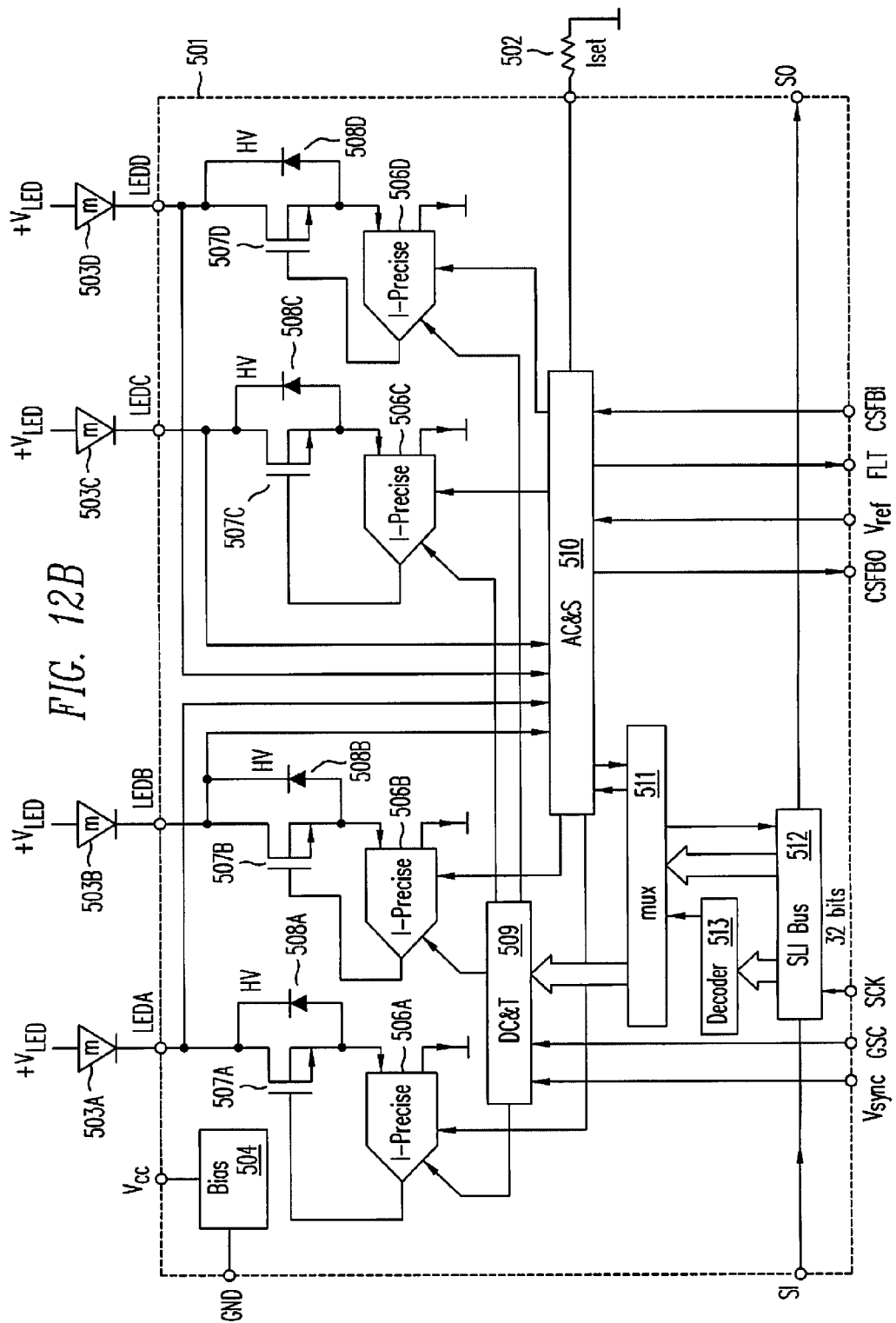
FIG. 12B is a schematic circuit diagram of a four-channel high-voltage intelligent LED driver with prefix-multiplexed SLI bus control and a single multiplexer.

FIG. 12B illustrates an extension of the disclosed prefix-multiplexed SLI bus control method to a four channel LED driver IC 501. As shown, LED driver IC 501 comprises four current sink DMOSFETs 507A-507D with corresponding I-Precise gate driver circuits 506A-506D used to independently drive four LED strings 503A-503D. In four-channel LED driver IC 501, DC&T circuit 509 and AC&S circuit 510 control four I-Precise circuits 506A-506D, having double the number of functional latches of a two-channel driver.

SLI bus shift register 512, which in this example is 32-bits long, is loaded multiple times to transfer requisite data to the various latches in DC&T circuit 509 and AC&S circuit 510. If, for example, each channel comprises four latches, namely D, Φ, Dot, and Fault, and the driver IC comprises four channels, then SLI bus 512 must be loaded sixteen times to set all the functional latches. Each time data is shifted into SLI bus shift register 512, decoder 513 interprets the prefix to select the target channel and function, whereby data is routed to the appropriate latches in DC&T circuit 509 and AC&S circuit 510 through multiplexer 511.

Because in the slim SLI bus protocol the data register within SLI bus interface 512 is not large enough to write to all the functional latches within DC&T circuit 509 and AC&S circuit 510 from a single SLI bus word or data packet, the interface IC must send multiple SLI bus packets to the driver ICs to load all the latches. This condition arises at start-up when all the functional latches are first initiated, or when the data in more than one functional latch must be changed contemporaneously. If the data controlling the I-Precise drivers 506A-506D is allowed to change gradually in multiple steps over several $V_{sync}$ periods, e.g. first changing the Φ latch, then changing the D latch, then changing the Dot latch, etc., a viewer may be able to discern the step changes as flicker or noise in the video image. Several inventive solutions to circumvent this potential problem are disclosed below.

After the latch data is loaded, commencing on the next $V_{sync}$ pulse, DC&T circuit 509 generates four independent PWM pulses to toggle the output of I-Precise gate drivers 506A-506D on and off after the proper phase delay and for the proper pulse width duration, or duty factor D. I-Precise gate drivers circuits 506A-506D sense the current in current sink MOSFETs 507A-507D respectively and provide the proper gate drive voltage to maintain a target current during the times that they are enabled by the PWM pulses. Operation of the I-Precise gate driver circuits is therefore like that of a "strobed" amplifier, being pulsed on and off digitally but controlling the current in the LEDs as an analog parameter.

LED current can be controlled through the SLI bus through the Dot latches, globally through the $V_{ref}$ voltage input, or through a combination of both.

Figure 12C:
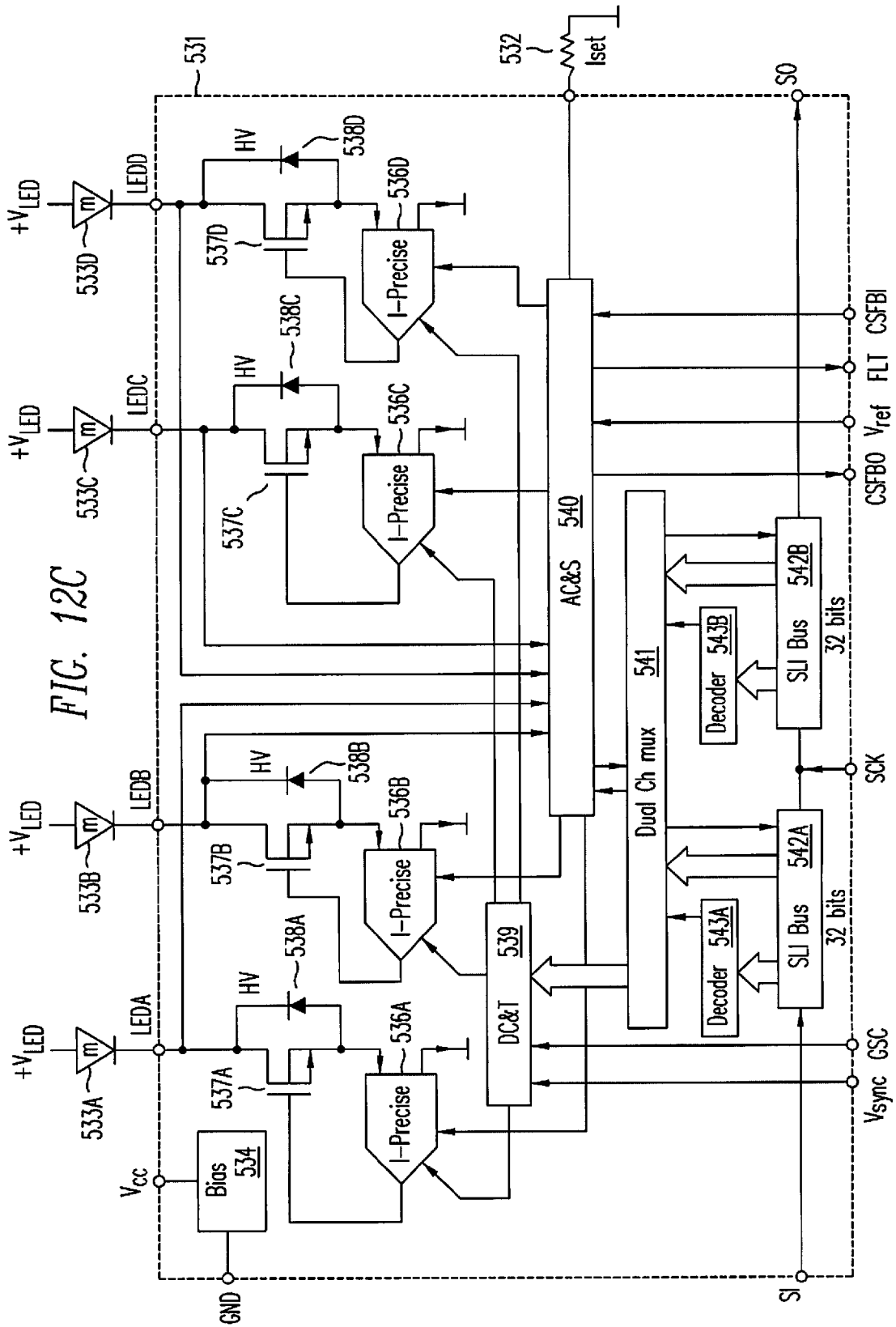
FIG. 12C is a schematic circuit diagram of a four-channel high-voltage intelligent LED driver with prefix-multiplexed SLI bus control and a dual multiplexer.

FIG. 12C shows an alternative embodiment of a four-channel LED driver. LED driver IC 531 incorporates two 32-bit SLI bus shift registers 542A and 542B to facilitate loading of two functional latches in parallel, i.e. simultaneously. Each of SLI bus shift registers 542A and 542B has its own prefix and its own associated decoder 543A and 543B. The data is routed through a dual-channel multiplexer 541 to the appropriate functional latches in DC&T circuit 539 and AC&S circuit 540. Otherwise, the operation of driver 531 is similar to that of driver 501 in FIG. 12B. The advantage of using a dual SLI bus interface is that the interface IC can load all of the functional latches in the LED driver ICs in half the number of SLI bus write cycles. The actual system speed is similar in either approach, since the same number of bits is communicated on the SLI bus, i.e. a fixed number of 32-bit words or half as many 64 bit words. The main advantage of this approach is the interface IC does not have to manage many small SLI bus communications.

Decoder and Multiplexer Implementation

As illustrated in the circuit diagram of FIG. 11, key elements of the prefix-multiplexed SLI bus protocol and interface are the decoder and multiplexer functions. Tasked with sequentially distributing data from the SLI bus shift register 311 to the appropriate functional latch, i.e. a latch 455, prefix decoder 451 interprets the prefix on each new digital word and directs multiplexer 454 to copy data from SLI bus data register 313 into the corresponding functional latch 455.

Figure 13A:
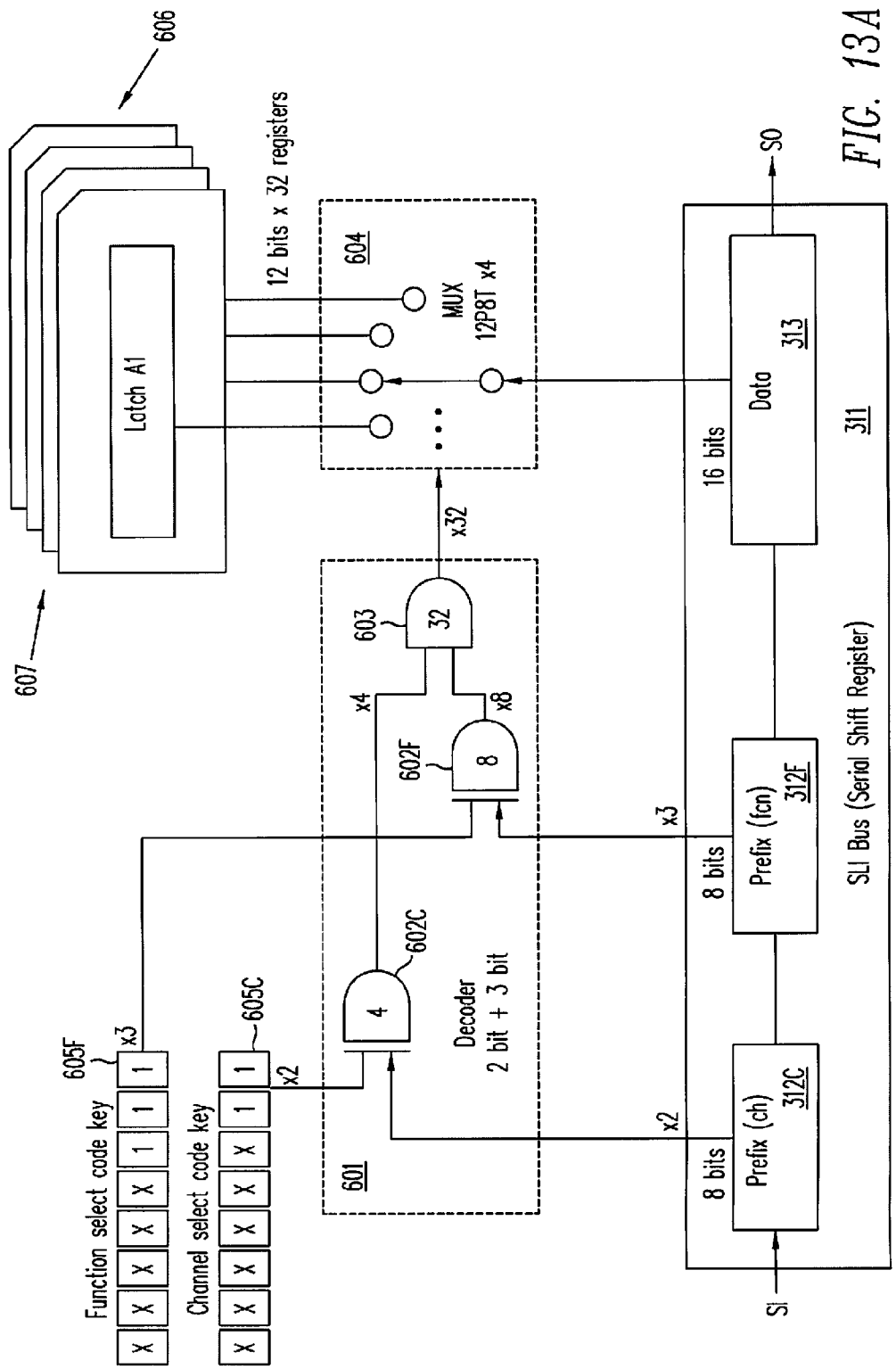
FIG. 13A shows in embodiment of a LED driver IC comprising a 4-channel 8-function SLI bus decoder and a multiplexer.

One implementation of this decoder and multiplexer function is shown in FIG. 13A, where a prefix-multiplexed SLI bus 311 sequentially distributes data to numerous banks of functional latches 607 through a digital multiplexer 604 controlled by a decoder 601 and decoder keys 605C and 605F. Each bank of functional latches and their associated set of latches 606 independently control separate I-precise gate driver circuits driving distinct strings of LEDs (not shown). Specifically, functional latches 606 comprise channel A latches A1-A8, channel B latches B1-B8, channel C latches C1-C8, and channel D latches D1-D8, together constituting 4 channels of 8 latches, controlling 32 functional parameters in total. For the sake of clarity, only latch A1 is shown.

Multiplexer 604, used to route digital data between the SLI bus and the channels and functions, operates in a manner analogous to a multi-pole multi-throw switch to facilitate multiple selectable data pathways from SLI bus data register 313 to functional latches 606. In this example, multiplexer 604 comprises four 12-pole 8-throw, or 12P8T, switches collectively controlled by decoder 601. As shown, only a fraction of the possible combinations of the word stored in SLI bus shift register 311 are actually selectable in this embodiment.

Specifically, because it has only 12 "poles" or parallel circuits, multiplexer 604 passes only 12 bits of data to latches 606 despite the fact that data shift register 313 contains a higher resolution 16-bit word. Using 12-bits from a 16-bit word decodes only 4,096 combinations out of 65,536, or just 6% of the possible combinations. In most lighting applications, however, eight to twelve bits are adequate to perform the function to the desired degree of precision. Typically, PWM brightness "D" and phase delay "Φ" require 12-bit precision, while dot correction requires only 8-bits.

Because multiplexer 604 addresses 4 channels with 8 positions, only 32 latches are accessible despite prefix registers 312C and 312F being capable of addressing 65,536 different channels and parameters. Therefore, a quad-channel eight-position switch accesses 32 combinations, or 5 bits selectable out of a sixteen-bit prefix, the implementation using less than 0.05% of the prefix combinations. Because only a small fraction of the data in shift register 311 is used, multiplexer circuit 604 occupies a very small die area using a relatively low number of logic gates and transistors.

Decoder 601 comprises 12 magnitude comparators, four for channel select and eight for function select, along with 32 digital logic gates 603 to decode a portion of SLI bus prefix code 312 and thereby control the channel selected by multiplexer 604.

Specifically, to be able to uniquely select four channels requires decoding a 2-bit prefix from channel prefix register 312C. Channel decoding is performed by a magnitude comparator 602C which outputs a logic high or binary "1" whenever the two least significant bits in channel prefix register 312C exactly match the two least significant bits in channel select code key 605C. The truth table for the two-channel magnitude comparator 602C is shown in Table 1:

TABLE 1

| MC # (Ch) | Key (LSB + 1) | Key (LSB) | SLI (LSB + 1) | SLI (LSB) | MC Out |
|---|---|---|---|---|---|
| A | 0 | 0 | 0 | 0 | 1 |
|   |   |   | 0 | 1 | 0 |
|   |   |   | 1 | 0 | 0 |
|   |   |   | 1 | 1 | 0 |
| B | 0 | 1 | 0 | 0 | 0 |
|   |   |   | 0 | 1 | 1 |
|   |   |   | 1 | 0 | 0 |
|   |   |   | 1 | 1 | 0 |
| C | 1 | 0 | 0 | 0 | 0 |
|   |   |   | 0 | 1 | 0 |
|   |   |   | 1 | 0 | 1 |
|   |   |   | 1 | 1 | 0 |
| D | 1 | 1 | 0 | 0 | 0 |
|   |   |   | 0 | 1 | 0 |
|   |   |   | 1 | 0 | 0 |
|   |   |   | 1 | 1 | 1 |

Since four combinations of the channel prefix code exist, there are four distinct magnitude comparators 602C with the same inputs but with four separate outputs, only one of which may have a logic "1" output at any given time. From the above, only a "00" code activates channel A, only a "01" code activates channel B, a "10" code is needed to select channel C, and a "11" code is needed to select channel D. In this manner, there is only one SL1 bus prefix code combination to select a given channel. In the 2-bit decoder shown, only the two least significant bits are decoded, ignoring the higher magnitude bits altogether.

In a similar manner, in order to uniquely select one of eight functional latches requires decoding a 3-bit prefix from function prefix register 312F. Function decoding is performed by magnitude comparator 602F which outputs a logic high or binary "1" whenever the three least significant bits in function prefix register 312F exactly match the three least significant bits in function select code key 605F. The truth table for the three-channel magnitude comparator 602F is shown in Table 2:

TABLE 2

| MC # (fcn) | Key (LSB + 2) | Key (LSB + 1) | Key (LSB) | SLI (LSB + 2) | SLI (LSB + 1) | SLI (LSB) | MC Out |
|---|---|---|---|---|---|---|---|
| 1 | 0 | 0 | 0 | 0 | 0 | 0 | 1 |
|   |   |   |   | all other |   |   | 0 |
| 2 | 0 | 0 | 1 | 0 | 0 | 1 | 1 |
|   |   |   |   | all other |   |   | 0 |
| 3 | 0 | 1 | 0 | 0 | 1 | 0 | 1 |
|   |   |   |   | all other |   |   | 0 |
| 4 | 0 | 1 | 1 | 0 | 1 | 1 | 1 |
|   |   |   |   | all other |   |   | 0 |
| 5 | 1 | 0 | 0 | 1 | 0 | 0 | 1 |
|   |   |   |   | all other |   |   | 0 |
| 6 | 1 | 0 | 1 | 1 | 0 | 1 | 1 |
|   |   |   |   | all other |   |   | 0 |
| 7 | 1 | 1 | 0 | 1 | 1 | 0 | 1 |
|   |   |   |   | all other |   |   | 0 |
| 8 | 1 | 1 | 1 | 1 | 1 | 1 | 1 |
|   |   |   |   | all other |   |   | 0 |

Since eight combinations of the function prefix code exist, there are eight distinct magnitude comparators 602F with the same inputs but with four separate outputs, only one of which may have a logic "1" output at any given time. From the above, only a "000" code activates function #1, e.g. duty factor D, only a "001" code activates function #2, e.g. phase delay $\Phi$, and so on. In this manner, there is only one SLI bus prefix code combination to select a given function. In the 3-bit decoder shown, only the three least significant bits are decoded, ignoring the higher magnitude bits altogether.

Figure 13B:
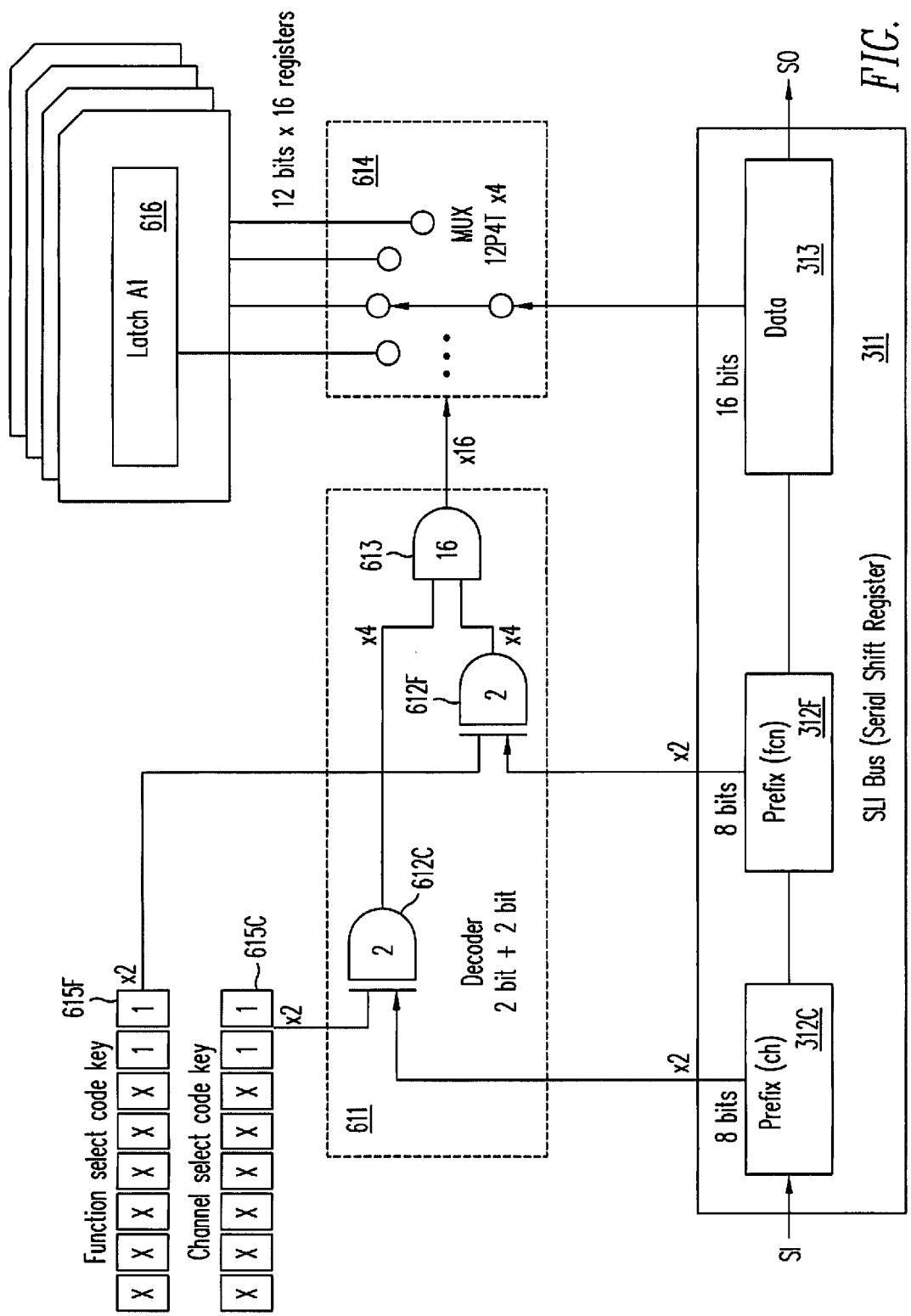
FIG. 13B shows in embodiment of a LED driver IC comprising a 4-channel 4-function SLI bus decoder and a multiplexer.

Implementation of magnitude comparators can be performed in a variety of ways using Boolean logic, with the decoder 601 and channel and function code keys 605C and 605F hard wired, using counters, or stored in programmable memory elements including SRAM or even $E^2$PROM. In one embodiment of this invention, magnitude comparators are realized using the circuitry shown in FIG. 13D, illustrating a three-channel magnitude comparator 631 comprising three dual-input exclusive NOR gates 632-634 and a triple input AND gate 635. The implementation of an exclusive OR and its inverted counterpart, an exclusive NOR or XNOR gate is well known in the art (see, e.g., http://en.wikipedia.org/wiki/XOR_gate).

The logical truth table for the two-input XNOR function is to produce a "high" or logic "1" output whenever both its inputs are the same, either both "0" inputs, or both "1" inputs. This is shown in Table 3:

TABLE 3

| In A | In B | XNOR |
|---|---|---|
| 0 | 0 | 1 |
| 0 | 1 | 0 |
| 1 | 0 | 0 |
| 1 | 1 | 1 |

For this reason, the exclusive NOR function is often logically used to compare bits in two registers, in effect a digital version of a comparator. To utilize a logical XNOR gate, a multi-bit word must be compared bit versus bit using multiple XNOR gates. For example, to check if two 8-bit digital words are identical, eight XNOR gates must be used to check each bit separately. For the two digital words to match, all the corresponding bits must match. By performing an eight-input logical AND function on all the XNOR outputs, a match can be confirmed by a positive output of the AND gate.

This approach is shown in FIG. 13D in decoder 631, where three exclusive NOR gates 632-634 are used to compare each bit in the SLI bus prefix register against the corresponding bit in the channel or function select key code table 636. For example XNOR gate 632 compares the least significant bit in the SLI bus prefix against the least significant bit in select code key 636 and outputs a logic "high" only if they match, either both having a logic "0" state or both having a logic "1" state. XNOR gate 633 similarly compares the next most significant bit i.e. LSB+1, of the SLI bus prefix to the corresponding bit in code key 636 and outputs a "high" only if they match. In like fashion, comparator 634 compares the next most significant bits in the two registers for a match. Only if all three bits in the SLI bus prefix match will the output of AMD-gate 635 go "high", indicating that the two three-bit words match exactly. Otherwise the output of AND-gate 635 and of magnitude comparator 631 will remain "low".

For the sake of clarity, we use a reference numeral 637 to represent a multichannel magnitude comparator (MC) gate, where each pair of inputs is compared against one another for a match, and these results are then delivered to a logical AND gate. A truth table for the three-input MC gate is described in Table 4, where "1" represents a match and "0" represents no match:

TABLE 4

| LSB + 2 input pair | LSB + 1 input pair | LSB input pair | MC Out |
|---|---|---|---|
| 1 | 1 | 1 | 1 |
|  | all other |  | 0 |

The output of magnitude comparator 637 is "high" only when two digital words match exactly in their magnitude, confirmed bit by bit. In Boolean logic, magnitude comparator MC 637 is described as $$MC = \{NOT(SLI_{LSB+2} \oplus KEY_{LSB+2})\} \cdot \{NOT(SLI_{LSB+1} \oplus KEY_{LSB+1})\} \cdot \{NOT(SLI_{LSB} \oplus KEY_{LSB})\}$$

where $SLI_{LSB+2}$, $SLI_{LSB+1}$ and $SLI_{LSB}$ represent the three least significant bits of the SLI bus prefix being decoded, and $KEY_{LSB+2}$, $KEY_{LSB+1}$ and $KEY_{LSB}$ represent three least significant bits of the channel or function select code key. Algebraically, the plus sign within a circle is a Boolean symbol representing a logical XOR, and · represents a logical AND, where NOT is a logical inversion, i.e. a circled plus sign preceded by NOT represents a logical XNOR.

Returning to FIG. 13A, decoder 601 checks for one of four possible channels with MC 602C, and for one of eight possible functions with MC 602F, and then performs a logical AND of these results using 32 separate dual-input AND gates 603. At any given time only one of AND gates 603 will have a "high" output. This high output turns on a set of 12 transmission-gate MOSFETs within multiplexer 604 connecting SLI data register 313 to the corresponding latch 606 in the desired channel. Like multiplexer 604, decoder 601 is simplified in FIG. 13A for the sake of clarity.

Figure 13C:
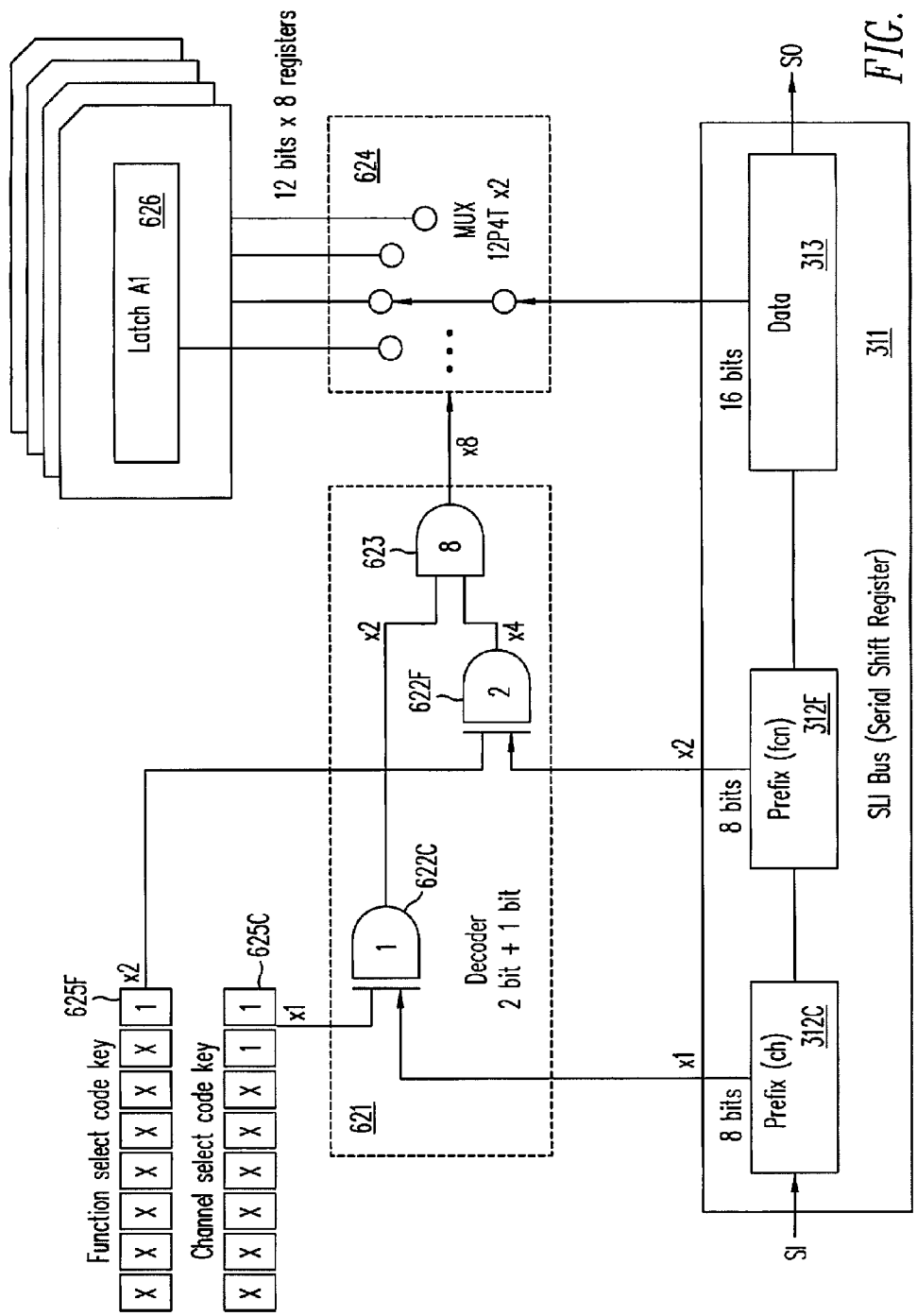
FIG. 13C shows in embodiment of a LED driver IC comprising a 2-channel 4-function SLI bus decoder and a multiplexer.
Figure 13D:
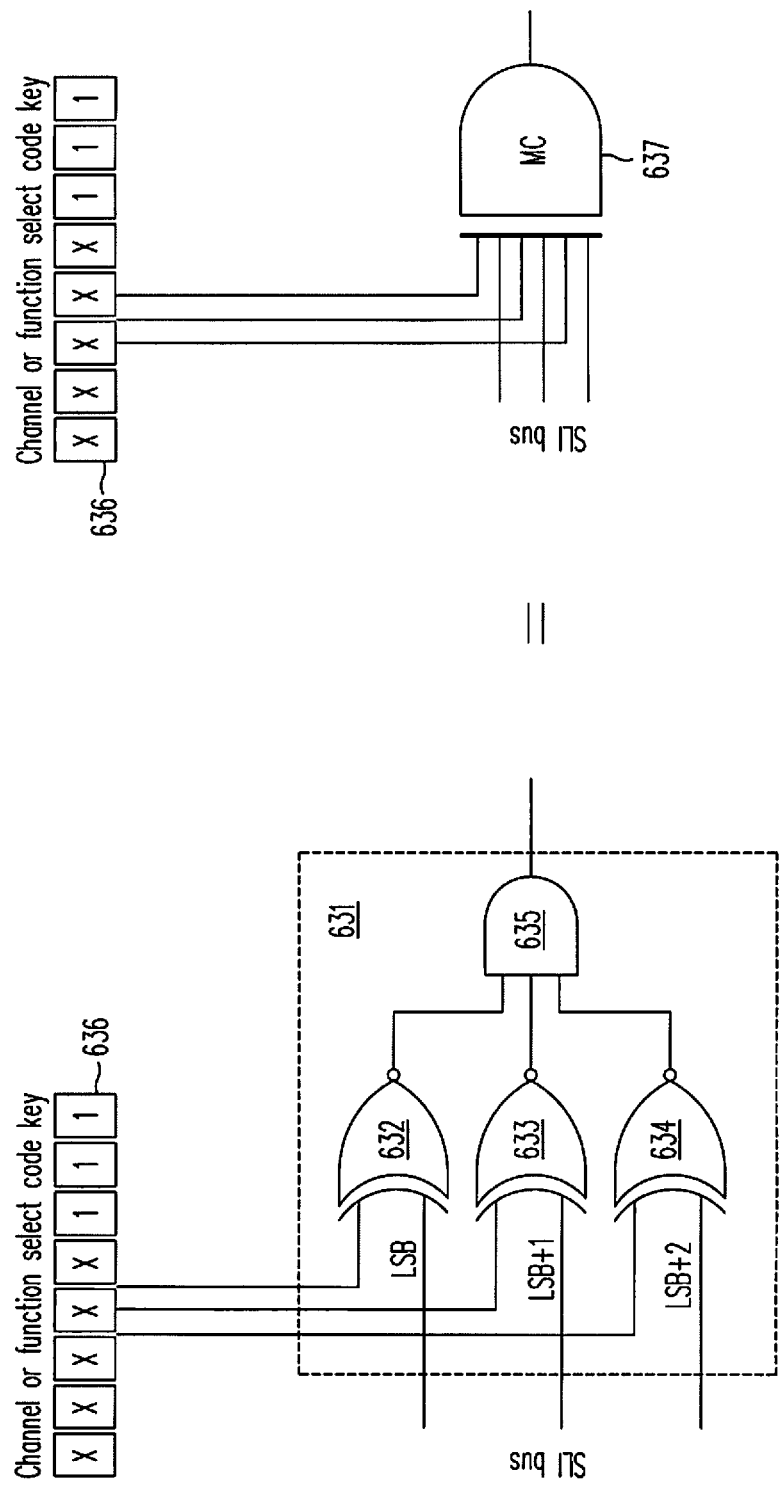
FIG. 13D shows an example of a magnitude comparator.
Figure 13E:
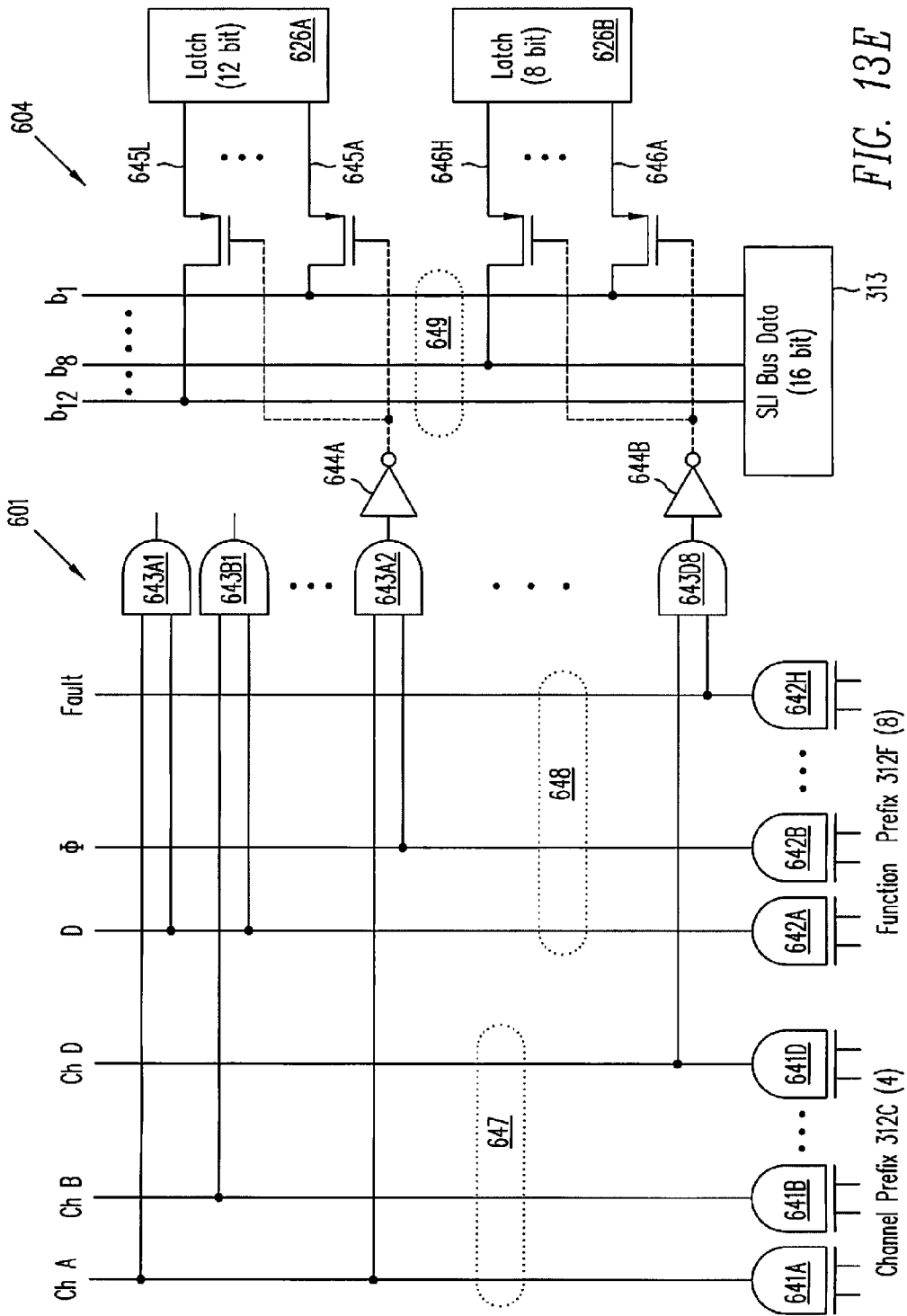
FIG. 13E shows an example of a function and channel decoder using AND gates and a multiplexer.

A more detailed description of decoder 601 and multiplexer 604 is illustrated in FIG. 13E, where the SLI bus channel prefix is decoded by four magnitude comparators 641A-641D producing decoded channel bus 647, and where the SLI bus function prefix is decoded by eight magnitude comparators 642A-642H producing decoded function bus 648. Collectively, these twelve bus lines feed a series of thirty-two dual-input logical AND gates 643A1-643A8, 643B1-643B8, 643C1-643C8, and 643D1-643D8, which in turn drive the MOSFETs comprising the multiplexer function.

Each AND gate 643 combines two inputs, one from one-of-four channel bus lines 647, the other from one-of-eight function bus lines 648. Since only one line of channel bus 647 is "high" at any one time and each of the four channels can have only one of eight lines in function bus 648 "high", then only 32 combinations are decoded. One such combination, decoded by logical AND gate 643A1 combines an input from channel A of bus 647, i.e. the output of MC 641A, with a second input from the PWM brightness control function "D" of bus 648. i.e. the output of MC 642A. As such this channel decodes the PWM brightness control for channel A. In a similar manner, the output of channel MC 641B and function MC 642A feed AND gate 643B1, whose output uniquely selects PWM brightness control for channel B.

As shown, AND gate 643A2 decodes the phase function Φ for channel A. If the SLI bus prefix selects this combination, the outputs of magnitude comparators 641A and 642B will both be "high", so that the output of AND gate 643A2 is high. The output of inverter 644A in turn goes "low", i.e. with a potential near ground, thereby turning on twelve P-channel MOSFETs 645A-645L. MOSFETs 645A-645L together act as a multichannel transmission gate connecting SLI bus data register 313 to functional latch latch 626A through data bus 649.

The multi-line connection between SLI data register 313 and functional latch 626A occurs with a one-to-one correspondence between bits of equal significance, where the two corresponding LSBs are connected, the two LSB+1 bits are connected and so on. As an example, MOSFET 645A connects $b_1$, the LSB bit on the data bus, to the LSB in latch 626A. Similarly, MOSFET 645L connects $b_{12}$ on bus 649 to the most significant bit or MSB in latch 626A. Bus bits $b_2$-$b_{11}$ are likewise connected to their respective bits in latch 626A through ten intervening MOSFETs (not shown) with one-to-one correspondence. Despite the fact that SLI bus data-register 313 comprises a 16-bit digital word, the destination latch 626A is only 12 bits wide. By copying from the LSB and up, the twelve least significant bits $b_1$-$b_{12}$ are copied from data register 313 into latch 626A while the four highest significance bits in shift register 313 are ignored. The source register 313 and destination latch 626A need not have identical bit width.

Similarly, AND gate 643D8 decodes the fault data for channel D. If the SLI bus prefix selects this combination the outputs of magnitude comparators 641D and 642H will both be "high", so that the output of AND gate 643D8 is high. The output of inverter 644B in turn goes "low", i.e. with a potential near ground, thereby turning on eight P-channel MOSFETs 646A-646H. MOSFETs 646A-646H together act as a multichannel transmission gate connecting SLI bus shift register 313 to functional latch 626B through data bus 649. As in the prior example, multiple MOSFETs, in this case eight, interconnect register 313 and data bus 649 to the corresponding bits within latch 626B.

Specifically MOSFET 646A connects $b_1$, the LSB bit on the data bus, to the LSB in latch 626B. Similarly, MOSFET 645H connects $b_8$ on bus 649 to the most significant bit or MSB in latch 626B. Bus bits $b_2$-$b_7$ are likewise connected to their respective bits in latch 626B through six intervening MOSFETs (not shown) with one-to-one correspondence. Despite the fact that SLI bus data register 313 comprises a 16-bit digital word, the destination latch 626B is only 8 bits wide. By copying from the LSB and up, the eight least significant bits $b_1$-$b_8$ are copied from data register 313 into latch 626B while the eight highest significance bits in shift register 313 (including the MSB) are ignored. The source register 313 and the destination latch 626B do not share identical bit width with one another or with latch 626A.

In this manner, 16-bit SLI bus data can be directed to specific functional latches in an LED driver through a prefix-multiplexed SLI bus, even when the functional latches are not the same size as the SLI bus data. In contrast, FIG. 13A describes the operation of decoder circuit 601 and multiplexer circuit 604 as a high level construct comprising four magnitude comparators for channel selection, eight magnitude comparators for function selection, and 32 AND gates to uniquely drive the transmission gate MOSFETs within quad 12P8T multiplexer switch 604. FIG. 13E therefore describes one possible embodiment of the system shown in FIG. 13A.

To reiterate, the circuitry shown in FIG. 13A and the implementation of that circuitry shown in FIG. 13E illustrate a SLI bus multiplexed LED driver system independently controlling 32 parameters. Since $2^5=32$, only 5 bits of the 16-bit SLI bus prefix registers 312C and 312F are required to provide the data required to control a 32 parameter LED driver. The remaining 11 bits in the SLI bus prefix registers 312C and 312F are ignored. While it is possible to reduce the size of the SLI bus shift register, the area savings in reducing the SLI bus shift register is small compared to the size of the decoder. By only decoding the combinations required, a flexible SLI bus protocol can be realized in a relatively small amount of silicon real estate.

Although this example of a prefix-multiplexed SLI bus uses a 16-bit prefix word stored in an 8-bit channel prefix register 312C and an 8-bit function prefix register 312F, it will be obvious to those skilled in the art that a smaller number of bits may be employed, and the channel prefix and function prefix registers need not be equal in size. For example an 8-bit prefix register could utilize a 5-bit channel prefix register to address 32 channels and only a 3-bit function prefix register to address 8 functions. If it proves advantageous to support up to 256 separate channels, e.g. in a LED wail signage application, the channel prefix register requires an eight-bit word. Using an additional four bits for function decoding supports 16 functions, generally adequate for most LED lighting and display applications. The benefit of reducing the aforementioned 16-bit SLI bus prefix down to a 12-bit shift register, however, offers a minimal savings in area. Also, a 12-bit word is not a power of two, and therefore is inconsistent with binary and hexadecimal data sets and other industry-standard communication protocols.

So while reducing the size of the SLI bus prefix and associated shift register offers minimal savings while sacrificing flexibility and expandability of the SLI protocol, minimizing the number of combinations decoded and reducing the size of the data bus being multiplexed offers real cost savings potential.

Other decoding examples are included for the sake of completeness. FIG. 13B illustrates a decoder 611 and a multiplexer 614 that drive sixteen functional latches 616 by decoding a 2-bit channel key stored in a register 615C and a 2-bit function key stored in a register 615F with MCs 612C and 612F, where sixteen logical AND gates 613 drive a quad 12P4T multiplexer 614, facilitating independent routing of 12-bit data to 16 functional latches. Using the prefix data stored in a channel prefix register 312C and a function prefix register 312F, the data stored in a data register 313 is routed to an appropriate one of latches 616.

FIG. 13C illustrates a decoder 621 and a multiplexer 624 that drive eight functional latches 626 by decoding a 1-bit channel key stored in a register 625C and a 2-bit function key stored in a register 625F with MCs 622C and 622F, where eight logical AND gates 623 drive a dual 12P4T multiplexer 624, facilitating independent routing of 12-bit data to 8 functional latches. Using the prefix data stored in channel prefix register 312C and function prefix register 312F, that data stored in a data register 313 is routed to a appropriate one of latches 626.

In the manner disclosed, a prefix-multiplexed LED driver can achieve dynamic independent control of multiple strings of LEDs through a flexible serial communication interface. By multiplexing and routing data contained in a serial communication shift register to various functional latches with an LED driver IC, flexible control can be achieved without the need for expensive high-pin count packages, large area shift registers, high data rate communication busses, or unduly complex control.

Synchronously Loading Multiple functional Latches

While the disclosed SLI bus communications interface and protocol facilitates flexible multichannel LED drive in low pin-count packages, the aforementioned implementation is limited by its intrinsic "two tiered" register-latch architecture. In a two-tiered register-latch architecture, as shown in FIGS. 10-13, control data exists only in two latches—a shift register within the SLI bus and the active function latch. For example, in FIG. 11, shift register 313 contains SLI bus communication data, and functional latch 455 contains function data used to control the operation of the LED driver IC.

In the previously described operation, data is copied from shift register 313 to latch 455 each time a $V_{sync}$ clock pulse occurs. By that simple control method, loading multiple latches could take several $V_{sync}$ clock cycles. For example, in the first cycle the SLI bus data is written to PWM brightness "D" latch, for channel. A, in a second cycle the data is written to the brightness "D" latch for channel B, in a third cycle the SLI bus data is written to the phase delay latch for channel A, and so on. Considering each channel requires D, Φ, Dot, and Fault settings, and Fault reporting, a dual-channel LED driver IC requires at least ten $V_{sync}$ cycles to load all the latches.

In two-tiered register-latch architectures, the latch data become active immediately upon loading in the latch at the time of the $V_{sync}$ pulse. In this context, the term "active" means that the LED drive conditions are affected by the change in latch data, i.e., the display backlight condition has been altered, potentially causing visible changes in the display's backlighting. So after channel A brightness data is loaded, waiting for another two $V_{sync}$ pulses before the corresponding channel A phase data is loaded means that for some time period channel A will drive its LED string at the proper brightness but with the wrong phase.

Writing the change into the functional latches in stages may cause visual aberrations in the backlight, including ghosting, flicker, etc. Unfortunately, sequential asynchronous loading of functional latches in a two-tiered register-latch system is intrinsically problematic. Since there is no temporary storage location to hold data, there is no means by which to load data from the interface IC into the driver ICs except sequentially. Consequently, the ripple effect of the sequential changes cannot be avoided. The SLI bus shift register cannot hold the data because it must be used to clock in more data. The functional latch cannot be used because it is active and changes the LED drive conditions as soon as it is loaded.

The solution to this quandary is to employ a three-tiered register-latch architecture as shown in FIG. 14. This architecture comprises a single SLI bus shift register 313, multiple preload latches 655, and multiple active functional latches 656, which are linked to control functions 657. Control functions 657 may be analog or digital. In this embodiment, only one SLI bus shift register 311 is used to sequentially write data to multiple preload latches 655. Also, in embodiment of FIG. 14 a one-to-one correspondence exists between each preload latch 655 and each active latch 656, although this correspondence may not be present in other embodiments.

The structure shown in FIG. 14, with three tiers of registers/latches, is not meant to be exhaustive or limiting but merely, exemplary. For example, one LED driver IC can include more than one SLI bus register, whereby one SLI bus shift register addresses one set of preload latches and a second SLI bus register addresses a second set of preload latches. In general however, for multiplexing to he economically beneficial, the number of active latches 656 should equal or exceed the number of preload latches 655; otherwise the prefix SLI bus architecture is actually less area efficient and more costly than the fat SLI bus architecture.

Similarly, while in FIG. 14 the number of preload latches 655 equals the number of active latches 656, in other embodiments the number of preload latches 655 may be less than the number of active latches 656. Since the primary function of a preload latch is to buffer data so as to prevent the data from affecting the condition of the LEO drive while allowing the data to be written into the associated active latch when required (not necessarily at the instant of a $V_{sync}$ pulse), care must be taken not to create the aforementioned flicker problem by omitting preload latch 655 from some channels. Some functions are insensitive to the flicker problem, e.g. the Fault Set and Fault Status latches may be written and queried in real time without issue. In fact, the fault latches do not need to be synchronized to the $Y_{sync}$ pulse, since managing faults is not related to frame-by-frame image control and backlight conditions. Likewise, the preload latch for the Dot function may be omitted if the Dot latch is only written once during startup. In some instances, one preload latch maybe shared among several active latches. For example, if the Dot function is only used as a global setting and not for channel-by-channel control, then one preload latch for the Dot data can be used to write the active latches of multiple channels for setting the LED current.

In summary, architecturally, the number of preload latches should be equal to or less than the number of active latches, and the number of SLI bus shift registers should be less than the number or preload latches. In a preferred embodiment, at least the channel PWM brightness function or "D" data, and the phase delay function or "Φ" data should include preload latches should include the three-tiered register-latch method comprising both active and preload latches.

Continuing with FIG. 14, the basic operation of the three-tiered register-latch architecture involves shifting data into the SLI bus shift register 311, writing the data from SLI bus data register 313 into one of the preload latches 655 without altering the data in the corresponding active latch at that time, and repeating the processes for every channel and function until all the preload latches are loaded, then at some prescribed time, e.g. on the $V_{sync}$ pulse, copying the data from the preload latches 655 into their respective active latches 656. Only when the active latch data changes, does the LED drive condition change. So long that the $V_{sync}$ pulse does not occur, the preload latch can be written and rewritten multiple times without affecting the LED drive condition.

A variety of timing options exist for writing data in the three-tiered register-latch architecture, whether the data is loaded into the SLI bus shift register 313 and copied into the preload latches 655 over several $V_{sync}$ cycles, or whether the data is all loaded within a single $V_{sync}$ cycle. Regardless, it is preferable that data be copied from the preload latch 655 into the active latch 656 at the beginning of a $V_{sync}$ cycle so that PWM dimming and phase delay operation remains constant within a video frame and consistent with that of its predecessor—the fat SLI bus version. In a preferred embodiment, all the data is written to the various preload latches 655 within a single $V_{sync}$ period so that no special timing issues must be considered.

Figure 15:
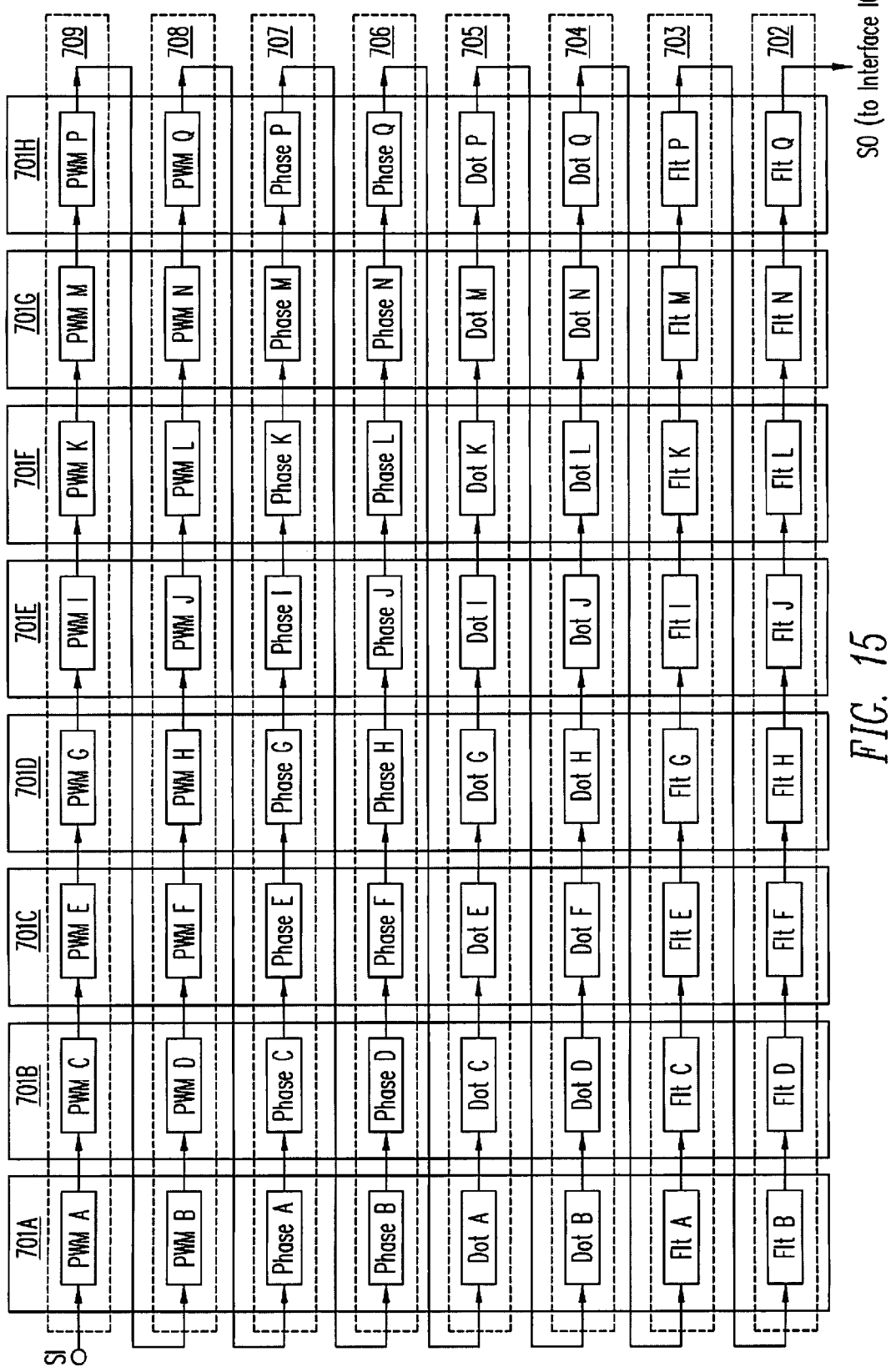
FIG. 15 illustrates an SLI bus data sequence for a 16-channel system comprising eight LED driver ICs with four independent functions.

An example of a SLI bus communication sequence for loading every preload latch of every channel in a display LED-backlighting system within a single $V_{sync}$ cycle is illustrated in FIG. 15. The sixteen-channel display system comprises eight LED driver ICs 701-701G driving sixteen LED strings in total, with two channels per LED driver IC and with individual latches for controlling PWM brightness, Phase delay, Dot current settings and Fault information. For convenience, the sixteen channels are uniquely identified with channels A and B corresponding to LED driver IC 701A, channels C and D corresponding to LED driver IC 701B, and so on up to driver 701G containing channels P and Q.

In the sequential labeling, channel O has been excluded to avoid confusion between the letter "O" and the number "0". In total, the number of latches comprises 8 driver ICs times 2 channels per driver IC times 4 latch per channel, for a total of 64 latches. Each driver IC comprises two channels with four functional latches or eight latches in total, consistent with dual-channel driver and decoding architecture shown in FIG. 13C Because each driver IC contains only one SLI bus shift register and eight functional latches, loading data into the entire backlight system requires a minimum of eight cycles, designated by the sequential data sequences 702-709.

In example shown, the first data sequence 702 contains data intended for the fault latches for channels Q, N, L, J, H, F, D and B in sequence, where the FLT data set is shifted into and through the SLI bus and then copied into the corresponding fault preload latches. Next, a second data sequence 703 contains data for the fault latches for channels P, M, K, I, G, E, C and A in sequence, where the FLT data set is shifted into and through the SLI bus and then copied into the corresponding fault preload latches.

Next, in data sequence 704 the Dot data is loaded for channels Q, N, L, J, H, F, D and B in sequence, followed by data sequence 705 where the Dot data for channels P, M, K, I, G, E, C and A is sequentially loaded. Similarly, in subsequent data sequence 706 the phase data is loaded for channels Q, N, L, J, H, F, D and B in sequence, followed by data sequence 707 where the phase data is loaded for channels P, M, K, I, G, E, C and A. Finally in data sequence 708 the PWM data is loaded for channels Q, N, L, J, H, F, D and B in sequence, followed by data sequence 709 where the PWM data for channels P, M, K, I, G, E, C and A is sequentially loaded. In this manner, every functional latch in driver ICs 701A-701G is loaded using a single shared SLI bus and multiplexed to their appropriate latches using the appropriate prefix code, whereby all the data is loaded within a single $V_{sync}$ cycle. Subsequently, at some later time, the $V_{sync}$ pulse occurs, loading the preload latch data into the active latches, changing the LED driving conditions and the display backlight's operation.

It should be noted while the above sequence is described as writing data from the interface IC into its satellite LED driver ICs via the SLI bus, the protocol supports bidirectional communication from the LED driver ICs back to the interface IC as well. For example, when the data in the data sequence 702 is written into the FLT latches, the fault status information can be copied from the driver ICs back into the appropriate bits in the data field of the SLI bus shift register. Then, when the FLT data in data sequence 703 is shifted out to the LED driver ICs from the interface IC, the fault data residing in the SLI bus shift register is shifted out the SO pin of the final driver IC in the daisy chain and back into the interface IC to be interpreted. As a result, the fault status data for channels Q, N, L, J, H, F, D and B are received by the interface IC, not during SLI bus broadcast of data sequence 702, but during the broadcast of the subsequent data sequence 703. In a similar manner, fault status data for channels P, M, K, I, G, E, C and A are not received by the interface IC during SLI bus broadcast of data sequence 703 but during the broadcast of the subsequent data sequence 704.

In this example, all of the preload latches in the entire system are written within a single $V_{sync}$ cycle and the data thus written is transferred from the preload latches to the active latches when the subsequent $V_{sync}$ pulse occurs. While this process can be repeated for every frame and $V_{sync}$ pulse of the display's operation, after the initial setup of the backlight driver system, resending redundant data is unnecessary and even burdensome.

Figure 16A:
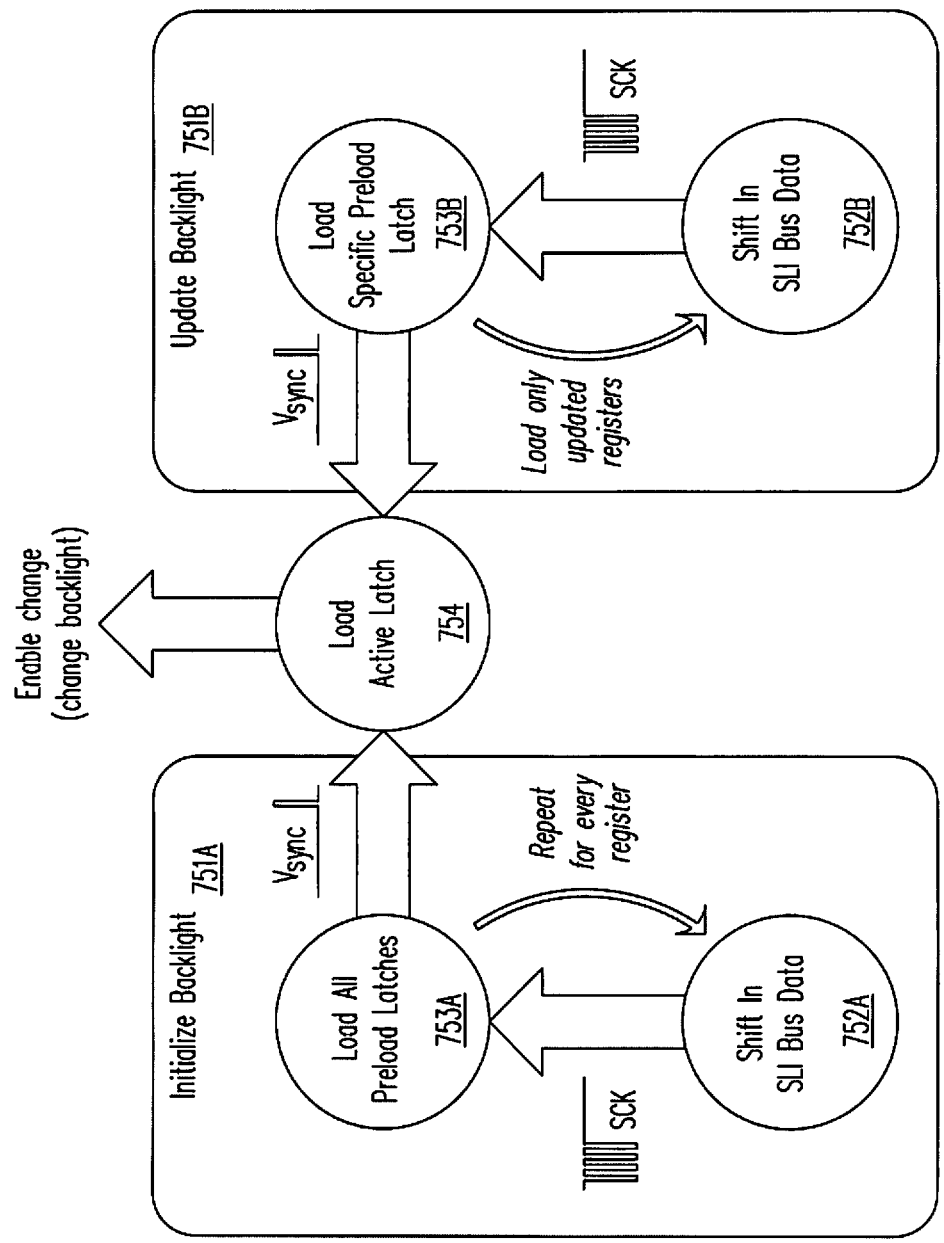
FIG. 16A is a flow chart showing the initialization and register update algorithms used for an SLI bus with multiple-function registers.

A computationally and energy efficient alternative to rewriting every latch in every $V_{sync}$ cycle is illustrated in the flow chart and state diagram shown in FIG. 16A. In the flowchart, the backlight control sequence comprises two phases, 751A where the backlight LED drivers are initialized, and 751B where the backlight LED driver conditions are refreshed. As in the sequence shown in FIG. 15, the initialization phase 751A involves shifting the data 752A (including prefix and functional data) for a given active latch 754 into the SLI bus according to the serial clock SCK signal and then loading the appropriate preload latch 753A. This process is repeated with the data for every active latch 754 until all the preload latches 753B are loaded. The command to copy the data from the SLI bus into a preload latch 753B can be embedded in the serial clock SCK waveform and therefore does not require a separate hardware solution or wire. After all the preload latches 753A have been initialized, the $V_{sync}$ pulse informs the LED driver ICs to copy the data into the active latches 754 and enable the change, thereby changing the LED driving conditions and the display backlights operation.

After initialization, only the functional latches that need to be changed are updated and rewritten, i.e. refreshed. Update backlight phase 751B illustrates that during a data refresh, only specific latches are rewritten by shifting data 752B into the SLI bus under control of serial clock SCK signal, and then loading the data into only the specific preload latches 753B for the channels and functions that are being updated. The other preload latches, i.e. the ones not being updated, remain unaltered. For example, the PWM and Phase data may be updated for every channel on a frequent if not constant basis, but the Dot data can remain unchanged unless the TV is changed from 2D to 3D mode or vice versa. In this manner, the magnitude of data being repeatedly broadcast on the SLI bus is a small fraction of that sent during the initialization.

In one embodiment of this invention, the instruction to copy the data from an SLI bus data register into a preload latch is based entirely on the waveform of the SCK serial clock signal. In the timing diagram of FIG. 16B, the serial clock SCK signal 771 is run in continuous fashion while data is loaded into LED driver ICs 701A-701H. Because the data is serial, the first data shifted into the SLI bus corresponds to the driver IC farthest away from the interface IC, i.e. driver IC 701H, while the last data shifted into the SLI bus corresponds to the driver IC nearest to the interface IC, i.e. driver IC 701A. After the data has been shifted into all of the SLI bus shift registers within driver ICs 701A-701H, the SCK signal is held "high" for some duration $t_{latch}$ 774, after which the data from all the various SLI bus shift registers is copied into the preload latches 773 in parallel. The duration $t_{latch}$ may be easily implemented with a timer and may for convenience be equivalent to the time equivalent to approximately 10 to 20 of the SCK pulses. For example, if the serial clock is running at 10 MHz, then each SCK pulse is 0.1 μsec in duration. If the SCK signal is detected to go remain high, then after the $t_{latch}$ timer counts to approximately 1 μsec, the data from the SLI bus shift registers 701A-701H will latch into the preload latches 773.

The timing of the $t_{latch}$ is not critical. In fact the data accuracy of SLI bus is insensitive to interruption of the SCK signal. If for example the data were to be shifted only halfway through the serial chain when, for whatever reason, the SCK signal temporarily was hung up in a "high" state, then the high state would be interpreted as an instruction to write the data into the preload latches. Since the wrong data is present in the SLI bus shift register at that time, or more accurately the data is positioned incorrectly in the SLI bus registers, the wrong data would latch into the preload latches 773. Despite this temporary communication error, no systems operation problem will result so long that the $V_{sync}$ pulse does not occur while the data is in the improper SLI bus shift register.

Without a $V_{sync}$ pulse, no preload latch data is copied into an active latch. Assuming that the SCK signal resumes counting, the SLI bus data would continue to shift through the serial bus until it reaches its final destination LED driver IC shift registers, when after a duration of $t_{latch}$, the proper data would be loaded from the SLI bus shift registers in driver ICs 701A-701H into preload latches 773, overwriting the erroneous data. Since the entire event occurred well within a single $V_{sync}$ pulse, the fact that momentarily the wrong data had been loaded in to the preload latches is completely innocuous and unobservable in the backlight's operation.

Figure 16B:
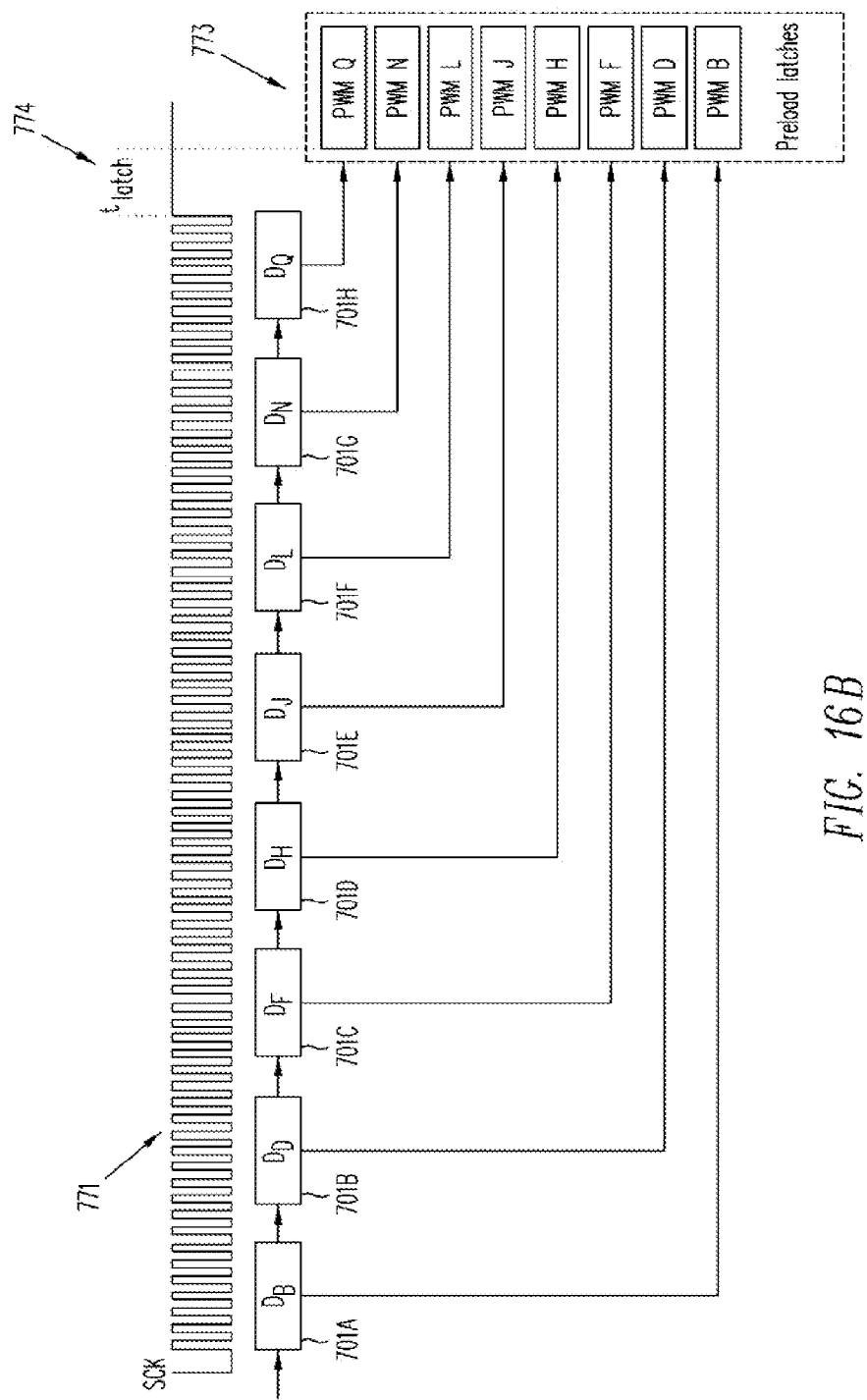
FIG. 16B is a flow chart illustrating the process of synchronous writing to multiple preload latches.

To shift the SLI bus data into the proper IC, a key aspect of SLI bus operation is that the number of bits broadcast on the SLI bus must correspond to the corresponding LED driver ICs. In FIG. 16B, for example, the number of bits on the SLI bus as a whole is equal to sum of the number of bits in the individual SLI bus registers in eight dual-channel LED driver ICs 701A-701H. Assume that the SLI bus register in each of the eight driver ICs 701A-701H contains an 8-bit channel prefix register, an 8-bit function prefix register, and a 16-bit data register, for a total of 32 bits. To write SLI bus data into eight 32-bit shift registers requires 256 SCK pulses. The first 32 SCK pulses will load the data intended for driver IC 701H, the $33^{rd}$ to $64^{th}$ SCK pulses will load the data intended for driver IC 701G, and so on. Specifically, in the example of FIG. 16B, after the occurrence of $t_{latch}$, duration data $D_B$, $D_D$, $D_F$, $D_H$, $D_J$, $D_L$, $D_N$ and $D_Q$ is copied from the data registers in the SLI bus in driver ICs 701A-701H to their corresponding PWM preload latches PWM B, PWM D, PWM F, PWM H, PWM J, PWM L, PWM N and PWM Q, respectively.

Since each driver IC comprises two channels with two sets of preload latches, a second broadcast on the SLI bus is required to load the PWM preload latches PWM A, PWM C, PWM E, PWM G, PWM I, PWM K and-PWM M. This must be repeated for every group of latches to be loaded.

Figure 16C:
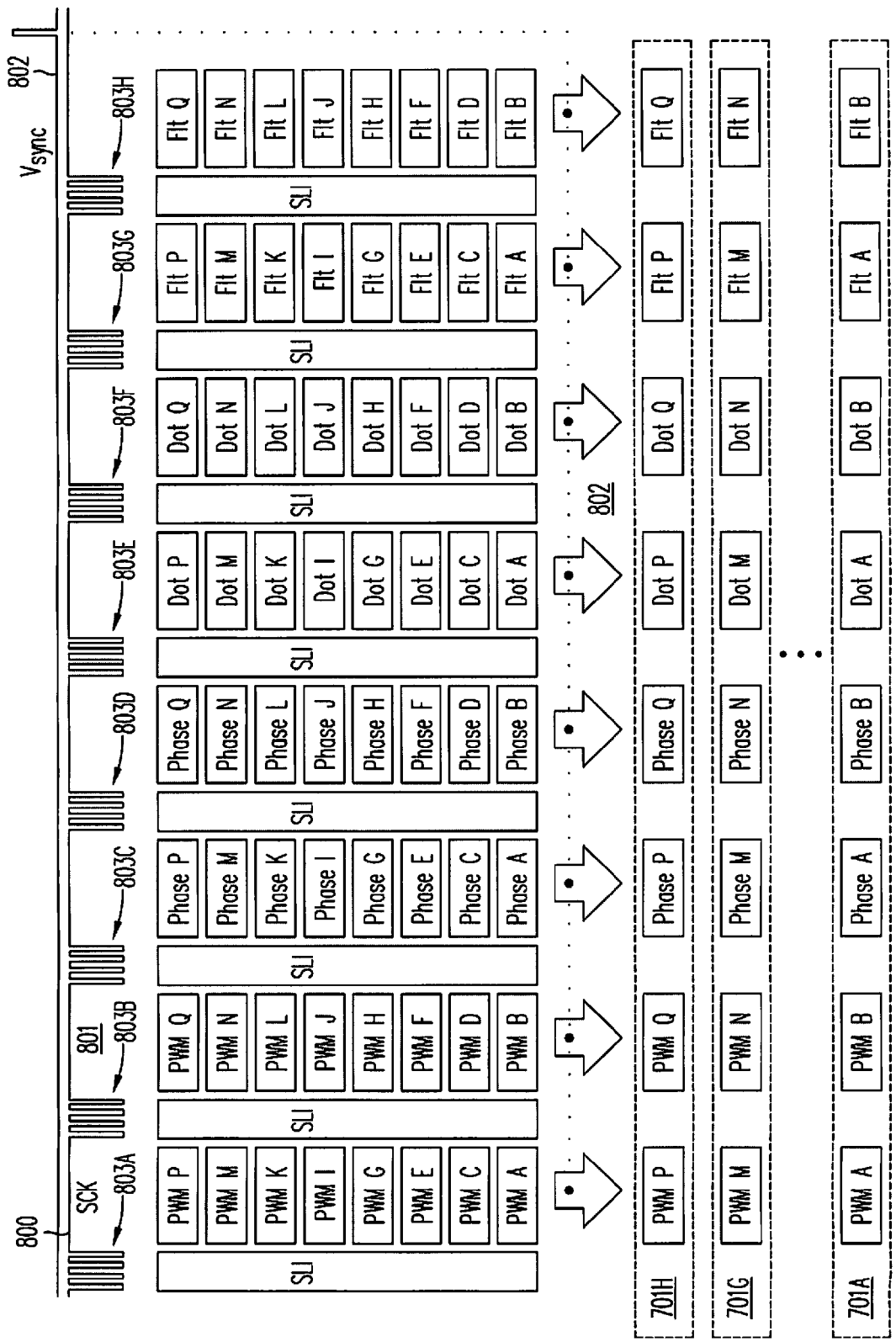
FIG. 16C illustrates a data sequence for a 16 channel, four-function system with 8 LED driver ICs.

Operation of a multichannel multi-latch sequence is further clarified in the timing and flow chart of FIG. 16C, representing the output of the interface IC controlling the SLI bus and all the satellite LED driver ICs. In the example shown, timing waveforms 801 and 802 represent the SCK and $V_{sync}$ pulses, with waveforms advancing in time from left to right.

During the SCK burst 803A the first set of PWM duration "D" data is shifted into the SLI bus shift registers. At the end of SCK burst 803A, the SCK signal is temporarily held "high," during which time the SLI bus "D" data is copied into the preload latches P, M, K, I, G, E, C and A. During the next SCK burst 803B, the second set of PWM "D" data is shifted into the SLI bus shift registers. At the end of SCK burst 803B, the SCK signal is temporarily held "high" during which time the SLI bus "D" data is copied into the preload latches Q, N, L, J, H, F, D and B.

During SCK burst 803C and the ensuing SCK "high" phase data is shifted into the SLI bus and latched into preload latches P, M, K, I, G, E, C and A, followed by SCK burst 803D and the following SCK "high," during which phase data is shifted into the SLI bus and latched into preload latches Q, N, L, J, H, F, D and B. Thereafter, during SCK burst 803E and the following SCK "high" the Dot, i.e. LED current, data is shifted into the SLI bus and latched into preload latches P, M, K, I, G, E, C and A, followed by SCK burst 803F and the following SCK "high," during which Dot data is shifted into the SLI bus and latched into preload latches Q, N, L, J, H, F, D and B. Finally, during SCK burst 803G and the following SCK "high" fault data is shifted into the SLI bus and latched into preload latches P, M, K, I, G, E, C and A, followed by SCK burst 803H and the following SCK "high," during which fault data is shifted into the SLI bus and latched into preload latches Q, N, L, J, H, F, D and B.

It should be noted that with the disclosed prefix-multiplexed SLI bus, the sequence of writing the first or second channel within a driver IC is entirely arbitrary. For example, it makes no difference if during SCK burst 803A the PWM data is for channels P, M, K, I, G, E, C and A or for channels Q, N, L, J, H, F, D and B. Since the data in the preload latches is not displayed till it is copied into the associated active latches at $V_{sync}$ pulse 802, the order in which the preload latches are loaded does not matter. The only requirements are that the data intended for channels in the driver IC located farthest in the daisy chain from the interface IC, i.e. channel P or channel Q, is written first and that the data intended for the channels in the driver IC located closest to the interface IC, channel A or channel B, is written last. Theoretically, it is possible in the SLI bus communication to mix up the first and second channels in alternating or arbitrary fashion, e.g. channel Q then channel M then channel K, but there is no benefit to this practice while it makes the sequencing more difficult to check for errors.

In the disclosed prefix-multiplexed SLI bus, the sequence by which the preload latches are loaded within a given driver IC and channel is also completely arbitrary. For example the preload latches that hold phase data can be loaded before the preload latches that hold PWM duty factor data, and this can be done either before or after the Dot or fault data are loading into preload latches. Thus the prefix-multiplexed SLI bus and method of this invention affords tremendous flexibility in dynamic control of multichannel multi-parameter LED drive.

At $V_{sync}$ pulse 802, the data from the all of preload latches is copied into the associated active latches, indicated by the arrows. Specifically, the data for PWM P and PWM Q, Phase P and Phase Q, Dot P and Dot Q, and Fault P and Fault Q is written into the active latches of dual-channel LED driver IC 701H; the data for PWM M and PWM N, Phase M and Phase N, Dot M and Dot N, and Fault M and Fault N is written into the active latches of dual-channel LED driver IC 701G; and so on. Likewise at $V_{sync}$ the PWM, Phase, Dot and Fault data for the LED driver IC 701A that is closest to the Interface IC is also copied from the preload latches into the active latches.

Refreshing LED Drive Conditions

Figure 17A:
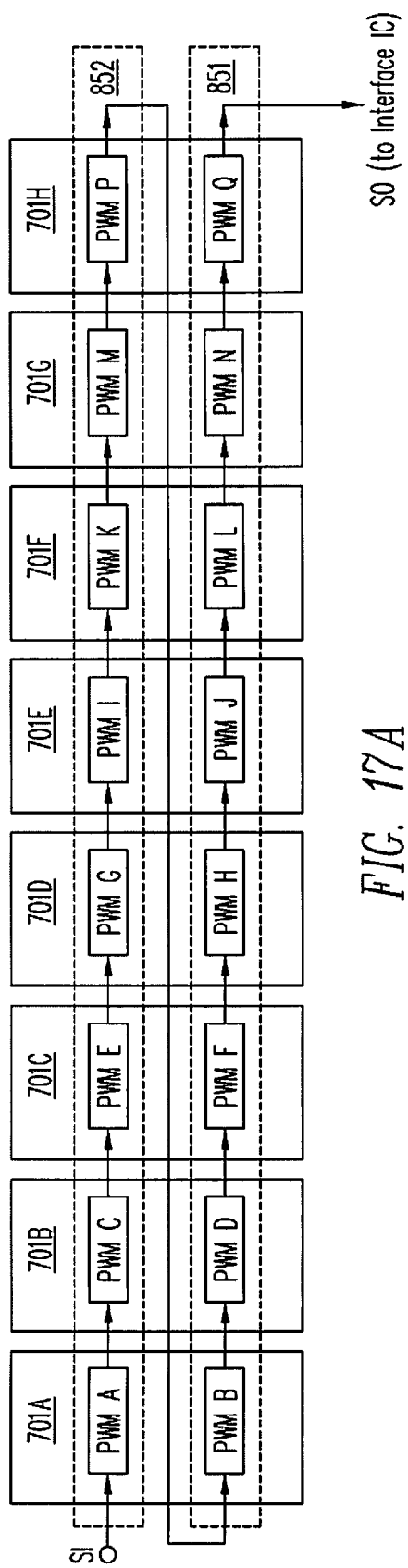
FIG. 17A illustrates a data sequence for updating only the PWM latches in a 16-channel system.

After the active latches in the LED driver ICs have been fully loaded, a subset of the data can be sent to update the latches for dynamic changes. One common dynamic change is to update the PWM brightness settings, a parameter that could change with every video frame. Such an update, shown in the SLI bus data sequence shown in FIG. 17A comprises two data sequences 851 and 852 that in two data broadcasts from the interface IC load all of the PWM preload latches in LED driver ICs 701H-701A. The data sequences 851 and 852 are thus a subset of the data sequences shown in FIG. 15.

Figure 17B:
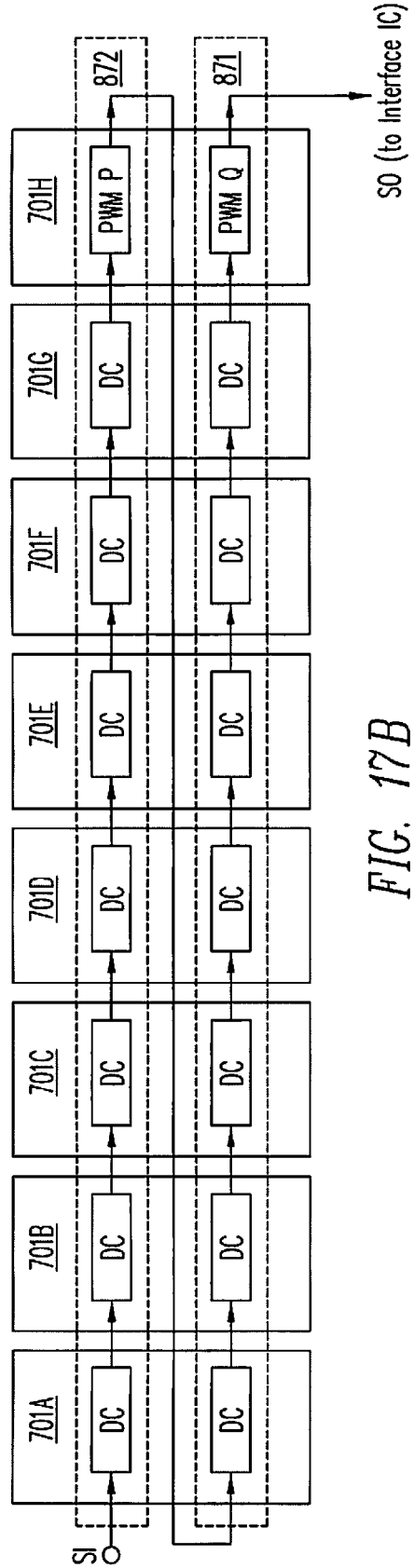
FIG. 17B illustrates a data sequence for selectively updating channels using a "don't care" prefix condition.

Blank or "don't care" data may also be shifted into the SLI bus shift registers in channels not requiring updates, provided that the prefix is selected so as to not write to any latch in the driver IC. For example if only PWM P and PWM Q latches changed, then the data shifted through the SLI bus can comprise of 14 channels of "don't care" data and two channels of PWM data, as shown in the data sequence of FIG. 17B. The "don't care," or DC data, in the data field is ignored by choosing a prefix that doesn't physically address a latch in the IC, either by choosing a channel select code that does not exist or a function select code that does not exist. For example, writing a channel code of 0000-0100 or greater, 04 in hexadecimal, will select a channel code above the four integrated hexadecimal channels 00-03 in a four-channel LED driver IC and will therefore be ignored. Alternatively, writing a function-select code of 0000-1000 or greater, 08 in hexadecimal, will select a functional latch outside the eight latch hexadecimal range 00 to 07 and will therefore be ignored.

Alternatively, a safe selection is to use the prefix FFFF, 1111-1111-1111-1111 in binary, to choose a value well beyond all practicable latch counts in even the largest systems. In an alternative embodiment the code FFFF could be reserved to as a "don't care" command. The "don't care" function is necessary because, in a shift register based communication protocol, the right number of bits must be shifted to shift the update data into the prefix and data registers of the SLI bus in the appropriate driver IC. Referring of the example shown in FIG. 17B, loading a 32-bit word containing update data for PWM P into channel 701H requires that seven 32 bit words, or 224 bits, be shifted into the shift register subsequent to the 32-bit word that contains the update to the PWM P latch. The same is true for PWM Q, where a 32-bit update word with a prefix selecting the Q channel and the PWM functional latch must be followed by 224 bits to move the data into its corresponding driver IC 701H. It should be reiterated that in a dual-channel driver IC, it makes no difference whether second channel is channel B, D, F, H, J, L, N and Q in the overall LED driver system. So shifting the right number of bits into the SLI bus subsequent to shifting update data for a specific latch onto the SLI bus is critical to selecting the right channel, function, and LED driver IC.

As a final point, updates can be mixed in a single SLI bus update so long as the number of bits broadcast are equal to the number of LED driver ICs times the number of bits in the SLI bus register of each driver IC.

Figure 17C:
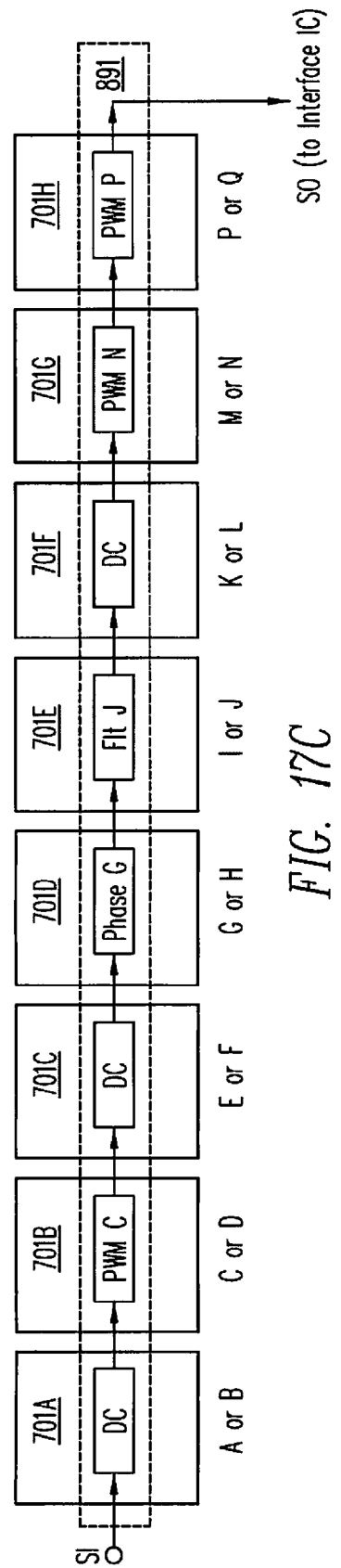
FIG. 17C illustrates a data sequence for a mix of channel, function and don't care instructions in a single SLI bus broadcast.

For example, in the SLI bus communication sequence in FIG. 17C, a mix of PWM Fault, Phase Dot and DC data is sent in broadcast sequence 891, comprising in total 8 channels times 32 bits or 256 bits shifted onto the SLI bus. In the example shown, not only are different functions mixed together into the same data stream, but also the channel selected may intermix A channel and B channel data into the same data stream. For example, the "A channel" data includes PWM C, Phase G, and PWM P data for LED driver ICs 701B, 701G, and 701H respectively, the "B channel" data includes Fault J and PWM N data for corresponding LED driver ICs 701E and 701G, and the data in driver ICs 701A, 701C and 701F indicates a "don't care" drive condition. In short, in the embodiment described above, data for up to one (but not more than one) preload latch in any driver IC can be included in any single sequence of data loaded into the SLI bus.

In the manner prescribed, updating LED driver conditions can be performed using the disclosed prefix-multiplexed SLI bus protocol without resending the full set of latch information.

SLI Bus Flexibility

The disclosed prefix-multiplexed SLI bus is compatible with a variety of functions not specifically disclosed herein, including the ability to toggle a given channel on or off, the ability to invert the PWM signal, and the ability to encode the CSFB feedback signal and embed it into the SLI bus protocol. The applications and functions described in this disclosure therefore should not be interpreted to limit the utility of the SLI bus in any way.

We claim:

1. A light emitting diode (LED) driver integrated circuit (IC) to connect to one or more LED strings, each of the LED strings representing a channel of one or more channels, the LED driver IC comprising:
   a serial shift register including a first portion to hold data identifying at least one channel of the one or more channels, a second portion to hold data identifying a function within the at least one channel, and a third portion to hold data representing a value of the function within the at least one channel;
   a plurality of latches to hold data representing the value of the function;
   a multiplexer having a first port coupled to the third portion of the serial shift register, a second port coupled to the plurality of latches, and a control port to receive a control signal, the multiplexer being configured to selectively couple the third portion of the serial shift register to at least one latch of the plurality of latches based on the control signal; and
   a decoder having a first input coupled to the first portion of the serial shift register, a second input coupled to the second portion of the serial shift register, and an output coupled to the control port of the multiplexer, the decoder being configured to generate the control signal for the multiplexer based on the data identifying the at least one channel and the data identifying the function within the at least one channel.

2. The LED driver IC of claim 1 further comprising a gate driver circuit coupled to one or more latches of the plurality of latches.

3. The LED driver IC of claim 2 further comprising a switch coupled between the gate driver circuit and at least one LED string of the one or more LED strings.

4. The LED driver IC of claim 3 wherein the gate driver circuit is constructed to control at least one of a duty factor of the switch, a phase delay of the switch, and a magnitude of a current in the at least one LED string.

5. The LED driver IC of claim 1 wherein the decoder includes a first group of magnitude comparators, an input terminal of each of the first group of magnitude comparators being connected to a bit storage location in the first portion of the serial shift register.

6. The LED driver IC of claim 5 wherein the decoder further includes a second group of magnitude comparators, an input terminal of each of the second group of magnitude comparators being connected to a bit storage location in the second portion of the serial shift register.

7. The LED driver IC of claim 6 wherein the decoder further includes a group of AND gates, an output terminal of each of the first and second groups of magnitude comparators being connected to an input terminal of at least one AND gate of the group of AND gates.

8. The LED driver IC of claim 7 wherein the multiplexer includes a group of MOSFET switches, an output terminal of each AND gate of the group of AND gates being coupled to a gate terminal of at least one MOSFET switch of the group of MOSFET switches.

9. The LED driver IC of claim 8 wherein a bit storage location in the third portion of the serial shift register is connected to a first main terminal of at least one MOSFET switch of the group of MOSFET switches, a second main terminal of the at least one MOSFET switch of the group of MOSFET switches being connected to a bit storage location in the at least one latch.

10. The LED driver IC of claim 1 wherein the at least one latch includes an active latch.

11. The LED driver IC of claim 1 wherein the one or more LED strings are in a television.

12. The LED driver IC of claim 1 wherein the one or more LED strings are in a liquid crystal display.

13. The LED driver IC of claim 10 further comprising a preload latch coupled between the second port of the multiplexer and the active latch.

14. The LED driver IC of claim 1 wherein the control port of the multiplexer is directly coupled to the output of the decoder and the first port of the multiplexer is directly coupled to the third portion of the serial shift register.

15. A light emitting diode (LED) driver integrated circuit (IC) to connect to one or more LED strings, each of the LED strings representing a channel of one or more channels, the LED driver IC comprising:
   a serial shift register including a first portion to hold data identifying at least one channel of the one or more channels and a second portion to hold data representing a functional condition within the at least one channel;
   a plurality of latches to hold data representing the functional condition;
   a multiplexer having a first port coupled to the second portion of the serial shift register, a second port coupled to the plurality of latches, and a control port to receive a control signal, the multiplexer being configured to selectively couple the second portion of the serial shift register to at least one latch of the plurality of latches based on the control signal; and
   a decoder having a first input coupled to the first portion of the serial shift register and an output coupled to the control port of the multiplexer, the decoder being configured to generate the control signal for the multiplexer based on the data identifying the at least one channel.

16. A method of controlling one or more light emitting diode (LED) strings, each of the LED strings being associated with a channel of one or more channels, the method comprising:
   shifting digital data identifying at least one channel of the one or more channels into a first portion of a serial shift register;
   shifting digital data identifying a function associated with the at least one channel into a second portion of the serial shift register;
   shifting digital data representing a value of the function associated with the at least one channel into a third portion of the serial shift register;
   generating a control signal based on the digital data identifying the at least one channel from the first portion of the serial shift register and the digital data identifying the function associated with the at least one channel from the second portion of the serial shift register; and
   selectively coupling the third portion of the serial shift register to at least one latch of a plurality of latches based on the control signal.

17. The method of claim 16 further comprising copying the value of the function from the third portion of the serial shift register to the at least one latch.

18. The method of claim 16 further comprising copying a value stored in the at least one latch to the third portion of the serial shift register.

* * * * *